United States Patent
Oh et al.

(10) Patent No.: US 10,972,164 B2
(45) Date of Patent: Apr. 6, 2021

(54) METHOD AND DEVICE FOR TRANSMITTING AND RECEIVING FEEDBACK SIGNAL IN WIRELESS COMMUNICATION SYSTEM

(71) Applicant: Samsung Electronics Co., Ltd., Gyeonggi-do (KR)

(72) Inventors: Jin-Young Oh, Seoul (KR); Young-Woo Kwak, Gyeonggi-do (KR); Seung-Hoon Choi, Gyeonggi-do (KR); Dong-Han Kim, Gyeonggi-do (KR); Hoon-Dong Noh, Gyeonggi-do (KR); Cheol-Kyu Shin, Gyeonggi-do (KR); Youn-Sun Kim, Gyeonggi-do (KR); Sang-Min Ro, Seoul (KR)

(73) Assignee: Samsung Electronics Co., Ltd

( * ) Notice: Subject to any disclaimer, the term of this patent is extended or adjusted under 35 U.S.C. 154(b) by 5 days.

(21) Appl. No.: 15/761,259

(22) PCT Filed: Sep. 19, 2016

(86) PCT No.: PCT/KR2016/010430
§ 371 (c)(1),
(2) Date: Mar. 19, 2018

(87) PCT Pub. No.: WO2017/048107
PCT Pub. Date: Mar. 23, 2017

(65) Prior Publication Data
US 2018/0262252 A1   Sep. 13, 2018

Related U.S. Application Data

(60) Provisional application No. 62/220,527, filed on Sep. 18, 2015.

(51) Int. Cl.
H04B 7/06       (2006.01)
H04L 5/00       (2006.01)
H04B 7/0456     (2017.01)

(52) U.S. Cl.
CPC ......... *H04B 7/0626* (2013.01); *H04B 7/0478* (2013.01); *H04B 7/0636* (2013.01);
(Continued)

(58) Field of Classification Search
None
See application file for complete search history.

(56) References Cited

U.S. PATENT DOCUMENTS

2012/0300728 A1* 11/2012 Lee ................. H04L 5/0053
                                                    370/329
2013/0329664 A1  12/2013 Kim et al.
(Continued)

FOREIGN PATENT DOCUMENTS

WO  WO 2014/166052   10/2014
WO  WO 2015/133793    9/2015

OTHER PUBLICATIONS

PCT/ISA/210 Search Report issued on PCT/KR2016/010430 (pp. 3).
(Continued)

*Primary Examiner* — Saba Tsegaye
(74) *Attorney, Agent, or Firm* — The Farrell Law Firm, P.C.

(57) ABSTRACT

A method, provided by the present disclosure, of transmitting a reference signal by means of a base station in a wireless communication system using a plurality of antenna ports comprises the steps of: mapping wireless resources, for transmitting a reference signal, to a plurality of antenna ports for transmitting the reference signal; and using the wireless resources and transmitting the reference signal to a terminal (Continued)

through the mapped antenna ports. The step of mapping to the antenna ports is characterized by being executed on the basis of a combination of a first mapping pattern between the wireless resources and the antenna ports and a second mapping pattern between the wireless resources and the antenna ports.

20 Claims, 34 Drawing Sheets

(52) U.S. Cl.
CPC ............ *H04L 5/005* (2013.01); *H04L 5/0044* (2013.01); *H04L 5/0048* (2013.01); *H04L 5/0016* (2013.01); *H04L 5/0023* (2013.01)

(56) References Cited

U.S. PATENT DOCUMENTS

| | | | |
|---|---|---|---|
| 2015/0036612 A1* | 2/2015 | Kim | H04B 17/00 370/329 |
| 2015/0181453 A1 | 6/2015 | Chen et al. | |
| 2015/0208392 A1* | 7/2015 | Park | H04B 7/024 370/329 |
| 2017/0279501 A1* | 9/2017 | Kim | H04B 7/0413 |
| 2018/0054290 A1* | 2/2018 | Park | H04L 1/00 |

OTHER PUBLICATIONS

PCT/ISA/237 Written Opinion issued on PCT/KR2016/010430 (pp. 7).
Qualcomm Incorporated, General views on codebook enhancements for FD-MIMO, 3GPP TSG-RAN WG1 #82, Aug. 24-28, 2015, Beijing, China, pp. 6.
Samsung, Antenna configurations and antenna port numbering for FD-MIMO, 3GPP TSG RAN WG1 Meeting #82, Beijing, China, Aug. 24-28, 2015, pp. 6.
Catt, "Introduction of CSI-RS in DwPTS for TDD", R1-153933, 3GPP TSG RAN WG1 Meeting #82, Aug. 24-28, 2015, 3 pages.
Xinwei, "Discussion on Non-precoded CSI-RS Enhancement in FD-MIMO", R1-154689, 3GPP TSG RAN WG1 Meeting #82, Aug. 24-28, 2015, 4 pages.
Samsung, "Discussion on NZP CSI-RS Resource Configuration for 12 and 16 Ports", R1-154159, 3GPP TSG RAN WG1 Meeting #82, Aug. 24-28, 2015, 4 pages.
Ericsson, "CSI-RS Design for FD-MIMO", R1-154551, 3GPP TSG-RAN WG1#82, Aug. 24-28, 2015, 4 pages.
Chinese Office Action dated Oct. 29, 2020 issued in counterpart application No. 201680067383.1, 14 pages.

* cited by examiner

Table 6.10.5.2-1: Mapping from CSI reference signal configuration to $(k',l')$ for normal cyclic prefix

| | CSI reference signal configuration | Number of CSI reference signals configured | | | | | |
|---|---|---|---|---|---|---|---|
| | | 1 or 2 | | 4 | | 8 | |
| | | $(k',l')$ | $n_s \bmod 2$ | $(k',l')$ | $n_s \bmod 2$ | $(k',l')$ | $n_s \bmod 2$ |
| Frame structure type 1 and 2 | 0 | (9,5) | 0 | (9,5) | 0 | (9,5) | 0 |
| | 1 | (11,2) | 1 | (11,2) | 1 | (11,2) | 1 |
| | 2 | (9,2) | 1 | (9,2) | 1 | (9,2) | 1 |
| | 3 | (7,2) | 1 | (7,2) | 1 | (7,2) | 1 |
| | 4 | (9,5) | 1 | (9,5) | 1 | (9,5) | 1 |
| | 5 | (8,5) | 0 | (8,5) | 0 | | |
| | 6 | (10,2) | 1 | (10,2) | 1 | | |
| | 7 | (8,2) | 1 | (8,2) | 1 | | |
| | 8 | (6,2) | 1 | (6,2) | 1 | | |
| | 9 | (8,5) | 1 | (8,5) | 1 | | |
| | 10 | (3,5) | 0 | | | | |
| | 11 | (2,5) | 0 | | | | |
| | 12 | (5,2) | 1 | | | | |
| | 13 | (4,2) | 1 | | | | |
| | 14 | (3,2) | 1 | | | | |
| | 15 | (2,2) | 1 | | | | |
| | 16 | (1,2) | 1 | | | | |
| | 17 | (0,2) | 1 | | | | |
| | 18 | (3,5) | 1 | | | | |
| | 19 | (2,5) | 1 | | | | |
| Frame structure type 2 only | 20 | (11,1) | 1 | (11,1) | 1 | (11,1) | 1 |
| | 21 | (9,1) | 1 | (9,1) | 1 | (9,1) | 1 |
| | 22 | (7,1) | 1 | (7,1) | 1 | (7,1) | 1 |
| | 23 | (10,1) | 1 | (10,1) | 1 | | |
| | 24 | (8,1) | 1 | (8,1) | 1 | | |
| | 25 | (6,1) | 1 | (6,1) | 1 | | |
| | 26 | (5,1) | 1 | | | | |
| | 27 | (4,1) | 1 | | | | |
| | 28 | (3,1) | 1 | | | | |
| | 29 | (2,1) | 1 | | | | |
| | 30 | (1,1) | 1 | | | | |
| | 31 | (0,1) | 1 | | | | |

```
                ┌─────────────────────────────────────────────────────────────────────────────────┐
                │ Refers to a periodic CQI reporting configuration that is configured for the same frequency as the CSI process. Value 0 refers to │
                │ the set of parameters defined by the REL-10 CQI reporting configuration fields, while the other values refer to │
                │ the additional configurations E-UTRAN assigns by CQI-ReportPeriodicProcExt-r11 (and as covered by │
                │ CQI-ReportPeriodicProcExtId).                                                    │
                └─────────────────────────────────────────────────────────────────────────────────┘

(2701)  CSI-Process-r11 ::=      SEQUENCE {
            csi-ProcessId-r11               CSI-ProcessId-r11,
            csi-RS-ConfigNZPId-r11          CSI-RS-ConfigNZPId-r11,
            csi-IM-ConfigId-r11             CSI-IM-ConfigId-r11,
            p-C-AndCBSRList-r11             P-C-AndCBSR-Pair-r13a,
           ┌cqi-ReportBothProc-r11          CQI-ReportBothProc-r11          OPTIONAL,   -- Need OR
            cqi-ReportPeriodicProcId-r11    INTEGER (0..maxCQI-ProcExt-r11) OPTIONAL,   -- Need OR
           └cqi-ReportAperiodicProc-r11     CQI-ReportAperiodicProc-r11     OPTIONAL,   -- Need OR
            ...,
            [[ alternativeCodebookEnabledFor4TXProc-r12   ENUMERATED (true) OPTIONAL,   -- Need ON
               csi-IM-ConfigIdList-r12      CHOICE {
                   release                  NULL,
                   setup                    SEQUENCE (SIZE (1..2)) OF CSI-IM-ConfigId-r12
(2703)         }                                                            OPTIONAL,   -- Need ON
               cqi-ReportAperiodicProc2-r12 CHOICE {
                   release                  NULL,
                   setup                    CQI-ReportAperiodicProc-r11
               }                                                            OPTIONAL    -- Need ON
            ]],
        }

CQI-ReportBothProc-r11 ::=      SEQUENCE {
            ri-Ref-CSI-ProcessId-r11        CSI-ProcessId-r11               OPTIONAL,   -- Need OR
            pmi-RI-Report-r11               ENUMERATED {setup}              OPTIONAL    -- Need OR
        }

(2705)
        CQI-ReportAperiodicProc-r11 ::= SEQUENCE {
            cqi-ReportModeAperiodic-r11     CQI-ReportModeAperiodic,
            trigger01-r11                   BOOLEAN,
            trigger10-r11                   BOOLEAN,
            trigger11-r11                   BOOLEAN
        }
```

FIG. 27B

```
If (cqi-ReportPeriodicProcId-r11==0)

CQI-ReportPeriodic-r10 ::=          CHOICE {
    release                         NULL,
    setup                           SEQUENCE {
        cqi-PUCCH-ResourceIndex-r10     INTEGER (0..1184),
        cqi-PUCCH-ResourceIndexP1-r10   INTEGER (0..1184)           OPTIONAL,    -- Need OR
        cqi-pmi-ConfigIndex             INTEGER (0..1023),
        cqi-FormatIndicatorPeriodic-r10 CHOICE {
            widebandCQI-r10                 SEQUENCE {
                csi-ReportMode-r10              ENUMERATED {submode1, submode2}  OPTIONAL  -- Need OR
            },
            subbandCQI-r10                  SEQUENCE {
                k                               INTEGER (1..4),
                periodicityFactor-r10           ENUMERATED {n2, n4}
            }
        },
        ri-ConfigIndex                  INTEGER (0..1023)           OPTIONAL,    -- Need OR
        simultaneousAckNackAndCQI       BOOLEAN,
        cqi-Mask-r9                     ENUMERATED {setup}          OPTIONAL,    -- Need OR
        csi-ConfigIndex-r10             CHOICE {
            release                         NULL,
            setup                           SEQUENCE {
                cqi-pmi-ConfigIndex2-r10        INTEGER (0..1023),
                ri-ConfigIndex2-r10             INTEGER (0..1023)   OPTIONAL    -- Need OR
            }
        }                               OPTIONAL                                -- Need ON
    }
} else

CQI-ReportPeriodicProcExt-r11 ::=   SEQUENCE {
    cqi-ReportPeriodicProcExtId-r11     CQI-ReportPeriodicProcExtId-r11,
    cqi-pmi-ConfigIndex-r11             INTEGER (0..1023),
    cqi-FormatIndicatorPeriodic-r11     CHOICE {
        widebandCQI-r11                     SEQUENCE {
            csi-ReportMode-r11                  ENUMERATED {submode1, submode2} OPTIONAL  -- Need OR
        },
        subbandCQI-r11                      SEQUENCE {
            k                                   INTEGER (1..4),
            periodicityFactor-r11               ENUMERATED {n2, n4}
        }
    },
    ri-ConfigIndex-r11                  INTEGER (0..1023)           OPTIONAL,   -- Need OR
    csi-ConfigIndex-r11                 CHOICE {
        release                             NULL,
        setup                               SEQUENCE {
            cqi-pmi-ConfigIndex2-r11            INTEGER (0..1023),
            ri-ConfigIndex2-r11                 INTEGER (0..1023)   OPTIONAL    -- Need OR
        }
    }                                                               OPTIONAL,   -- Need ON
    ...
}
```

METHOD AND DEVICE FOR TRANSMITTING AND RECEIVING FEEDBACK SIGNAL IN WIRELESS COMMUNICATION SYSTEM

PRIORITY

This application is a National Phase Entry of International Application No. PCT/KR2016/010430, filed on Sep. 19, 2016, and claims priority to U.S. Provisional Patent Application No. 62/220,527, filed Sep. 18, 2015, the content of each of which is incorporated herein by reference.

TECHNICAL FIELD

The present disclosure relates to a method and apparatus for transmitting and receiving a feedback signal in a wireless communication system.

BACKGROUND ART

From the early stage of providing voice-oriented services, a mobile communication system has evolved into a high-speed and high-quality wireless packet data communication system to provide large-capacity data and multimedia services. To this end, in a number of standardization organizations such as 3GPP, IEEE, and the like, various mobile communication standards such as Long Term Evolution Advanced (LTE-A) of 3GPP, 802.16m of IEEE, etc., have been developed to support high-speed and high-quality wireless packet data transmission services based on a multi-access scheme using multiple carriers.

The currently existing 4th evolved mobile communication systems, such as LTE-A, UMB, 802.16m, and the like, are based on the multi-carrier multi-access scheme. To improve the transmission efficiency, various technologies such as Multiple Input Multiple Output (MIMO), multiple antennas, beam-forming, Adaptive Modulation and Coding (AMC), channel sensitive scheduling, and the like are used.

The various technologies described above may enhance the transmission efficiency and improve the system throughput through a method of concentrating a transmission power that is transmitted from multiple antennas or adjusting an amount of transmitted data based on various kinds of Channel status information (CSI), and selectively transmitting data to a user having a good channel quality, or the like.

Most of those schemes are operated based on channel status information of a channel between an evolved Node B (eNB) (or Base Station (BS)) and a user equipment (UE) (or a Mobile Station (MS)) and thus, the eNB or the UE may need to measure a channel status between the eNB and the UE. In this instance, a Channel status Indication Reference Signal (CSI-RS) is used. The above-described eNB is a device that is located in a predetermined place and executes downlink transmission and uplink reception. A single eNB may execute transmission and reception with respect to a plurality of cells. In a single mobile communication system, a plurality of eNBs are geographically distributed and each eNB executes transmission and reception with respect to a plurality of cells.

The MIMO technology uses a plurality of transceiving antennas and may execute transmission by spatially dividing a plurality of information streams. The transmission through spatially dividing the plurality of information streams is referred to as spatial multiplexing. Generally, the number of information streams to which spatial multiplexing is to be applied is referred to as a "rank" of a corresponding transmission, and the rank may vary based on the number of antennas included in a transmitter and a receiver. In the case of the MIMO technology supported in the standards up to LTE/LTE-A Release 12, spatial multiplexing with respect to the case in which the number of transmission antennas and the number of reception antennas are respectively 2, 4, and 8, is supported, and a rank is supported up to 8.

Meanwhile, a massive MIMO system or a full-dimension MIMO system (FD-MIMO) is a system constituted of a plurality of antennas having 32 or more antennas which is more than 8 antennas arranged in two dimensions.

FIG. 1 is a diagram illustrating an FD-MIMO antenna system.

In FIG. 1, an eNB transmitting apparatus 101 transmits radio signals using several tens or more transmission antennas. A plurality of transmission antennas are arranged to maintain a predetermined distance as shown in FIG. 1. The predetermined distance may correspond to, for example, a multiple of the half of the wavelength of a transmitted radio signal. Generally, when a distance corresponding to the half of the wavelength of the radio signal is maintained between the transmission antennas, a signal transmitted from each transmission antenna may be affected by a radio channel having a low correlation.

The eNB transmitting apparatus having a large-scale antenna may arrange antennas two-dimensionally as shown in FIG. 1 in order to prevent the size of the apparatus from becoming significantly large. An eNB transmits a signal using $N_H$ antennas arrayed on the horizontal axis and Nv antennas arrayed on the vertical axis, and a UE 103 should measure a channel 102 for the corresponding antenna.

In FIG. 1, dozens or more transmission antennas arranged in the eNB transmitting apparatus 101 are utilized for transmitting signals to one or a plurality of UEs. An appropriate precoding is applied to the plurality of transmission antennas, and thus, simultaneous transmission of signals is executed with respect to a plurality of UEs. In this instance, a single UE may receive one or more information streams. Generally, the number of information streams that a single UE can receive may be determined based on the number of reception antennas that the UE contains as well as the channel status.

In order to effectively implement the FD-MIMO antenna system, the UE must accurately measure channel conditions and interference magnitudes between transmission and reception antennas using a plurality of reference signals, and transmit effective channel status information to the eNB using the measured information. The eNB that receives the channel status information may determine UEs to which transmission is to be executed in association with downlink transmission, may determine a data transmission speed to be used for transmission, and may determine precoding to be applied, or the like. The FD-MIMO system has a large number of transmission antennas, and thus, when the channel status information transmission/reception method of the conventional LTE/LTE-A system is applied, a large amount of control information needs to be transmitted in an uplink, which may cause an uplink overhead.

Time, frequency, and power resources are limited in a mobile communication system. Therefore, when a larger amount of resources is allocated to a reference signal, an amount of resources to be allocated to data traffic channel transmission becomes smaller, and thus, an absolute amount of data to be transmitted may be reduced. In this instance, the performance of channel measurement and estimation may be improved but the absolute amount of data to be transmitted may be reduced, and thus, the system throughput may be lowered.

Accordingly, to draw an optimized performance from the perspective of the entire system throughput, resources for the reference signal and resources for data transmission of the traffic channel need to be appropriately distributed.

FIG. 2 illustrates a radio resource corresponding to one subframe and one Resource Block (RB), which are the minimum units of capable of performing scheduling via a downlink in an LTE/LTE-A system.

The radio resource shown in FIG. 2 is composed of one subframe on a time axis 201 and one RB on a frequency axis 203. The radio resource is constituted of 12 subcarriers in the frequency domain and 14 OFDM symbols in the time domain, and thus, may have a total of 168 unique frequency and time locations. In the LTE/LTE-A system, each unique frequency and time location of FIG. 2 is referred to as a resource element (RE).

Through the radio resource shown in FIG. 2, a plurality of different types of signals may be transmitted as follows.

Cell specific Reference Signal (CRS) 211: The CRS is a reference signal periodically transmitted for all UEs included in one cell, and may be commonly used by a plurality of UEs.

DeModulation Reference Signal (DMRS) 213: The DMRS is a reference signal transmitted for a specific UE, and is transmitted only when data is transmitted to a corresponding UE. The DMRS is constituted of a total of 8 DMRS ports. In LTE/LTE-A, ports 7 to 14 correspond to the DMRS ports and the ports may maintain orthogonality so as not to cause interference with each other using Code Division Multiplexing (CDM) or Frequency Division Multiplexing (FDM).

Physical downlink shared channel (PDSCH) 215: The PDSCH is data channel transmitted via a downlink, which is used by an eNB to transmit traffic to a UE and is transmitted using an RE not used for reference signal transmission in the data region of FIG. 2.

Channel status information Reference Signal (CSI-RS) 219: The CSI-RS is a reference signal transmitted for UEs included in a single cell and is used in measuring a channel status. A plurality of CSI-RSs may be transmitted in a single cell.

Other control channels (PHICH, PCFICH, and PDCCH) 217: Control channels for provision of control information necessary for reception of a PDSCH by a UE or for transmission of an ACK/NACK for operation of HARQ with respect to uplink data transmission.

In addition to the signal, the LTE-A system may configure muting so that UEs in a corresponding cell may receive a CSI-RS that is transmitted from another eNB without interference. Muting may be applied to a location where the CSI-RS may be transmitted, and generally, the UE may skip the corresponding radio resources and receive a traffic signal. In the LTE-A system, muting is also referred to as zero-power CSI-RS. Muting is applied equally to the location of the CSI-RS due to the characteristic of muting, since transmission power is not transmitted.

In FIG. 2, a CSI-RS may be transmitted using some of the locations expressed as A, B, C, D, E, E, F, G, H, I, and J, based on the number of antennas that transmit a CSI-RS. Also, muting may be applied to some of the locations expressed as A, B, C, D, E, E, F, G, H, I, and J. Particularly, a CSI-RS may be transmitted through 2, 4, and 8 REs, based on the number of antenna ports.

When the number of antenna ports is 2, a CSI-RS is transmitted through half of a predetermined pattern in FIG. 2. When the number of antenna ports is 4, a CSI-RS is transmitted through the whole of a predetermined pattern. When the number of antennas is 8, a CSI-RS is transmitted using two patterns. Conversely, muting is always executed based on a single pattern. That is, muting may be applied to a plurality of patterns but may not be applied to a part of a single pattern when the location of muting and the location of a CSI-RS do not overlap each other. However, when the location of muting and the location of a CSI-RS overlap each other, muting may be applied to a part of a single pattern.

When a CSI-RS is transmitted to two antenna ports, the CSI-RS may transmit signals of the respective antenna ports through two REs that are consecutive in the time axis, and the signal of each antenna port is distinguished by an orthogonal code. This means that two CSI-RS ports are subjected to code division multiplexing (CDM-2). When a CSI-RS is transmitted to four antenna ports, two more REs are used in addition to the CSI-RS for two antenna ports and signals for the remaining two antenna ports are additionally transmitted in the same manner. At this time, a pair of REs which have been subjected to CDM-2 are located in the same OFDM symbol and are mutually subjected to frequency division multiplexing (FDM). In the same manner, even when a CSI-RS is transmitted to 8 antenna ports, two pairs of REs which have been subjected to CDM-2 are subjected to FDM.

An eNB may boost the transmission power of a CSI-RS to improve channel estimation accuracy. When a CSI-RS is transmitted to four or eight Antenna Ports (APs), a particular CSI-RS port is transmitted only through a CSI-RS RE at a specified location and is not transmitted through other OFDM symbols within the same OFDM symbol.

FIG. 3 is a diagram illustrating an example of a CSI-RS RE mapping scheme for n-th and (n+1)-th PRBs when an eNB transmits eight CSI-RSs.

As shown in FIG. 3, when the location of a CSI-RS RE for 15th or 16th AP is the same as a check pattern shown in FIG. 3, in the CSI-RS RE for the remaining 17th to 22th APs indicated by the hatched pattern, the transmission power of the 15th or 16th AP is not used. Accordingly, as shown in FIG. 3, the 15th or 16th AP may use transmission power to be used for 3rd, 8th, and 9th subcarriers in the 2nd subcarrier. This natural power boosting enables the power of a 15th CSI-RS port transmitted through the 2nd subcarrier to be configured up to 6 dB be higher compared to the transmission power of the 15th AP used in the data RE. In each of the CSI-RS patterns of the current 2/4/8 ports, natural power boosting of 0/2/6 dB may be performed, and thus, each AP may transmit a CSI-RS through full power utilization.

In addition, a CSI-IM (or Interference Measurement Resource (IMR)) together with a CSI-RS can be allocated to a UE, and the CSI-IM resource has the same resource structure and location as those of the CSI-RS supporting 4 ports. The CSI-IM is a resource for a UE that receives data from one or more eNBs to accurately measure interference from an adjacent eNB.

For example, when it is desired to measure an amount of interference when an adjacent eNB transmits data and an amount of interference when it does not transmit data, the corresponding eNB configures a CSI-RS and two CSI-IM resources. Here, one CSI-IM causes the adjacent eNB to always transmit signals and the other CSI-IM causes the adjacent eNB not to always transmit signals so that it is possible to effectively measure an amount of interference of the adjacent eNB.

In a cellular system, an eNB should transmit a reference signal to a UE in order to measure a downlink channel status. In the case of an LTE-A system, a UE measures a channel status between an eNB and the UE using a CRS or a Channel status information Reference Signal (CSI-RS) transmitted by the eNB. In association with the channel status, several factors need to be fundamentally considered, and an amount of interference in a downlink may be included therein. The amount of interference in a downlink may include an interference signal generated by an antenna that belongs to a neighboring eNB, a thermal noise, and the like, which is important when a UE determines the channel status of the downlink.

For example, when an eNB having a single transmission antenna executes signal transmission with respect to a UE having a single reception antenna, the UE may determine Es/Io by determining energy per symbol that can be received via a downlink and an amount of interference that is to be simultaneously received in a section where the corresponding symbol is received, using a reference signal received from the eNB. The determined Es/Io is converted into a data rate or a value corresponding thereto, and is notified to the eNB in the form of a Channel Quality Indicator (CQI), thereby enabling the eNB to determine a data rate at which transmission is to be performed with respect to a UE in a down link.

In the case of the LTE-A system, the UE feeds back information associated with a channel status of a downlink to the eNB so that the eNB utilizes the same for downlink scheduling. That is, the UE measures a reference signal that the eNB transmits, and feeds back, to the eNB, information extracted from the measured reference signal in a form defined in the LTE/LTE-A standard. In LTE/LTE-A, information that the UE feeds back briefly includes the following three types of information.

Rank Indicator (RI): the number of spatial layers that a UE can receive in a current channel status Precoder Matrix Indicator (PMI): Indicator for a preferred precoding matrix of a UE in a current channel status Channel Quality Indicator (CQI): maximum data rate that a UE can receive in a current channel status. The CQI may be replaced with an SINR, a maximum error correction code rate, a modulation scheme, data efficiency per frequency, and the like, which may be utilized similar to the maximum data rate.

The RI, PMI, and CQI are interrelated. For example, a precoding matrix supported in LTE/LTE-A may be defined to be different for each rank. Therefore, a PMI value when the RI has a value of 1 and a PMI value when the RI has a value of 2 are interpreted differently even if the values are the same. Further, even when a UE determines a CQI, it is assumed that a rank value and the PMI value, which are made known to the eNB by the UE itself, are applied to the eNB. That is, in the case in which the UE notifies the eNB of RI_X, PMI_Y, and CQI_Z, when the corresponding rank is RI_X and the corresponding precoding is PMI_Y, it means that the UE can receive data at a data rate corresponding to CQI_Z. As described above, when the UE calculates a CQI, the UE assumes a transmission scheme to be executed with respect to the eNB so that the UE may obtain optimal performance when the UE actually executes transmission using the corresponding transmission scheme.

DETAILED DESCRIPTION OF THE INVENTION

Technical Problem

In the case of an eNB having a large-scale antenna for performing channel information generation and reporting, a reference signal resource for measuring channels of 8 or more antennas must be configured and transmitted to a UE. As shown in FIG. 2, the available CSI-RS resources can use up to 48 REs, but it is only possible to configure up to 8 CSI-RSs per cell at present. Accordingly, a new CSI-RS configuring method is needed to support an FD-MIMO system capable of operating based on 8 or more CSI-RS ports.

One of problems that can occur when the 8 or more CSI-RS ports is configured is CSI-RS power boosting for full power utilization. When the CSI-RS ports are mapped using a CDM-2 based FDM scheme as in the current LTE/LTE-A standard, CSI-RS power boosting of about 7.78 dB for 12 ports and 9 dB for 16 ports should be performed so that full power utilization may be performed. On the other hand, CSI-RS power boosting of too high level, for example, 6 dB or more, requires a very large difference between the transmission power in an adjacent data RE and the transmission power in a CSI-RS RE. This poses a great burden on a power amplifier of the eNB and poses a risk of affecting the reception performance of the adjacent data RE.

As the demand for dynamic precoding in the vertical direction increases, the discussion about FD-MIMO composed of Uniform Planar Array (UPA) antenna ports is becoming more active.

According to an aspect of the present disclosure, provided are a method and apparatus for configuring a variable number of CSI-RSs by improving a current CSI-RS configuration method, which is limited to {(1 or 2), 4, and 8}.

According to another aspect of the present disclosure, provided are various CDM-4-based CSI-RS mapping methods and apparatuses for coping with problems that can occur when a plurality of CSI-RSs is configured.

According to still another aspect of the present disclosure, provided are a CSI-RS mapping method and apparatus via CDM-2/CDM-4 switching.

According to yet another aspect of the present disclosure, provided are a CSI-RS port index mapping method and apparatus.

According to a further aspect of the present disclosure, provided are a method and apparatus for generating channel status information and sharing the generated channel status information to perform efficient data transmission/reception in an LTE-A-based FD-MIMO system.

According to a further aspect of the present disclosure, provided are a method and apparatus in which an eNB notifies a UE of configuration information on a plurality of CSI-RSs in order to perform high-efficiency data transmission/reception in an FD-MIMO system, and in which a UE generates feedback information in accordance with the configuration information.

Technical Solution

In accordance with an aspect of a first disclosure, there is provided a method in which an eNB transmits a reference signal in a radio communication system using a plurality of antenna ports, including: mapping radio resources for reference signal transmission to a plurality of antenna ports for the reference signal transmission; and transmitting the reference signal to a UE through the mapped antenna ports, using the radio resources, wherein the mapping is performed based on a combination of a first mapping pattern between the radio resources and the antenna ports and a second mapping pattern between the radio resources and the antenna ports.

In accordance with another aspect of the first disclosure, there is provided a method in which a UE receives a reference signal in a radio communication system using a plurality of antenna ports, including: receiving reference signal configuration information including a mapping relationship between radio resources for reference signal reception and a plurality of antenna ports for the reference signal reception, from an eNB; and receiving the reference signals from the eNB through the mapped antenna ports, using the radio resources based on the reference signal configuration information, wherein the mapping relationship is determined based on a combination of a first mapping pattern between the radio resources and the antenna ports and a second mapping pattern between the radio resources and the antenna ports.

In accordance with still another aspect of the first disclosure, there is provided an eNB device in which an eNB transmits a reference signal in a radio communication system using a plurality of antenna ports, including: a controller configured to map radio resources for reference signal transmission to a plurality of antenna ports for the reference signal transmission; and a transmission and reception unit configured to transmit the reference signal to a UE through the mapped antenna ports, using the radio resources, wherein the controller performs the mapping based on a combination of a first mapping pattern between the radio resources and the antenna ports and a second mapping pattern between the radio resources and the antenna ports.

In accordance with yet another aspect of the first disclosure, there is provided a UE device which receives a reference signal in a radio communication system using a plurality of antenna ports, including: a transmission and reception unit configured to receive reference signal configuration information including a mapping relationship between radio resources for reference signal reception and a plurality of antenna ports for the reference signal reception from an eNB, and to receive the reference signals from the eNB through the mapped antenna ports, using the radio resources based on the reference signal configuration information; and a controller configured to control reception of the transmission and reception unit, wherein the mapping relationship is determined based on a combination of a first mapping pattern between the radio resources and the antenna ports and a second mapping pattern between the radio resources and the antenna ports.

In accordance with a further aspect of a second disclosure and a third disclosure, there is provided a method in which an eNB receives feedback information in a radio communication system, including: transmitting configuration information on each of at least one reference signal to a UE; measuring the at least one reference signal, and transmitting feedback configuration information for generating feedback information according to the measurement result to the UE; transmitting the at least one reference signal to the UE; and receiving the feedback information transmitted from the UE at a feedback timing according to the feedback configuration information.

In accordance with a further aspect of the second disclosure and the third disclosure, there is provided an eNB device that receives feedback information from a UE in a radio communication system, including: a transceiver configured to transmit and receive a signal to and from a UE; and a controller configured to control to transmit configuration information on each of at least one reference signal to the UE, to measure the at least one reference signal, to transmit feedback configuration information for generating feedback information according to the measurement result, to transmit the at least one reference signal to the UE, and to receive the feedback information transmitted from the UE at a feedback timing according to the feedback configuration information.

In accordance with a further aspect of the second disclosure and the third disclosure, there is provided a method in which a UE transmits feedback information in a radio communication system, including: receiving configuration information on each of at least one reference signal from an eNB; measuring the at least one reference signal, and receiving feedback configuration information for generating feedback information according to the measurement result from the eNB; receiving the at least one reference signal from the eNB; measuring the received at least one reference signal, and generating the feedback information according to the feedback configuration information; and transmitting the generated feedback information to the eNB at a feedback timing according to the feedback configuration information.

In accordance with a further aspect of the second disclosure and the third disclosure, there is provided a UE device which transmits feedback information to an eNB in a radio communication system, including: a transceiver configured to transmit and receive a signal to and from an eNB; and a controller configured to control to receive configuration information on each of at least one reference signal from the eNB, to measure the at least one reference signal, to receive feedback configuration information for generating feedback information according to the measurement result from the eNB, to receive the at least one reference signal from the eNB, to measure the received at least one reference signal, to generate feedback information according to the feedback configuration information, and to transmit the generated feedback information to the eNB at a feedback timing according to the feedback configuration information.

BRIEF DESCRIPTION OF DRAWINGS

The above and other aspects, features and advantages of the present disclosure will be more apparent from the following detailed description taken in conjunction with the accompanying drawings, in which:

FIG. 7 is a diagram illustrating an example of a table including location information of a CSI-RS transmitted from an eNB to a UE according to a first embodiment of a first disclosure;

FIGS. 27A and 27B illustrate an example of CSI process configuration and CSI reporting configuration in the TM 10 explained in FIG. 25;

MODE FOR CARRYING OUT THE INVENTION

Figure 1:
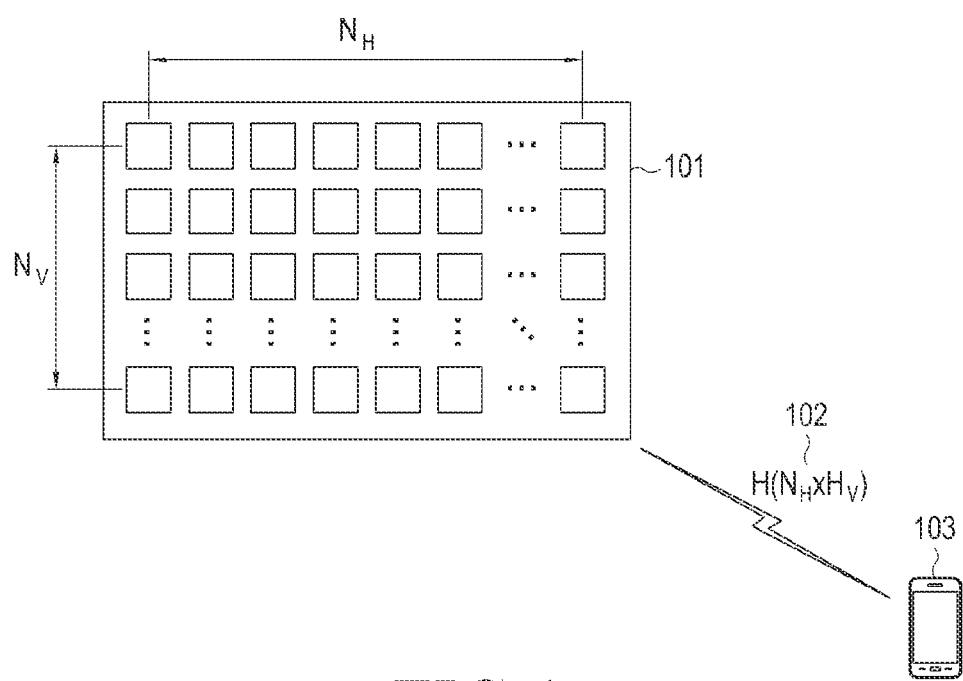
FIG. 1 is a diagram illustrating an FD-MIMO antenna system.

In the following description of the present disclosure, a detailed description of known configurations or functions incorporated herein will be omitted when it is determined that the detailed description may make the subject matter of the present disclosure unclear. Hereinafter, embodiments of the present disclosure will be described in detail with reference to the accompanying drawings.

Although embodiments of the present disclosure described below will be divided for the convenience of description, two or more embodiments may be combined within the range where the embodiments do not collide each other.

Meanwhile, terms described later are defined in consideration of the functions of the present disclosure, but the meaning of the terms may be changed according to a user, intention of an operator, or convention. Therefore, the definitions of the terms should be made based on the contents throughout the specification.

The present disclosure may have various modifications and various embodiments, among which specific embodiments will now be described more fully with reference to the accompanying drawings. However, it should be understood that there is no intent to limit the present disclosure to the particular forms disclosed, but on the contrary, the present disclosure is to cover all modifications, equivalents, and alternatives falling within the spirit and scope of the disclosure.

Although the terms including an ordinal number such as first, second, etc. can be used for describing various elements, the structural elements are not restricted by the terms. The terms are used merely for the purpose to distinguish an element from the other elements. For example, a first element could be termed a second element, and similarly, a second element could be also termed a first element without departing from the scope of the present disclosure. As used herein, the term "and/or" includes any and all combinations of one or more associated items.

The terms used herein are used only to describe particular embodiments, and are not intended to limit the present disclosure. As used herein, the singular forms are intended to include the plural forms as well, unless the context clearly indicates otherwise. In the present disclosure, the terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Unless defined otherwise, all terms used herein, including technical and scientific terms, have the same meaning as those commonly understood by a person of ordinary skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in the present specification.

Hereinafter, various embodiments will be described with reference to the accompanying drawings. It should be noted that the same elements will be designated by the same reference numerals although they are shown in different drawings. Further, in the following description of the present disclosure, a detailed description of known functions and configurations incorporated herein will be omitted when it may make the subject matter of the present disclosure rather unclear. In the following description, it is noted that only structural elements necessary for understanding operations according to various embodiments will be described, and the description of the other elements will be omitted in order to prevent obscuring of the subject matter of the present disclosure.

An apparatus and a method provided by an embodiment of the present disclosure can be applied to various communication systems, such as a Long Term Evolution (LTE) mobile communication system, a LTE-Advanced (LTE-A) mobile communication system, a High Speed Downlink Packet Access (HSDPA) mobile communication system, a High Speed Uplink Packet Access (HSUPA) mobile communication system, a High Rate Packet Data (HRPD) mobile communication system of 3rd Generation Project Partnership 2 (3GPP2), a Wideband Code Division Multiple Access (WCDMA) mobile communication system 3GPP2, a Code Division Multiple Access (CDMA) mobile communication system of 3GPP2, Institute of an Electrical and Electronics Engineer (EEEE) 802.16m communication system, an Evolved Packet System (EPS), a Mobile Internet Protocol (Mobile IP) system and the like.

Further, the detailed description of embodiments of the present disclosure is made mainly based on a wireless communication system based on OFDM, particularly 3GPP EUTRA standard, but the subject matter of the present disclosure can be applied to other communication systems having a similar technical background and channel form after a little modification without departing from the scope of the present disclosure and the above can be determined by those skilled in the art.

Three disclosures will be described herein.
<First Disclosure>
The main contents of the first disclosure are as follows.
In the first disclosure, an eNB may configure one of a plurality of Code Division Multiplication (CDM) patterns.

The CDM pattern includes a CDM-2 or a CDM-4. Also, the CDM-4 may be configured in various manners in the first disclosure.

In addition, in the first disclosure, the eNB may configure a plurality of time-frequency resources used in 2-/4-/8-port CSI-RSs defined in a current LTE-A standard per CSI process to a UE for the operation of the CSI-RS, and may combine the plurality of configured time-frequency resources to transmit 12-/16-port CSI-RSs. At this time, the eNB may notify the UE through upper layer signaling whether the 12-/16-port CSI-RS is based on CDM-2 or CDM-4.

As described above, in an FD-MIMO system, an eNB must configure a reference signal resource for measuring a channel of 8 or more antennas and transmit the reference signal resource to the UE. In this case, the number of reference signals may differ according to an eNB antenna configuration and measurement type.

Figure 4:
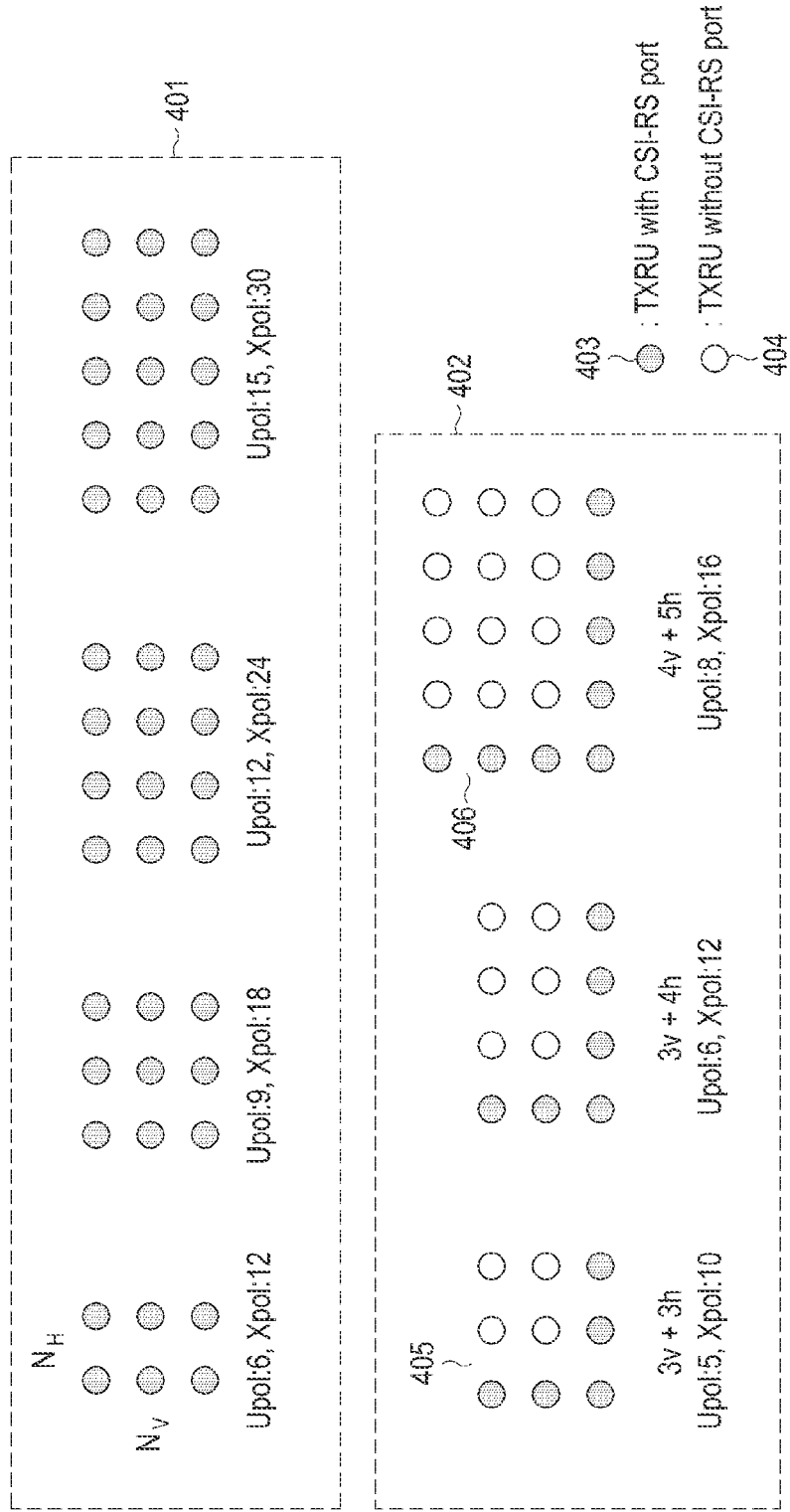
FIG. 4 is a diagram illustrating an example of a CSI-RS configuration according to an antenna configuration and a measurement type of an FD-MIMO antenna system.

FIG. 4 is a diagram illustrating an example of a CSI-RS configuration according to an antenna configuration and a measurement type of an FD-MIMO antenna system.

Reference numeral 401 denotes the number of CSI-RSs for the case of a "full measurement" that estimates a CSI-RS port for all TXRUs used for data transmission. As shown in reference numeral 401, it can be seen that various numbers of CSI-RSs are required depending on the number NH of eNB horizontal direction ports, the number Nv of vertical direction ports, and the presence and absence of a polarization antenna.

Reference numeral 402 denotes the number of CSI-RSs in the case of a "partial measurement" for estimating a CSI-RS port for some of TXRUs used for data transmission. In reference numeral 402, the eNB includes a TXRU 403 for estimating a channel through a CSI-RS and a TXRU 404 to which a CSI-RS is not allocated and which does not estimate a channel. Reference numeral 402 is an example of CSI-RS puncturing, and a pattern in which channel estimation is omitted is not limited by the contents shown in reference numeral 402.

The partial measurement as in reference numeral 402 has a disadvantage in that an error of channel estimation becomes larger than that in the full measurement, but it has an advantage that a CSI-RS resource can be saved considerably. When partial channel estimation is performed using a total of 5 CSI-RSs as shown in reference numeral 405, 3 CSI-RS ports in the horizontal direction are used for determining channel information in the horizontal direction and 3 CSI-RS ports in the vertical direction are used for determining channel information in the vertical direction. When an array is large and a cross-polarization antenna is used, reference numeral 406 indicates that a large number of CSI-RSs are required even if a partial measurement is performed. As described above, since up to 8 CSI-RSs can be configured per eNB in the current system, a new CSI-RS configuration method for supporting the FD-MIMO system is required. Meanwhile, the following two schemes for configuring 8 or more CSI-RSs are possible.

Figure 5:
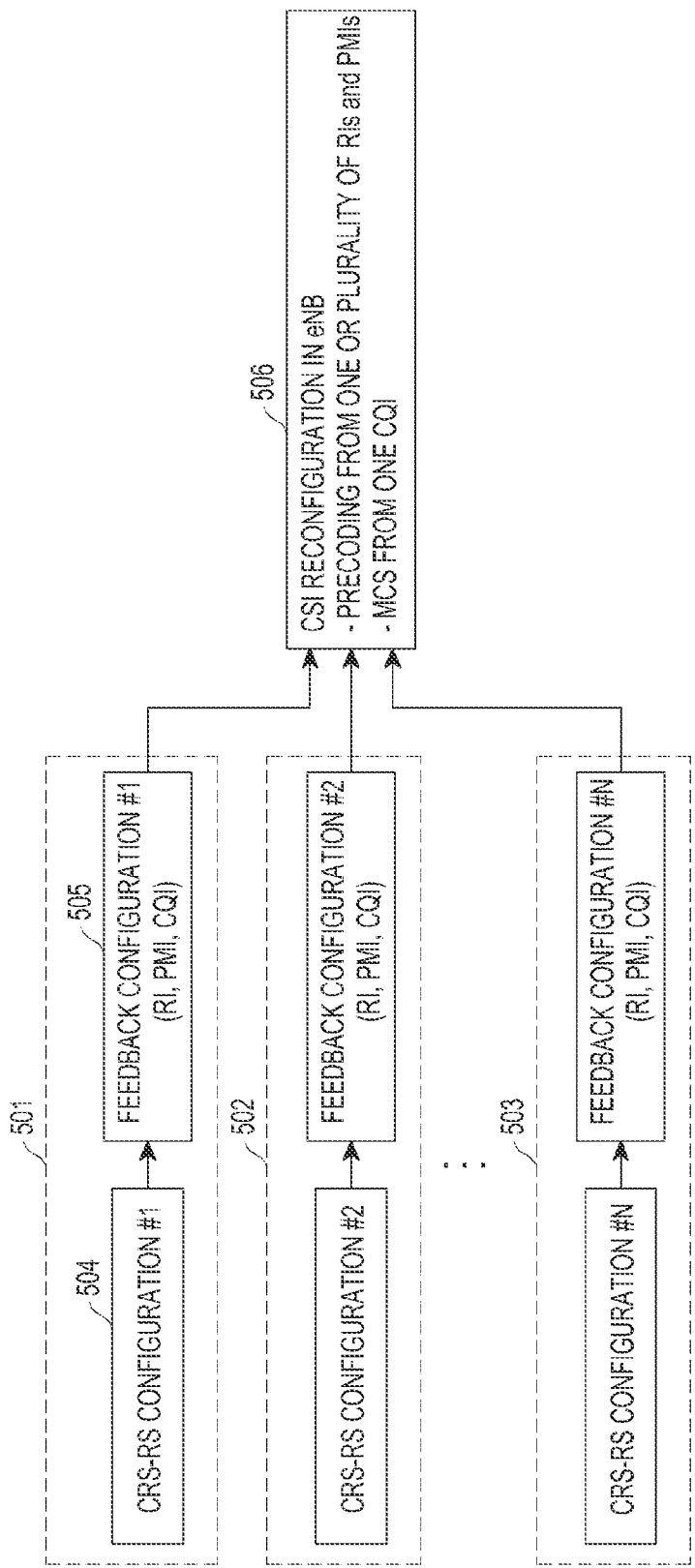
FIG. 5 is a diagram illustrating a scheme 1 for configuring 8 or more CSI-RSs.

<Scheme 1>
FIG. 5 is a diagram illustrating a scheme 1 for configuring 8 or more CSI-RSs.

The scheme 1 is a scheme of configuring a plurality of CSI processes defined in the existing LTE-A standard. That is, the eNB configures a plurality of existing CSI processes capable of supporting up to 8 CSI-RSs, so that the UE can estimate channel information on a large number of CSI-RS ports. In FIG. 5, reference numerals 501, 502, . . . , and 503 indicate that a plurality of CSI processes are configured.

Here, RI, PMI, and CQI (e.g., 505) corresponding to each CSI process may be associated with each other by presetting. For example, when a CSI process 1 represents channel information on a horizontal direction and a CSI process 2 represents channel information on a vertical direction, reported PMI 1 and PMI 2 are subjected to Kronecker-product and the result may be used as a precoding matrix for the entire channel. At this time, a joint CQI may be a product of CQI1 and CQI2 (506).

In the case of the scheme 1, since the existing CSI process is used as is in detail, there is an advantage that it is not necessary to newly configure the CSI-RS pattern for the FD-MIMO system. However, in order to use the scheme 1, there is a disadvantage in that a CQI is reported after being divided according to a predetermined rule for each CSI process or a new joint CQI must be defined.

<Scheme 2: Configure a Single CSI Process Including a Plurality of CSI-RS Configurations (see FIG. 6)

Figure 6:
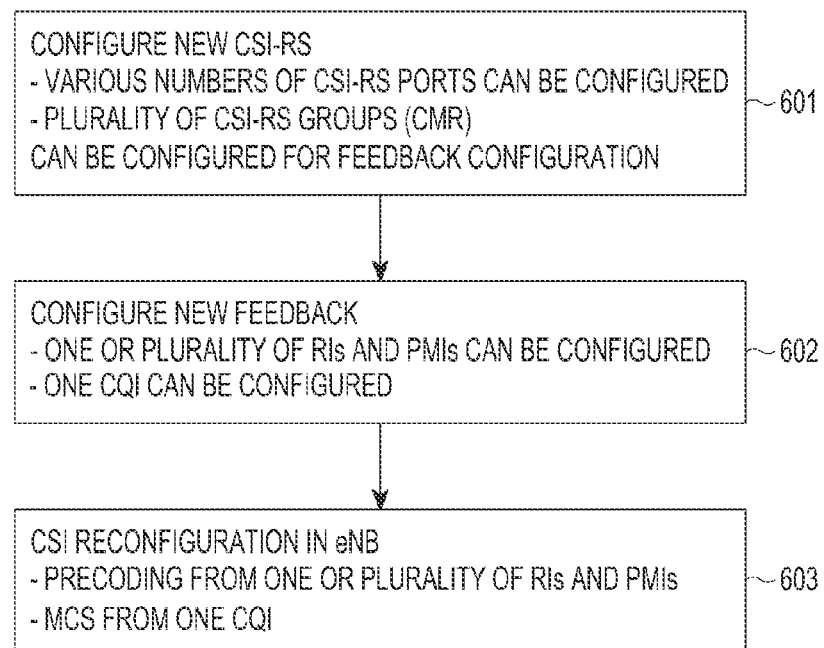
FIG. 6 is a diagram illustrating a scheme 2 for configuring 8 or more CSI-RSs.

FIG. 6 is a diagram illustrating a scheme 2 for configuring 8 or more CSI-RSs.

The scheme 2 is a scheme of configuring a single CSI process including multiple CSI-RS configurations. That is, an eNB configures at least 8 CSI-RS ports to be included one CSI process, and transmits "CSI-RS port configuration information", which is information of the configured CSI-RS port information, to a UE (601). The CSI-RS port configuration information may include at least one of information on an RE location of each port, information on a port configuration pattern, and information related to an existing CSI-RS group.

The UE generates feedback information such as RI, PMI, and CQI based on the CSI-RS port configuration information and preset feedback configuration information. At this time, the rank and direction of the channel may be reported as one or more Ms and PMIs according to predetermined rules. The channel quality may be divided into a plurality of CQIs and reported. However, since a plurality of CSI-RSs is directly related to one feedback configuration in the scheme 2, the channel quality may be reported with one CQI even when the joint CQI is not newly defined (603). However, in the scheme 2, the plurality of CQIs can be used.

As described above, in the scheme 2, there is an advantage that the existing CQI can be used as is without needing to define a new CQI. However, it is necessary to design a new CSI-RS pattern or a new CSI-RS configuration method.

A specific CSI-RS configuration method for the scheme 2, a channel information generation method, and a channel information reporting method in a UE according to the specific CSI-RS configuration method will be described with reference to embodiments described below.

First Embodiment of First Disclosure

FIG. 7 is a diagram illustrating an example of a table including location information of a CSI-RS transmitted from an eNB to a UE according to a first embodiment of a first disclosure.

In the 3GPP TS 36.211 standard, it is possible for an eNB to inform a UE of the location of a CSI-RS resource using a table of FIG. 7. In FIG. 7, (k', l') represents a start subcarrier and a start symbol location of the CSI-RS resource according to CSI-RS configuration. The eNB may indicate the start position and the end position of the CSI-RS resource or may notify the UE of the start position of the CSI-RS resource and the size of the CSI-RS resource based on the same rule as the example of FIG. 7.

One method using the table of FIG. 7 is to assign CSI-RS port indexes in ascending or descending order to CSI-RS configuration for one or two CSI-RSs from the starting position.

Figure 8:
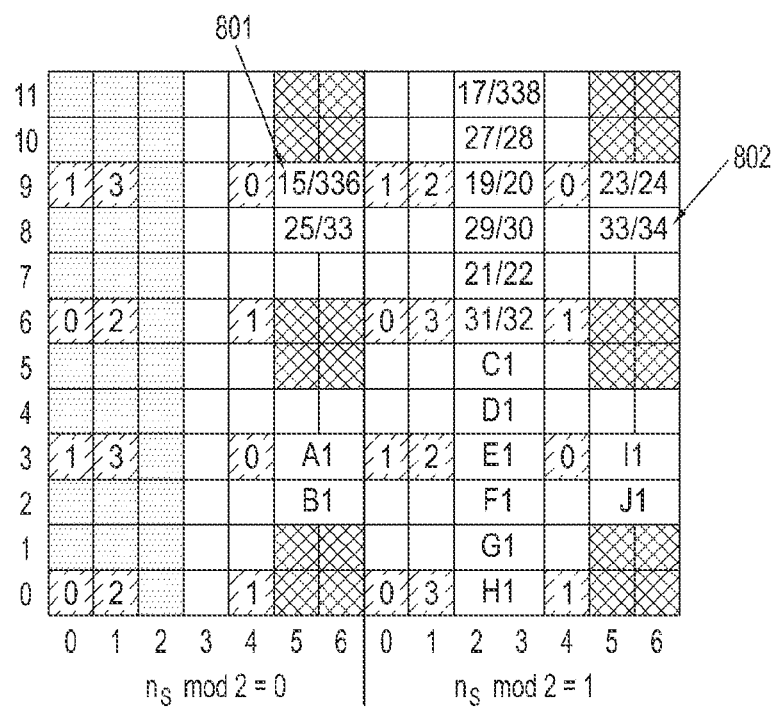
FIG. 8 is a diagram illustrating an example in which CSI-RS port indexes are allocated to CSI-RS configuration in ascending order when the number of CSI-RS ports is 16 and <CSI-RS configuration=0, (k'=9, l'=5), and $n_s$ mod 2-0> are configured as a start position; p

FIG. 8 is a diagram illustrating an example in which CSI-RS port indexes are allocated to CSI-RS configuration in ascending order when the number of CSI-RS ports is 16 and <CSI-RS configuration=0, (k'=9, l'=5), and $n_s$ mod 2-0> are configured as a start position.

Reference numeral 801 denotes a start position of the CSI-RS resource, and reference numeral 802 denotes an end position calculated according to the configuration. Meanwhile, the value of the end position 802 may be directly notified to the UE by the eNB as in the value of the start position 801.

Second Embodiment of First Disclosure

It is possible to combine a plurality of legacy CSI-RS configurations to configure various numbers of CSI-RS ports. When a UE receives a plurality of pieces of CSI-RS configuration information in one CSI process, an eNB may instruct the UE to generate channel information by associating the plurality of pieces of received CSI-RS configuration information with each other.

Figure 9:
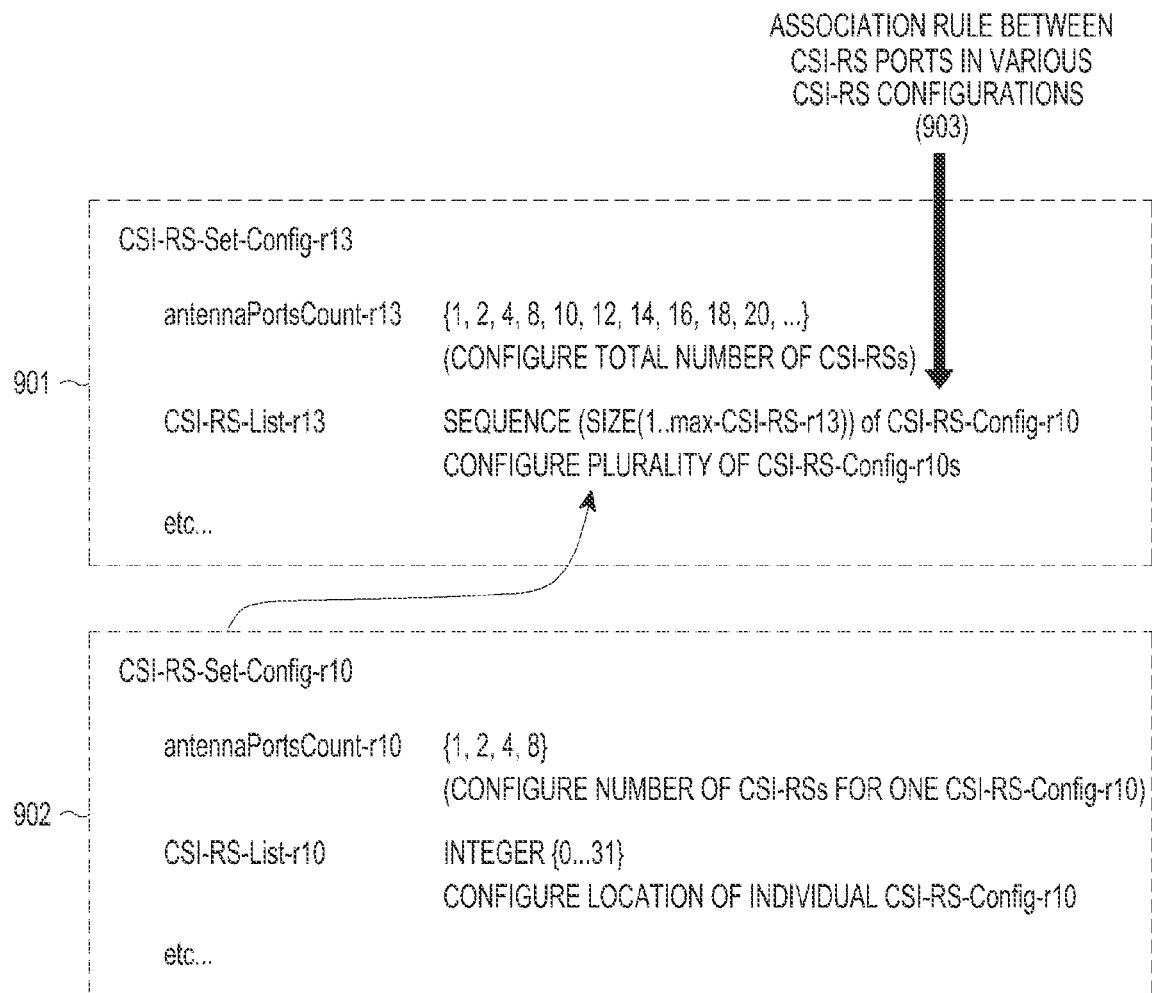
FIG. 9 is a diagram illustrating an example of a configuration method for associating a plurality of CSI-RS configurations with one CSI process according to a second embodiment of the first disclosure.

FIG. 9 is a diagram illustrating an example of a configuration method for associating a plurality of CSI-RS configurations with one CSI process according to a second embodiment of the first disclosure.

As shown in FIG. 9, a new CSI-RS configuration 901 may designate various numbers of CSI-RS ports through antennaPortsCount-r13, and the precise location of each CSI-RS port can be known through a plurality of legacy CSI-RS configurations (902). At this time, the total number of CSI-RS ports may be a sum of "antennaPortsCount-r10", which is the number of CSI-RS ports in the individual legacy CSI-RS configuration. In FIG. 9, terms such as CSI-RS-SetConfig-r13 and CSI-RS-Config-r10 are used for convenience of description, and may be expressed differently when applied to an actual system.

Figure 10:
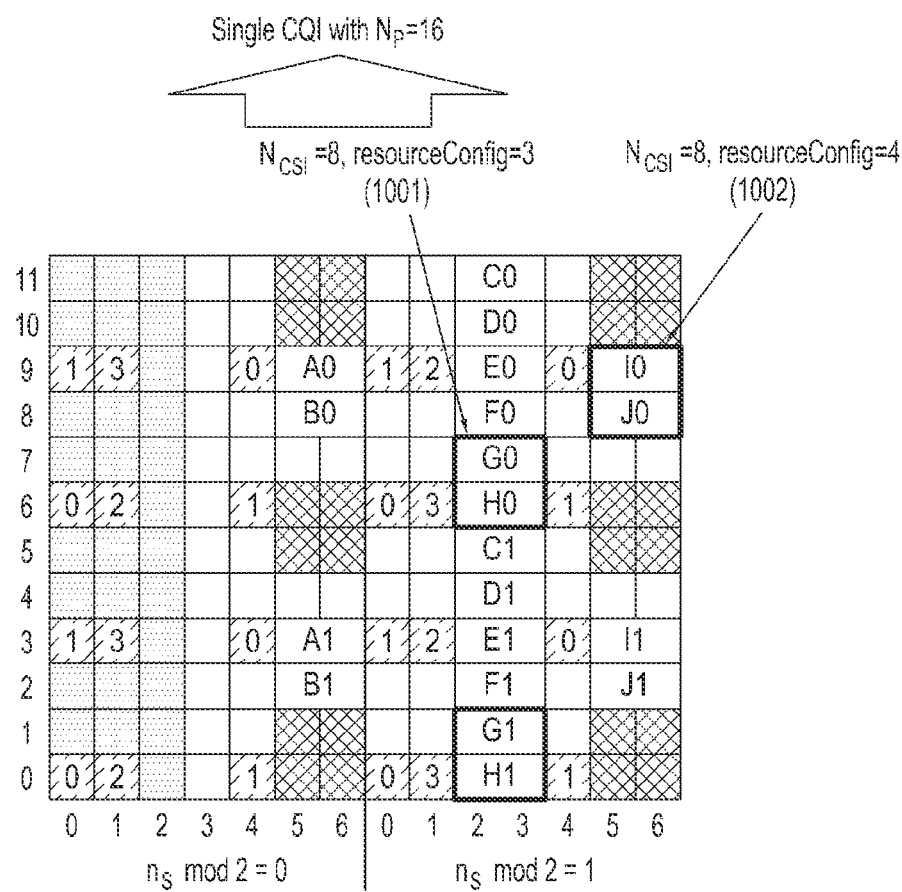
FIG. 10 is a diagram illustrating an example in which a CSI is generated using a plurality of CSI-RS resource locations when two CSI-RSs are configured as in <$N_{CSI}$=8, resourceConfig=3>, <$N_{CSI}$=8 and resourceConfig=4>according to the second embodiment of the first disclosure.

FIG. 10 is a diagram illustrating an example in which a CSI is generated using a plurality of CSI-RS resource locations when two CSI-RSs are configured as in <$N_{CSI}$=8, resourceConfig=3>, <$N_{CSI}$=8 and resourceConfig=4>according to the second embodiment of the first disclosure.

FIG. 10 is based on the assumption that the resource location configured in FIG. 7 is used. A UE may generate a CQI by measuring 16 CSI-RS ports included in resources indicated by reference numerals 1001 and 1002.

$N_{CSI}$ is the number of CSI-RS ports included in each configuration (corresponding to antennaPortCount-r10 in FIG. 9), and $N_P$ is the total number of CSI-RS ports (corresponding to antennaPortCount-r13 in FIG. 9).

As described in FIGS. 9 and 10, when channel status information is generated using the plurality of CSI-RS configurations, a rule for associating the CSI-RS ports included in each CSI-RS configuration with each other is required. One rule for associating the CSI-RS ports with each other is to count the CSI-RS port indexes in ascending/descending order with respect to the configuration indexes such as $N_{CSI}$ and "resourceConfig".

For example, it is assumed that, in one CSI-RS-SetConfig-r13, $N_P$=4 and the following three CSI-RS configurations are configured.

[config. 0: {$N_{CSI}$=4, resourceConfig=0}, config. 1: {$N_{CSI}$=8, resourceConfig=3}, config. 2: {$N_{CSI}$=4, resourceConfig=4}]

Assuming that the CSI-RS ports are aligned in ascending order with respect to the configured indexes in the situation of the above example, the UE may assume that each CSI-RS configuration includes CSI-RS of the following index.

config. 0: CSI-RS port of {15,16,17,18}
config. 1: CSI-RS port of {23,24,25,26,27,28,29,30}
config. 2: CSI-RS port of {19,20,21,22}

Here, it is assumed that the CSI-RS port index starts from 15 as in the conventional LTE/LTE-A system.

As another example, each CSI-RS port may be aligned in ascending/descending order according to the order of the CSI-RS configuration. According to this, in the situation of the above example, the CSI-RS ports will be mapped to each CSI-RS configuration as follows.

config. 0: CSI-RS port of {15,16,17,18}
config. 1: CSI-RS port of {19,20,21,22,23,24,25,26},
config. 2: CSI-RS port of {27,28,29,30}

As another example, the eNB may arbitrarily allocate the order of the CSI-RS configuration to the UE. For example, in the order of config.2-config.0-config.1, the CSI-RS ports will be mapped to each CSI-RS configuration as follows.

config. 0: CSI-RS port of {19, 20, 21, 22}
config. 1: CSI-RS port of {23,24,25,26,27,28,29,30}
config. 2: CSI-RS port of {15,16,17,18}

According to the first disclosure, the resource locations indicated by the individual CSI-RS configurations included in one CSI-RS-Set-Config-r13 should not overlap. However, the eNB may configure some CSI-RS resources to overlap by a specific intention. For example, when one or two CSI-RS resources are configured to overlap, the UE may determine that the CSI-RS ports at the corresponding locations are reference points that are used simultaneously to generate horizontal and vertical channel status information.

In the above-described examples, the location of a specific CSI-RS port according to an individual CSI-RS configuration may be determined according to FIG. 7 described above and Equation 1 below.

[Equation 1]

$$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l' + \begin{cases} l'' & \text{CSI reference signal configurations 0-19, normal cyclic prefix} \\ 2l'' & \text{CSI reference signal configurations 20-31, normal cyclic prefix} \\ l'' & \text{CSI reference signal configurations 0-27, extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

-continued $$m' = m + \left\lfloor \frac{N_{RB}^{max,DL} - N_{RB}^{DL}}{2} \right\rfloor$$

In Equation 1, p denotes a CSI-RS port index within the individual CSI-RS configuration, and when it is assumed the actual CSI-RS port index of the corresponding CSI-RS configuration is {p0, p1, . . . , pNcz}, p for the n-th port of the CSI-RS configuration may be calculated as Equation 2 below.

$$P = P_n - P_0 + 15$$ [Equation 2]

In the above examples, the CSI-RS port index is sequentially increased because it is assumed that a full port measurement is performed. However, when a partial port measurement is performed, the CSI-RS port index may be discontinuously increased. This will be described later.

Third Embodiment of First Disclosure

The third embodiment of the first disclosure is a method in which an eNB informs a UE of CSI-RS resource location information using a bitmap.

It is assumed that, when 20 resource locations can be configured based on two ports, resources that can be used as the CSI-RS are A0 to J1 as shown in FIG. 9. The eNB transmits a bitmap including information on whether each resource is allocated to a UE using a high layer, for example, RRC signaling or L1 signaling, so that the location information of the resource to which the CSI-RS is transmitted may be known to the UE. For example, in the case in which 1-bit information is used, a method in which when the value of the corresponding bit is "1", it indicates that a CSI-RS is allocated to the corresponding resource, and when the value of the corresponding bit is "0", it indicates that a CSI-RS is not allocated to the corresponding resource may be used. The bitmap indicating the location of the resources configured in FIG. 9 may be expressed as shown in the following example.

[A0, A1, B0, B1, C0, C1, D0, D1, E0, E1, F0, F1, G0, G1, H0, H1, I0, I1, J0, J1]=[1, 1, 0, 0, 0, 0, 0, 0, 0, 0, 0, 0, 1, 1, 1, 1, 1, 1, 1, 1]

As another example, when 10 resource locations can be configured based on 4 ports, the bit map indicating the location of the resources configured in FIG. 9 may be expressed as follows.

[A0-A1, B0-B1, C0-C1, D0-D1, E0-E1, F0-F1, G0-G1, H0-H1, J0-J1]=[1, 0, 0, 0, 0, 0, 0, 0, 1, 1]

As another example, when 5 resource locations can be configured based on 8 ports, the bit map indicating the location of the resources configured in FIG. 9 may be expressed as follows.

[A0-A1-B0-B1, C0-C1-D0-D1, E0-E1-F0-F1, G0-G1-H0-H1, I0-I1-J0-J1]=[1, 0, 0, 1, 1]

As shown in the example based on the 8 ports, it is obvious that the CSI-RS can be transmitted in a smaller number of REs than the configured resources. For example, according to the 8-port-based bitmap, A0-A1-B0-B1 resource is reported to be used, but as shown in the example of FIG. 9, the CSI-RS is transmitted only at an A0-A1 location and the CSI-RS is not transmitted at a B0--RS location.

In a CMR resource configuration through the bitmap, port index mapping may be sequentially ordered based on LSB or MSB of the bitmap. For example, as in the example of the 4-port example, it is assumed that the bitmap notifying the locations of the resources is configured as [A0-A1, B0-B1, C0-C1, D0-D1, E0-E1, F0- , H0-H1, J0-J1]=[1, 0, 0, 0, 0, 0, 0, 0, 1, 1]. At this time, when CSI-RS port index mapping is performed based on the Least Significant Bit (LSB) of the bitmap, the UE may know that CSI-RS ports 15, 16, 17, and 18 are mapped to J0-J1, CSI-RS ports 19, 20, 21, and 22 are mapped to and CSI-RS ports 23, 24, 25, and 26 are mapped to A0-A1. When CSI-RS port index mapping is performed based on the Most Significant Bit (MSB) of the bitmap, the order of the CSI-RS ports allocated to each 4-port CSI-RS resource will be reversed.

Fourth Embodiment of First Disclosure

The fourth embodiment of the first disclosure is a method of performing CSI-RS CDM-4 mapping based on the existing code division multiplication (CDM) -2 mapping.

When a CDM-2 is used for CSI-RS transmission as described above, two REs in one RB are used for transmission of one CSI-RS port. Therefore, power boosting of 10 $\log_{10}$ 16/4=6 dB is required for full power utilization in 12-port CSI-RS transmission, and a power boosting level for full power utilization in 16-port CSI-RS transmission is 10 $\log_{10}$ 16/2=9 dB.

On the other hand, when a CDM-4 is used for CSI-RS transmission, four REs in one RB are used for one CSI-RS port transmission. In this case, power boosting of 10 $\log_{10}$ 16/4=4.77 dB is required for full power utilization in 12-port CSI-RS transmission, and a power boosting level for full power utilization in 16-port CSI-RS transmission is 10 $\log_{10}$ 61/4=6 dB. This means that, when the CDM-4 is introduced, it is possible to support full power utilization for 12 or 16 ports with the same number as the power boosting level used in the transmission of 8 CSI-RSs in the current LTE/LTE-A standard.

In the fourth embodiment of the first disclosure, a CSI-RS CDM-4 mapping method based on the existing CSI-RS CDM-2 mapping is described.

Figure 11:
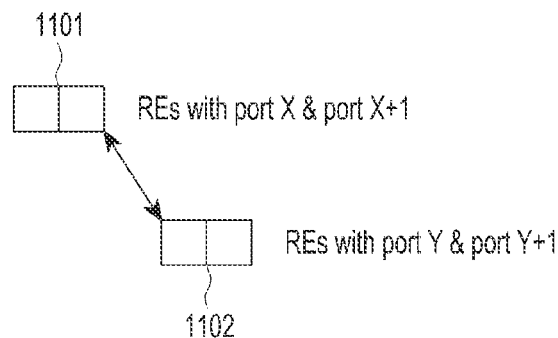
FIG. 11 is a diagram illustrating a mapping method of a fourth embodiment of the first disclosure.

FIG. 11 is a diagram illustrating a mapping method of a fourth embodiment of the first disclosure.

In the current LTE/LTE-A, an orthogonal code of a length 2 may be mapped according to a CSI-RS port number through $W_{1''}$ in FIG. 7 and Equation 1. For example, it is assumed that antenna ports X and X+1 are mapped to a first CDM-2 group 1101 of FIG. 11 based on FIG. 7 and Equation 1. At this time, the antenna port X may be mapped through an orthogonal code [1 1] and the antenna port X+1 may be mapped through an orthogonal code [1 -1].

Similarly, it is assumed that antenna ports Y and Y+1 are mapped to a second CDM-2 group 1102 of FIG. 11 based on FIG. 7 and Equation 1. At this time, the antenna port Y may be mapped through an orthogonal code [1 1] and the antenna port Y+1 may be mapped through an orthogonal code [1 -1].

It is assumed that, according to arbitrary criterion, the CDM-2 groups 1101 and 1102 are grouped into a CDM-4 group constituted of four REs. The sign of the orthogonal code allocated to the second CDM group 1102 based on, for example, the first CDM-2 group 1101 may be changed based on an existing length 2-orthogonal code, to generate a new length 4-orthogonal code.

For example, the existing orthogonal codes [1 1] and [1 -1] may be applied to all the antenna ports X, X+1, Y, and Y+1 in the first CDM-2 group 1101. On the other hand, in the second CDM-2 group 1102, the existing orthogonal codes [1 1] and [1 -1] are applied to the antenna ports X and X+1, and [-1 -1] and [-1 1] whose sign is changed in the existing orthogonal code may be applied to the antenna ports Y and Y+1. Consequently, in the example of FIG. 11, the antenna port X is mapped to the CDM-4 group through an orthogonal code [1 1 1 1], the antenna port X+1 is mapped to the CDM-4 group through an orthogonal code [1 -1 1 -1], the antenna port Y is mapped to the CDM-4 group through an orthogonal code [1 1 -1 -1], and the antenna port Y+1 is mapped to the CDM-4 group through an orthogonal code [1 -1 -1 1].

Fifth Embodiment of First Disclosure

The fifth embodiment of the first disclosure is a method of performing CDM-4 mapping on CSI-RS transmission through upper layer signaling.

A first scheme of the fifth embodiment is a method of instructing orthogonal code extension in frequency/time directions through a 1-bit indicator. That is, an eNB determines to extend the orthogonal code [1 1] or [1 -1] of length 2 for the existing CDM-2 in the frequency direction or in the time direction through higher layer signaling such as RRC configuration.

Figure 12:
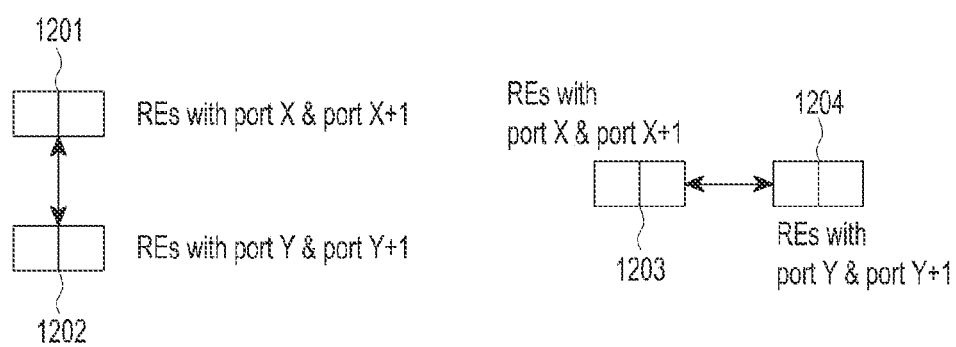
FIG. 12 is a diagram illustrating an example of a mapping method of the fifth embodiment of the first disclosure.

FIG. 12 is a diagram illustrating an example of a mapping method of the fifth embodiment of the first disclosure.

For example, when the value of the 1-bit indicator is 0, it means extension in the frequency direction. In this case, CDM-2 groups 1201 and 1202, which are composed of two pairs of REs adjacent to each other in the time direction, are grouped in the frequency direction and become a CDM-4 group composed of four REs. At this time, the CDM-2 groups 1201 and 1202 exist in different OFDM symbols. The criterion for selecting the CDM-2 groups 1201 and 1202 may be a distance between two CDM-2 groups, or may be grouped with 6 subcarrier intervals such as in legacy CSI-RS 4 port mapping. The length 4-orthogonal codes for the antenna ports X, X+1, Y, and Y+1 mapped to the generated CDM-4 group may be configured in the same manner as in the fourth embodiment.

As another example, when the value of the 1-bit indicator is 1, it may mean extension in the time direction. In this case, the first CDM-2 group 1203 and the second CDM-2 group 1204, which are composed of two pairs of REs adjacent to each other in the time direction, are grouped in the time direction and become a CDM-4 group composed of four REs. At this time, the first CDM-2 group 1203 and the second CDM-2 group 1204 exist in different OFDM symbols. The criterion for selecting the first CDM-2 group 1203 and the second CDM-2 group 1204 may be a distance between the two CDM-2 groups or may be selected based on a pool of a predetermined OFDM symbol. The orthogonal code of length 4 for the antenna ports X, X+1, Y, and Y+1 mapped to the generated CDM-4 group may be configured in the same manner as in the fourth embodiment.

A second scheme of the fifth embodiment of the first disclosure is to use a bitmap indicator. For example, an eNB may transmit a bitmap of a length L including the order of CSI-RS port numbering and information on a CDM-4 mapping rule to a UE through higher layer signaling.

For example, it can be assumed that CSI-RS aggregation is performed based on a legacy 2-port CSI-RS mapping pattern. At this time, a bitmap (or an alphabet sequence) of length L =32 as shown in Equation 3 below includes locations of CSI-RS resources selected for CMR configuration, a port numbering rule, and a CDM-4 mapping rule. Here, L=32 is a configuration considering that the locations of 32 CSI-RS resources can be designated based on two ports in FIG. 7. Therefore, when only FDD or TDD is considered, the value of L may be adjusted to the situation.

$$I_{portmapping} = [X_1 \ X_2 \ X_3 \ \ldots \ X_{31}], x_i \in \begin{cases} A1, A2, B1, B2, C1, C2, (D1, D2 \text{ for 16 port}) \\ \text{for selected resources} \\ 0 \text{ for other resources} \end{cases}$$ [Equation 3]

In Equation 3, $x_i$ denotes whether REs belonging to a CDM-2 group designated by a column for CSI RS configurations 0 to 31 and 1 or 2 ports in FIG. 7 are used for CSI-RS transmission, and is an alphabet sequence indicating information on in which relationship a CDM-4 group is formed when the REs are used for the CSI-RS transmission.

When $x_i$ is 0, the REs indicated by an i-th CSI RS configuration in the column for the antenna port 1 or 2 in FIG. 7 are not used for the CSI-RS transmission. When $x_i$ is indicated as Xy other than 0, the REs indicated by the i-th CSI RS configuration in the column for the antenna port 1 or 2 in FIG. 7 are used for the CSI-RS transmission. In this case, in Xy, X may be indicated by one of A, B, C, and D, and y may be indicated by 1 or 2. It is obvious that A, B, C, D or 1, 2 are notations for classification and may be represented by different alphabets or numbers depending on circumstances.

The eNB and the UE can ensure that, when X of different $x_i$ and $x_j$ is the same, the four REs indicated by two indicators form one CDM-4 group. The eNB and the UE can ensure that, when y of $x_i$ is 1 and y of different $x_j$ is 2, the existing orthogonal code is used as is in the RE indicated by $x_i$ as in the fourth embodiment, and the existing orthogonal code may be used as is in the RE indicated by $x_j$ or may be used by being multiplied by −1.

For example, in the case of $x_i$=B1 and $x_j$=B2, the eNB and the UE may know that the four REs indicated by $x_i$ and $x_j$ constitute the second CDM-4. At this time, the length 4-orthogonal codes for up to four antenna ports mapped to the generated CDM-4 group may be configured in the same manner as that described in the fourth embodiment.

When the bitmap (or alphabet sequence) of the form as shown in Equation 2 is used, a maximum of 3 bits is required for each xi expression, and a total of 96 bits are required for the entire bitmap (or alphabet sequence) expression. This may impose a burden on the higher layer signaling, and therefore, a method for reducing an amount of information is needed.

It is assumed that RE locations for the transmission of 8 or more CSI-RSs are configured through one of the first embodiment, the second embodiment, and the third embodiment of the first disclosure. At this time, the configured RE locations may be all indicated through CSI RS configuration in the column for the antenna port 1 or 2 in FIG. 7. For example, when resources for 12 CSI-RS ports are configured, the locations of 6 CDM-2 groups may be represented through 6 CSI RS configurations. In this case, a relationship between the respective CDM-2 groups can be represented by a bitmap (or alphabet sequence) of length $N_P/2$ as shown in Equation 3 below. Here, $N_P$ is the number of CSI-RS ports to be aggregated.

$$I_{portmapping}=[X_1 \ X_2 \ X_3 \ \ldots \ x_{Np/2}], \text{ where } I_i \in \{A1,A2, B1,B2,,C1,C2,(D1,D2 \text{ for 16 ports})\}$$ [Equation 4]

According to Equation 4, an amount of information required for designating the CDM-4 group is 3*6=18 bits when 12 CSI-RS ports are transmitted and is 3*8=24 bits when 16 CSI-RS ports are transmitted, so that the amount of information can be greatly reduced in comparison with the amount of information calculated by Equation 3.

As another example, it may be assumed that CSI-RS aggregation is performed based on a legacy 4-port CSI-RS mapping pattern. In this case, one example of configuring the CDM-4 group is to configure the CDM-4 group with four REs designated by a 4-port CSI-RS mapping pattern. The existing 4-port CSI-RS mapping pattern is designed to designate two CDM-2 groups. The two CDM-2 groups designated by the existing 4-port CSI-RS mapping pattern can be grouped into the CDM-4 group in a manner similar to that described in the fourth embodiment.

Another example of configuring the CDM-4 group when CSI-RS aggregation is performed based on the legacy 4-port CSI-RS mapping pattern is to use a bitmap (or alphabet sequence). The bitmap (or alphabet sequence) having a length L=16 as shown in Equation 4 may include the locations of the CSI-RS resources selected for CMR configuration, a port numbering rule, and information on CDM-4 mapping rule. Here, since L=16 is a configuration considering that 16 CSI-RS resource locations can be designated based on 4 ports in FIG. 7, when considering only FDD or TDD, the value of L can be changed according to the situation.

$$I_{portmapping} = [X_1 \ X_2 \ X_3 \ \ldots \ X_{16}],$$ [Equation 5]

where $$x_i \in \begin{cases} A1, A2, B1, B2 \text{ for selected resources} \\ 0 \text{ for other resources} \end{cases}$$

In Equation 5, definition of each variable is similar to that described in Equation 3. In Equation 5, $x_j$ denotes whether REs belonging to a CDM-2 group designated by the CSI RS configurations {0 to 9, 20 to 25} of FIG. 7 and the column for four ports are used for CSI-RS transmission, and is an alphabet sequence indicating information on in which relationship a CDM-4 group is formed when the REs are used for the CSI-RS transmission.

Figure 13:
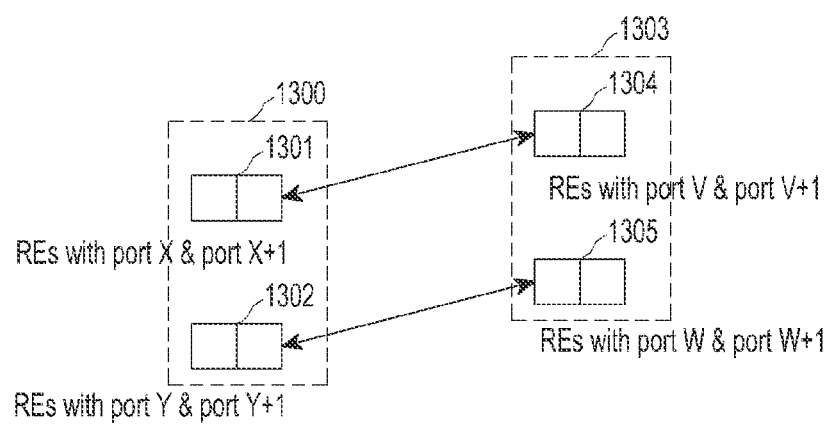
FIG. 13 is a diagram illustrating another example of a mapping method of a fifth embodiment of the first disclosure.

FIG. 13 is a diagram illustrating another example of a mapping method of a fifth embodiment of the first disclosure.

Referring to FIG. 13, it is assumed that $x_i$ indicating the same position as a first legacy 4 port pattern 1300 is configured as A1 and $x_j$ indicating the same position as a second legacy 4 port pattern 1303 is configured as A2.

At this time, it can be configured in advance that a first CDM-2 group 1301 of the first legacy 4 port pattern 1300 and a first CDM-2 group 1301 of the second legacy 4 port pattern 1303 are grouped to form one CDM-4 group. Similarly, it can be configured in advance that a second CDM-2 group 1302 of the first legacy 4 port pattern 1300 and a second CDM-2 group 1305 of the second legacy 4 port pattern 1303 are grouped to form another CDM-4 groups. Orthogonal code allocation for each port in each of the generated CDM-4 groups may be performed according to the scheme described in the fourth embodiment.

When the bitmap (or alphabet sequence) of the form as shown in Equation 5 is used, a maximum of 2 bits is required for each xi expression, and a total of 32 bits are required for the entire bitmap (or alphabet sequence) expression. This may impose a burden on the higher layer signaling, and therefore, a method for reducing an amount of information is needed.

It is assumed that RE locations for the transmission of 8 or more CSI-RSs are configured through one of the first embodiment, the second embodiment, and the third embodiment. At this time, the configured RE locations may be indicated through CSI RS configuration in the column for four antenna ports in FIG. 7. For example, when resources for 12 CSI-RS ports are configured, the locations of 6 or 8 CDM-2 groups may be represented through 3 or 4 CSI RS configurations. In this case, a relationship between the respective CDM-2 groups can be represented by a bitmap (or alphabet sequence) of length $N_P/4$ as shown in Equation 6 below. Here, $N_P$ is the number of CSI-RS ports to be aggregated.

$$I_{portmapping}=[X_1\ X_2\ X_3\ \ldots\ x_{N_P/4}], \text{ where } x_i \in \{A1, A2, B1, B2,\} \quad \text{[Equation 6]}$$

According to Equation 6, an amount of information required for designating the CDM-4 group is 2*3=6 bits or 2*4=8 bits when 12 CSI-RS ports are transmitted and is 2*4 =8 bits when 16 CSI-RS ports are transmitted, so that the amount of information can be greatly reduced in comparison with the amount of information calculated by Equation 3.

As another example, it may be assumed that CSI-RS aggregation is performed based on a legacy 8-port CSI-RS mapping pattern. In this case, a scheme based on the 2 port CSI-RS mapping pattern can be configured in a manner similar when extension is performed in a method based on the 4-port CSI-RS mapping pattern. A detailed description thereof will be omitted.

Sixth Embodiment of First Disclosure

The sixth embodiment of the first disclosure is a CSI-RS CDM-4 mapping scheme through rules defined in the LTE-A standard.

As another scheme for configuring the CDM-4 group, CDM-4 mapping through the definition of the LTE-A standard specification is possible.

As a first example of the sixth embodiment, CDM-4 mapping may be supported based on a distance between the CDM-2 groups.

It is assumed that RE locations for the transmission of 8 or more CSI-RS are configured through one of the first, second, and third embodiments. At this time, an eNB and a UE may configure one reference CSI-RS RE location (location of a reference CDM-2 group) based on the descending or ascending order of the CSI-RS configuration of FIG. 7. In addition, the eNB and the UE may determine the CSI-RS RE location (position of another CDM-2 group) closest to the configured reference RE location among the remaining CSI-RS REs through the CSI-RS configuration in the column for the antenna port 1 or 2 of FIG. 7. The CDM-4 mapping may be performed by applying the scheme of the fourth embodiment based on the retrieved reference CSI-RS REs and the CSI-RS REs adjacent to the reference CSI-RS REs.

Meanwhile, referring to FIG. 8 described above, it can be seen that OFDM symbols capable of performing CSI-RS transmission are separated from each other, whereas subcarriers capable of performing CSI-RS transmission are grouped by two. Therefore, the first example of the sixth embodiment may be expressed as performing the CDM-4 mapping on the principle of frequency domain first extension.

As the second example of the sixth embodiment, the CDM-4 mapping can be supported based on legacy 4-port mapping. For example, an upper (lower) CDM-2 group of two CDM-2 groups designated as one legacy 4-port CSI-RS configuration uses the existing orthogonal code [1 1] or [1 −1] as is. On the other hand, the remaining lower (upper) CDM-2 group may use the existing orthogonal code as is ([1 1] or [1 −1]) according to the CSI-RS port number, or may be used by being multiplied by −1 ([−1 −1] or [−1 1]). A specific mapping method may refer to the scheme described in the fourth embodiment.

As a third example of the sixth embodiment, the CDM-4 mapping can be supported on the principle of time domain first extension. In the third example of the sixth embodiment, two CDM-2 groups located in different OFDM symbols are grouped to generate a CDM-4 group. As a method for selecting two CDM-2 groups located in different OFDM symbols, a CDM-2 group located in fifth and sixth OFDM symbols of a 0-th slot is referred to as a resource pool 1, a CDM-2 group located in second and third OFDM symbols of a first slot is referred to as a resource pool 2, and a CDM-2 group located in fifth and sixth OFDM symbols in the first slot is referred to as a resource pool 3, whereby it is possible to restrict only the CDM-2 groups included in different resource pools to be grouped into one CDM-4 group. The following detailed mapping scheme can refer to the scheme described in the fourth embodiment.

The CDM-4 mapping methods based on the definition of the standard specification may be used together with the CDM-4 mapping method through the upper layer signaling described in the fifth embodiment. For example, an eNB may use a scheme for instructing orthogonal code extension in the frequency/time direction through the bit indicator of the fifth embodiment, so that a UE may determine to perform CDM-4 mapping by selecting one of the two examples or three examples of the sixth embodiment. For example, the eNB may use a 1-bit indicator to instruct the UE to perform CDM-4 mapping by selecting one of the first or second examples of the sixth embodiment. In the same manner, the eNB may instruct the UE to select either the second example or the third example of the sixth embodiment, or to select either the first example or the third example of the sixth embodiment. As another example, the eNB may use a 2-bit indicator to instruct the UE to select one of the above three examples of the sixth embodiment to perform CDM-4 mapping.

Seventh Embodiment of First Disclosure>

The seventh embodiment of the first disclosure is a CSI-RS CDM-4 mapping scheme through CDM-2/CDM-4 switching.

Various examples for applying CDM-4 at the time of CSI-RS transmission in the above-described fourth, fifth, and sixth embodiments have been described.

On the other hand, considering the following situation, the CDM-2 should be applied at the time of the transmission of 8 or more CSI-RSs. In the current LTE/LTE-A, the UE may measure a CSI-RS of another cell to measure interference in a simulated manner. At this time, when a CDM-4 is applied to all CSI-RSs in a certain cell, existing UEs are forced to operate based on CDM-2, so that the UE cannot generate simulated interference by receiving the CSI-RS of the corresponding cell. In addition, the same problem may occur when CSI-RS RSRP is generated and reported. Accordingly, the eNB may need to selectively apply CDM-2 and CDM-4 even at the time of the transmission of 8 or more CSI-RSs. For this purpose, the eNB may instruct CDM-2 or CDM-4 using a 1-bit or 2-bit indicator.

For example, the eNB may notify the UE of whether the CDM-2 or the CDM-4 is used at the time of CSI-RS transmission through the 1-bit indicator indicated by the higher layer signaling or L1 signaling. As another example, the eNB may determine whether CDM-2 or CDM-4 is used when the CSI-RS is transmitted to the UE through the 2-bit indicator indicated by the upper layer signaling or L1 signaling, and CDM-4 mapping are used in the CSI-RS transmission through the 2-bit indicator indicated by upper layer signaling or L1 signaling, and a mapping rule that is used when CDM-4 mapping is used, and may notify the UE of the determined information.

<Second Disclosure>

Hereinafter, the second disclosure will be described.

Figure 14:
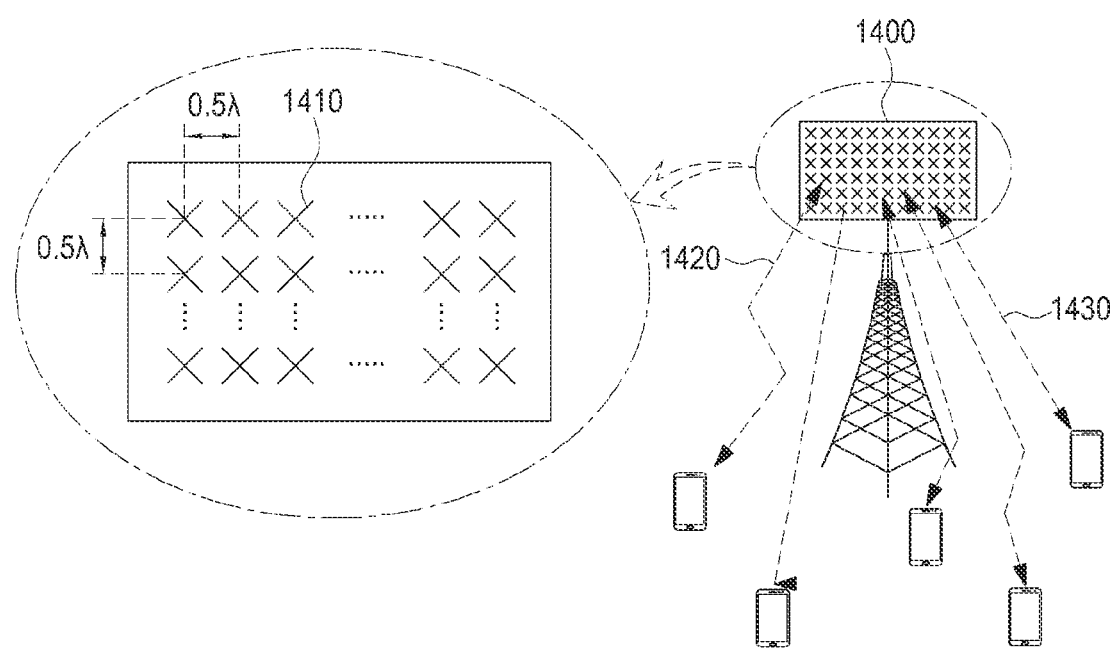
FIG. 14 is a diagram illustrating an FD-MIMO antenna system to which the second disclosure is applied.

FIG. 14 is a diagram illustrating an FD-MIMO antenna system to which the second disclosure is applied. FIG. 14 is the same as FIG. 1 described above. However, those shown in FIG. 14 again are to indicate that the second disclosure is applied to the FD-MIMO antenna system. The description of FIG. 14 is the same as that of FIG. 1, so that it will be omitted.

Figure 15:
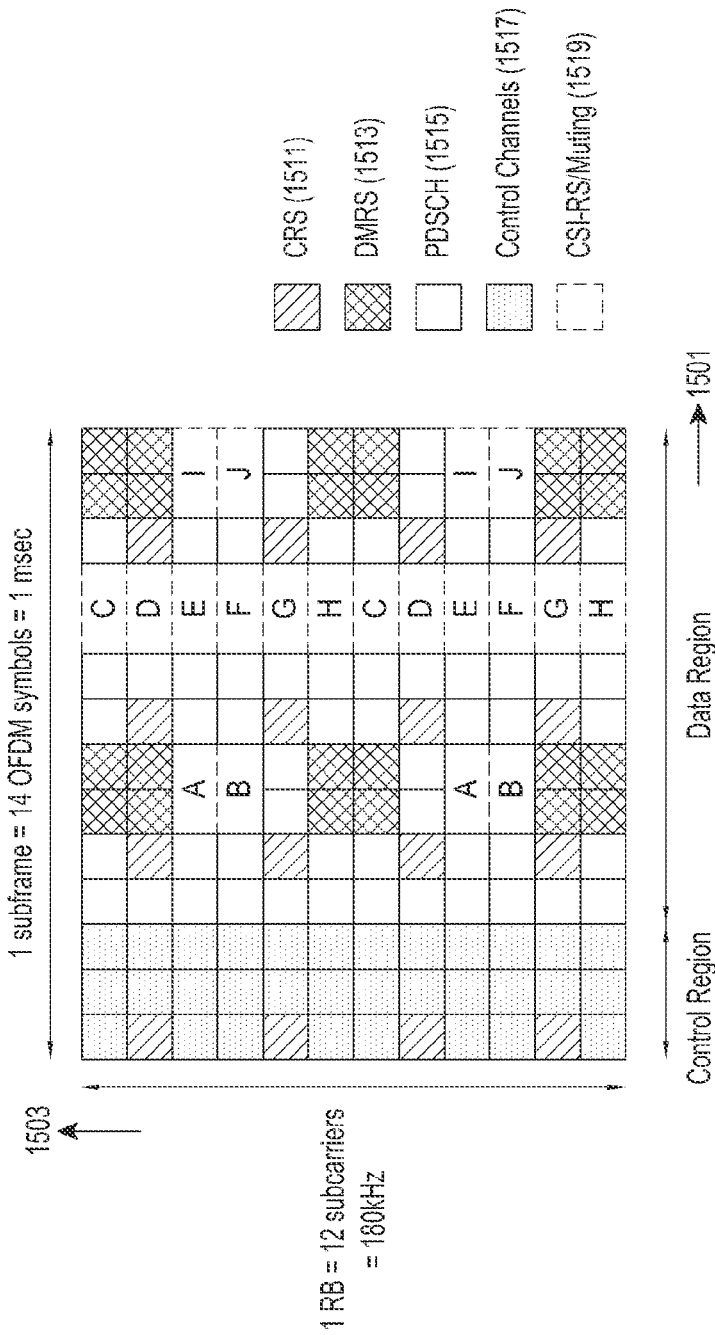
FIG. 15 is a diagram illustrating radio resources of one subframe and one RB, which are minimum units that can be downlink-scheduled in an LTE/LTE-A system.

FIG. 15 is a diagram illustrating radio resources of one subframe and one RB, which are minimum units that can be downlink-scheduled in an LTE/LTE-A system.

Figure 2:
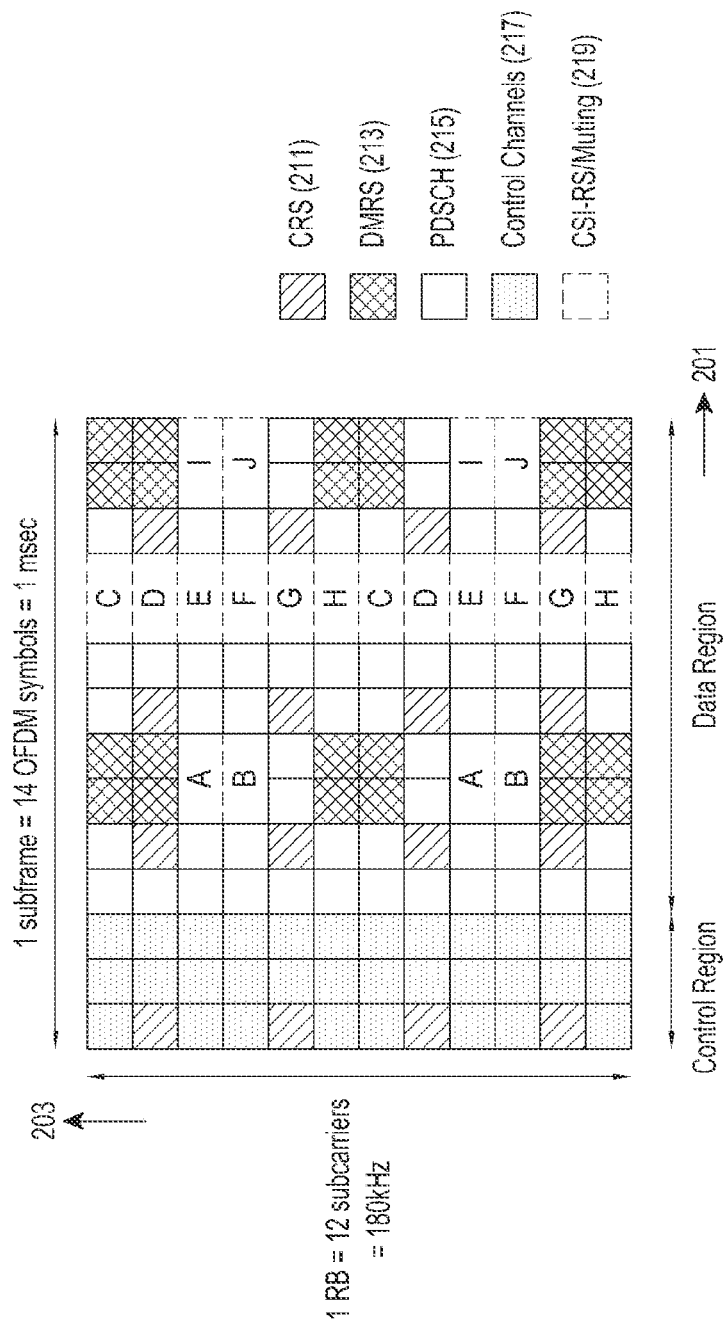
FIG. 2 is a diagram illustrating radio resources of one subframe and one Resource Block (RB), which are minimum units that can be downlink-scheduled in an LTE/LTE-A system.
Figure 3:
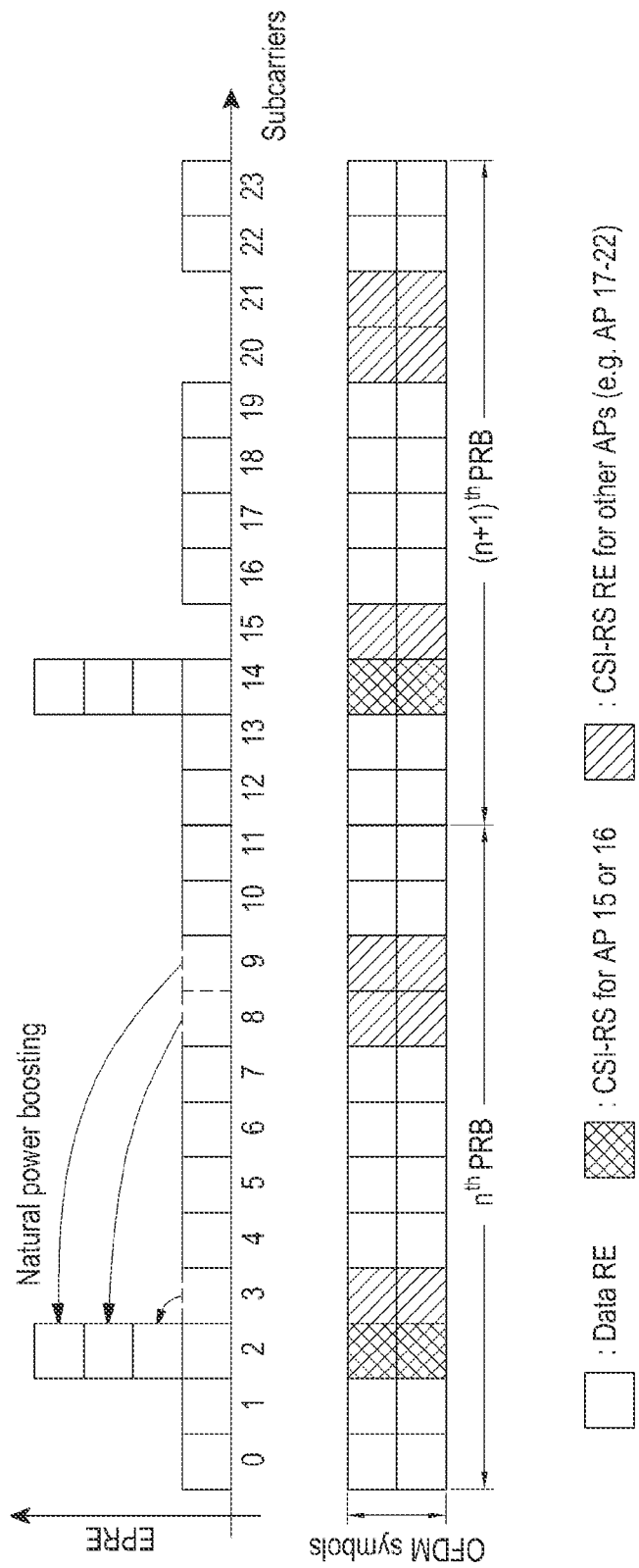
FIG. 3 is a diagram illustrating an example of a CSI-RS RE mapping scheme for n-th and (n+1)-th PRBs when an eNB transmits 8 CSI-RSs.

FIG. 15 is the same as FIG. 2. However, those shown in FIG. 15 again are to describe an RB resource described in the second disclosure. The description of FIG. 15 is the same as that of FIG. 2, so that it will be omitted.

In the LTE/LTE-A, information that is fed back by the UE is largely described as RI, PMI, and CQI.

On the other hand, in the LTE/LTE-A, periodic feedback of the UE is configured as one of the following four feedback modes depending on which information the feedback signal contains:

1. Feedback mode 1-0: RI, wideband CQI (w-CQI)
2. Feedback mode 1-1: RI, w-CQI, PMI
3. Feedback mode 2-0: RI, w-CQI, subband CQI (s-CQI)
4. Feedback mode 2-1: RI, w-CQI, s-CQI, PMI Feedback timing of each piece of information transmitted and received in the four feedback modes may be made known to the UE by higher layer signaling. For example, a feedback period of each piece of information and an offset value may be signaled to the UE through the upper layer.

Figure 16:
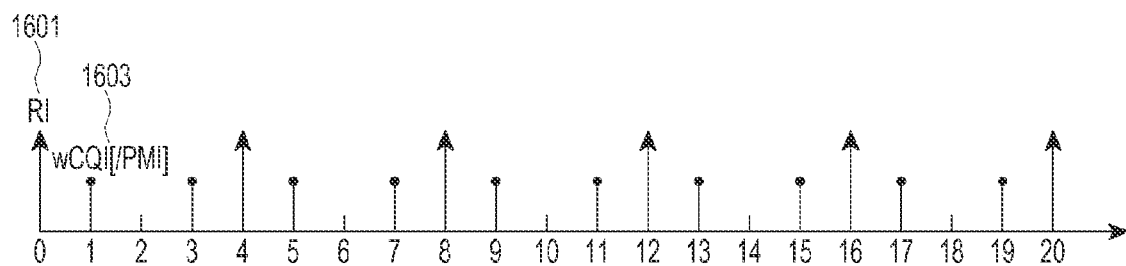
FIG. 16 is a diagram illustrating feedback timing of an RI 1601 and a w-CQI 1603 in the case of $N_{pd}$=2, $M_{RI}$=2, $N_{OFFSET, CQI}$=1, and $N_{OFFSET, RI}$=−1.

FIG. 16 is a diagram illustrating feedback timing of an RI 1601 and a w-CQI 1603 in the case of $N_{pd}=2$, $M_{RI}=2$, $N_{OFFSET, CQI}=1$, and $N_{OFFSET, RI}=-1$. In FIG. 16, timing of the horizontal axis indicates the index of the corresponding subframe.

The feedback mode 1-1 has feedback timing such as the feedback mode 1-0, but has a difference in that w-CQI and PMI are transmitted together at w-CQI transmission timing.

In the feedback mode 2-0, a feedback period of s-CQI is Npd and the offset value is $N_{OFFSET, CQI}$. The feedback period for w-CQI is $H \cdot N_{pd}$, and the offset value is $N_{OFFSET, CQI}$ as in the offset value of s-CQI. Here, H=J·K+1 is defined, where K is a value delivered to a UE through upper layer signaling, and J is a value determined according to a system bandwidth. For example, the value of J for a 10 MHz system is defined as 3. As a result, the w-CQI is transmitted by replacing the s-CQI once every time the H-th s-CQI is transmitted. The cycle of RI is $M_{RI} \cdot H \cdot N$, and the offset is $N_{OFFSET, CQI}+N_{OFFSET, RI}$.

Figure 17:
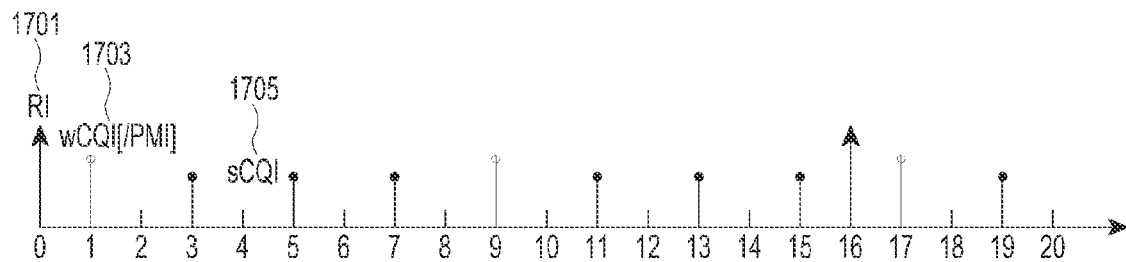
FIG. 17 is a diagram illustrating feedback timing of an RI 1701, a s-CQI 1705, and a w-CQI 1703 for the case of $N_{pd}$=2, $M_{RI}$=2, J=3 (10 MHz), k=1, $N_{OFFSET, CQI}$=1, and $N_{OFFSET, RI}$=−1.

FIG. 17 is a diagram illustrating feedback timing of an RI 1701, a s-CQI 1705, and a w-CQI 1703 for the case of $N_{pd}=2$, $M_{RI}=2$, J=3 (10 MHz), k=1, $N_{OFFSET, CQI}=1$, and $N_{OFFSET, RI}=-1$.

The feedback mode 2-1 has feedback timing such as in feedback mode 2-0, but has a difference in that PMI is transmitted together at w-CQI transmission timing.

The above-described feedback timing may correspond to the case where the number of CSI-RS antenna ports is 4 or less, and in the case of a UE to which the CSI-RS for 8 antenna ports is allocated, two pieces of PMI information must be fed back unlike the feedback timing.

As for 8 CSI-RS antenna ports, the feedback mode 1-1 is again divided into two submodes. In the first submode, the RI is transmitted together with the first PMI information, and the second PMI information is transmitted together with the w-CQI. Here, the feedback period and the offset for the w-CQI and the second PMI are defined as $N_{pd}$ and $N_{OFFSET, CQI}$ and the feedback period and the offset value for the RI and the first PMI information are defined as $M_{RI} \cdot N_{pd}$ and $N_{OFFSET, CQI}+N_{OFFSET, RI}$.

Here, when a precoding matrix corresponding to the first PMI is W1 and a precoding matrix corresponding to the second PMI is W2, the UE and the eNB share information indicating that the preferred precoding matrix of the UE is determined as W1W2.

In the case of the feedback mode 2-1 for 8 CSI-RS antenna ports, a precoding type indicator (PTI) is added to the feedback information. The PTI is fed back together with RI, the feedback period of the PTI is $M_{RI} \cdot H \cdot N_{pd}$, and the offset thereof is defined as $N_{OFFSET, CQI}+N_{OFFSET, RI}$.

When the PTI is 0, the first PMI, the second PMI, and the w-CQI are all fed back, the w-CQI and the second PMI are transmitted together at the same timing, and the period is $N_{pd}$ and the offset is given as NOFFSET, CQI. Also, the period of the first PMI is $H \cdot N_{pd}$, and the offset thereof is $N_{OFFSET, CQI}$. Here, H' may be transmitted to the UE by higher layer signaling.

On the other hand, when the PTI is 1, the PTI is transmitted together with the RI, the w-CQI and the second PMI are transmitted together, and the s-CQI is further fed back at a separate timing. In this case, the first PMI is not transmitted. The feedback periods and offsets of the PTI and the RI are the same as when PTI is 0. The feedback period of s-CQI is $N_{pd}$ and the offset thereof is defined as $N_{OFFSET, CQI}$. Also, w-CQI and the second PMI have a feedback period of $H \cdot N_{pd}$ and an offset of $N_{OFFSET, CQI}$, and H is defined as when the number of CSI-RS antenna ports is 4.

Figure 18:
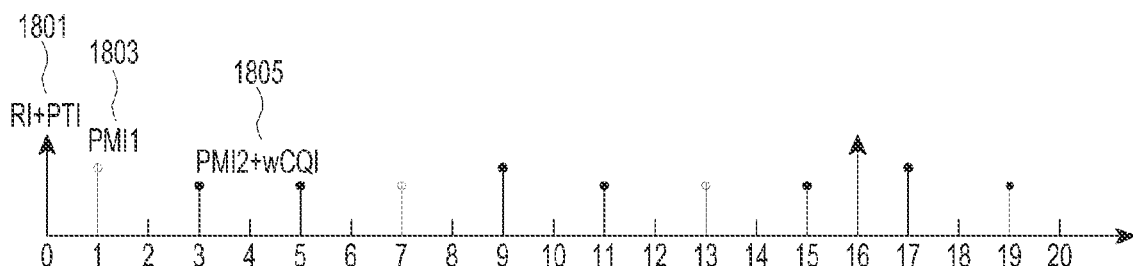
FIG. 18 is a diagram illustrating feedback timing when PTI=0 is satisfied for the case of $N_{pd}$=2, $M_{RI}$=2, J=3 (10 MHz), k=1, H'=3, $N_{OFFSET, CQI}$=1, and $N_{OFFSET, RI}$=−1.

FIG. 18 is a diagram illustrating feedback timing when PTI =0 is satisfied for the case of $N_{pd}=2$, $M_{RI}=2$, J=3 (10 MHz), k=1, H'=3, $N_{OFFSET, CQI}=1$, and $N_{OFFSET, RI}=-1$.

Figure 19:
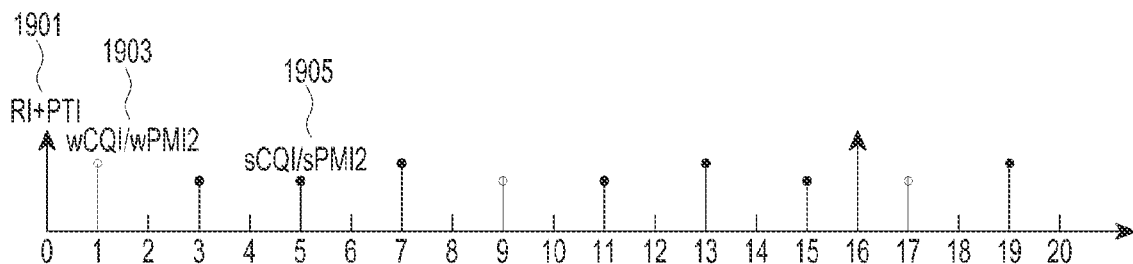
FIG. 19 is a diagram illustrating feedback timing when PTI=1 is satisfied in the case of $N_{pd}$=2, $M_{RI}$=2, J=3 (10 MHz), k=1, H'=3, $N_{OFFSET, CQI}$=1, and $N_{OFFSET, RI}$=−1.
Figure 20A:
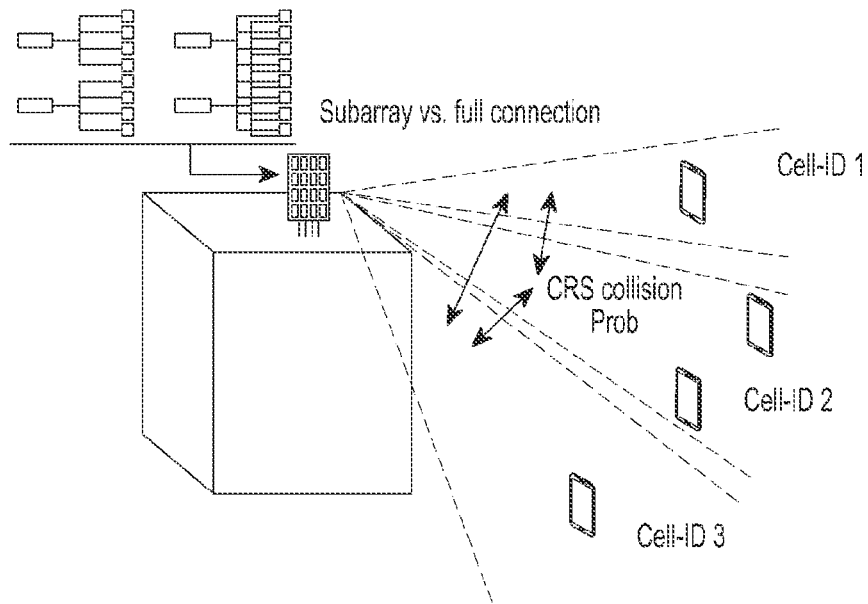
FIGS. 20A to 20D are diagrams illustrating the case of using CSI-RS that is beamformed in an FD-MIMO system.
Figure 20B:
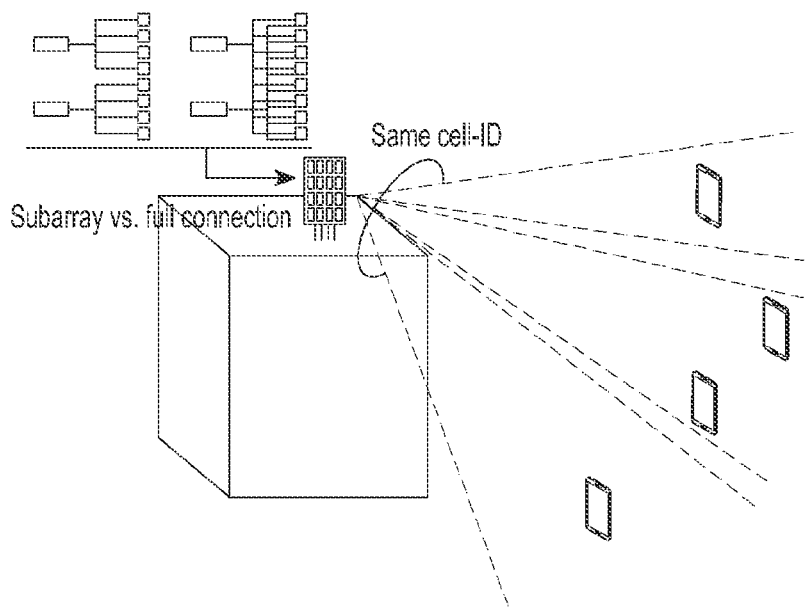
Figure 20C:
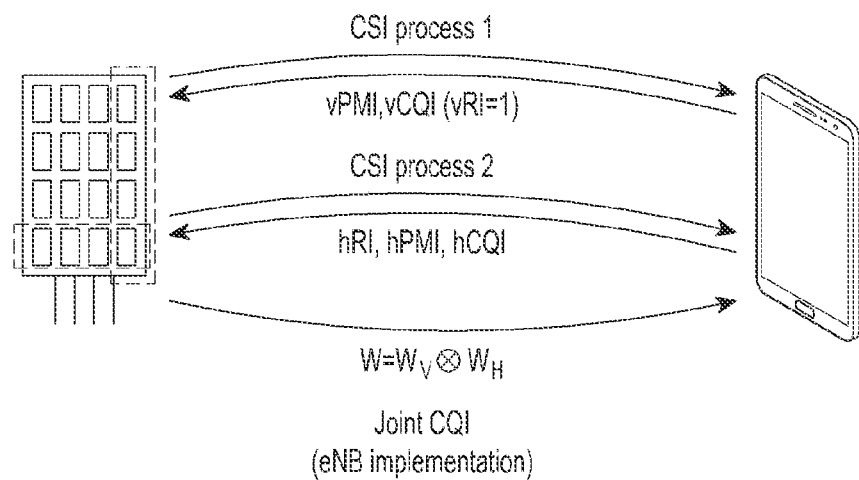
Figure 20D:
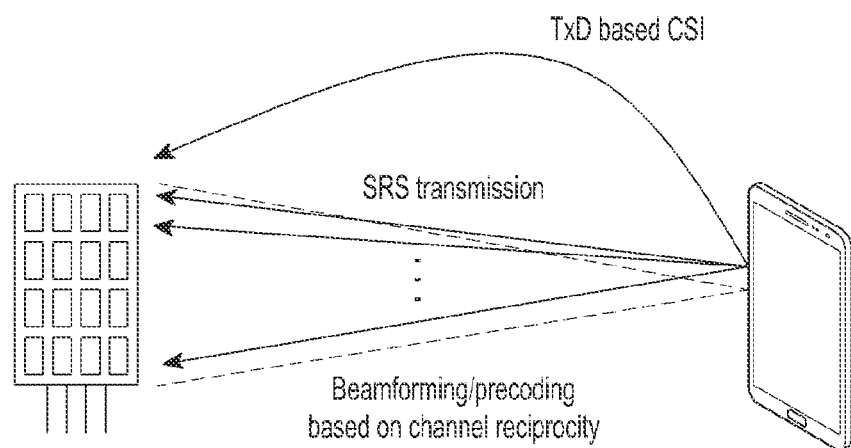

FIG. 19 is a diagram illustrating feedback timing when PTI=1 is satisfied in the case of $N_{pd}=2$, $M_{RI}=2$, J=3 (10 MHz), k=1, H'=3, $N_{OFFSET, CQI}=1$, and $N_{OFFSET, RI}=-1$.

Meanwhile, an LTE/LTE-A supports not only periodic feedback of a UE but also aperiodic feedback thereof. When an eNB desires to acquire aperiodic feedback information of a specific UE, the eNB configures an aperiodic feedback indicator included in downlink control information (DCI) for uplink data scheduling of a corresponding UE to perform specific aperiodic feedback, and performs uplink data scheduling of the corresponding UE. When receiving the indicator that is configured to perform aperiodic feedback in an n-th subframe, the corresponding UE performs uplink transmission including the aperiodic feedback information in the data transmission in an (n+k)-th subframe. Here, k is a parameter defined in 3GPP LTE Release 11 standard. In case of frequency division duplexing (FDD), the value is 4, and in case of time division duplexing (TDD), the value is defined as shown in Table 1 below.

TABLE 1

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

When the aperiodic feedback is configured, the feedback information includes RI, PMI, and CQI as in the case of periodic feedback. However, depending on feedback configuration, the RI and the PMI may not be fed back. The CQI may include both w-CQI information and s-CQI information or may include only the w-CQI information.

The LTE/LTE-A provides a codebook subsampling function for periodic channel status reporting. In the LTE/LTE-A, the periodic feedback of the UE is transmitted to the eNB via a PUCCH. Since an amount of information that can be transmitted through the PUCCH is limited, various feedback objects such as RI, w-CQI, s-CQI, PMI1, wPMI2, sPMI2, etc., may be transmitted via the PUCCH through subsampling, or two or more pieces of feedback information may be "jointly encoded" and transmitted via the PUCCH. For example, when the number of CSI-RS ports configured by the eNB is 8, an RI and a PMI1 reported in a submode 1 of PUCCH mode 1-1 are jointly encoded as shown in Table 2 below.

TABLE 2

| Value of joint encoding of RI and the first PMI $I_{RI/PMI1}$ | RI | Codebook index $i_1$ |
|---|---|---|
| 0-7 | 1 | $2I_{RI/PMI1}$ |
| 8-15 | 2 | $2(I_{RI/PMI1} - 8)$ |
| 16-17 | 3 | $2(I_{RI/PMI1} - 16)$ |
| 18-19 | 4 | $2(I_{RI/PMI1} - 18)$ |
| 20-21 | 5 | $2(I_{RI/PMI1} - 20)$ |
| 22-23 | 6 | $2(I_{RI/PMI1} - 22)$ |
| 24-25 | 7 | $2(I_{RI/PMI1} - 24)$ |
| 17 | 8 | 0 |
| 27-31 | reserved | NA |

Based on Table 2, an RI composed of 3 bits and a PMI1 composed of 4 bits are jointly coded with 5 bits in total. The submode 2 of the PUCCH mode 1-1 jointly encodes a PMI1 composed of 4 bits and a PMI2 composed of other 4 bits with a total of 4 bits as shown in Table 3 below. The submode 2 cannot report more precoding indexes because the level of subsampling of the submode 2 is greater than that of the submode 1 (4==>3 for submode 1 and 8==>4 for submode 2). Table 3 shows joint encoding of RI in the submode 2 of the PUCCH mode 1-1.

TABLE 3

| RI | Relationship between the first PMI value and codebook index $i_1$ | | Relationship between the second PMI value and codebook index $i_2$ | | total #bits |
|---|---|---|---|---|---|
| | Value of the first PMI $I_{PMI1}$ | Codebook index $i_1$ | Value of the second PMI $I_{PMI2}$ | Codebook index $i_2$ | |
| 1 | 0-7 | $2I_{PMI1}$ | 0-1 | $2I_{PMI2}$ | 4 |
| 2 | 0-7 | $2I_{PMI1}$ | 0-1 | $I_{PMI2}$ | 4 |
| 3 | 0-1 | $2I_{PMI1}$ | 0-7 | $4\lfloor I_{PMI2} \rfloor + I_{PMI2}$ | 4 |
| 4 | 0-1 | $2I_{PMI1}$ | 0-7 | $I_{PMI2}$ | 4 |
| 5 | 0-3 | $I_{PMI1}$ | 0 | 0 | 2 |
| 6 | 0-3 | $I_{PMI1}$ | 0 | 0 | 2 |
| 7 | 0-3 | $I_{PMI1}$ | 0 | 0 | 2 |
| 8 | 0 | 0 | 0 | 0 | 0 |

As another example, when the number of CSI-RS ports configured by the eNB is 8, the PMI2 reported in the PUCCH mode 2-1 may be subsampled as shown in Table 4 below. Table 4 shows a codebook subsampling scheme of the PUCCH mode 2-1.

TABLE 4

| RI | Relationship between the second PMI value and codebook index $i_2$ | |
|---|---|---|
| | Value of the second PMI $I_{PMI2}$ | Codebook index $i_2$ |
| 1 | 0-15 | $I_{PMI2}$ |
| 2 | 0-3 | $2I_{PMI2}$ |
| 3 | 0-3 | $8 \cdot \lfloor I_{PMI2}/2 \rfloor + (I_{PMI2} \bmod 2) + 2$ |
| 4 | 0-3 | $2I_{PMI2}$ |
| 5 | 0 | 0 |
| 6 | 0 | 0 |
| 7 | 0 | 0 |
| 8 | 0 | 0 |

Referring to Table 4, the PMI2 is reported as 4 bits when the associated RI is 1. However, when the associated RI is 2 or more, a differential CQI for a second codeword should be additionally reported together, so that the PMI2 is subsampled and reported in 2 bits. In the LTE/LTE-A, subsampling or joint encoding for a total of six periodic feedbacks including Table 2, Table 3, and Table 4 can be applied.

Meanwhile, there are two methods of supporting a plurality of antennas supported by the FD-MIMO. One is a non-precoded (NP) CSI-RS method and a beamformed (BF) CSI-RS method. In the NP CSI-RS method, an eNB transmits a CSI-RS having a wide beam width to a UE, and a UE transmits a RI/PMI/CQI corresponding to the corresponding beam to the eNB. In the 3GPP Rel-11 standard, up to 8 CSI-RS ports were supported. However, in order to support the FD-MIMO, a method of supporting various NP CSI-RS ports such as 12/16/32/64 NP CSI-RS ports, a two-dimensional (2D) codebook can be considered.

On the other hand, the BF CSI-RS method is a method of dividing the entire beam region into one-dimension (1D) or two-dimension (2D) in order to optimize the number of codebooks that the UE calculates at one time and CSI-RS overhead. The BF CSI-RS method may be further classified into a cell-specific BF CSI-RS method and a UE-specific BF CSI-RS method according to a scheme in which the UE selects a required 1D or 2D sector.

FIGS. 20A to 20D are diagrams illustrating the case of using CSI-RS that is beamformed in an FD-MIMO system.

In the case of the cell-specific BF CSI-RS method, an eNB transmits the same plurality of beams to a UE, the UE reports a channel status to the eNB based on the received plurality of beams, and the eNB selects the corresponding beam based on the channel status report and transmits corresponding data. The UE may enable beam index (BI) information, which is information on the beams preferred by the UE, to be included in the channel status report. When the BI information is not included in the channel status report, the eNB may enable the UE to select a suitable sector for the UE using a plurality of channel status information reports based on a plurality of CSI processes.

In the UE-specific BF CSI-RS, unlike the cell-specific BF CSI-RS, the eNB transmits the optimized beam to a predetermined UE in the BF CSI-RS through NP CSI-RS, Sounding RS (SRS), and the like, and the UE reports the channel status information by reducing the complexity of calculation required to report the channel status information based on the received information. At this time, since the number of beams required for the cell-specific BF CSI-RS is larger than a predetermined reference number or the number of UEs is larger than a predetermined reference value, the CSI-RS overhead increases when the number of the UE-specific BF CSI-RSs which are transmitted for the beam required for the UEs is increased. Therefore, measurement restriction may be introduced to the CSI-RS to reduce this overhead.

In the existing LTE Rel-11 standard, it is assumed that a UE always has the same channel characteristics unless the channel of CSI-RS in one CSI process has a restriction such as a subframe set. Accordingly, the UE may measure various numbers of CSI-RSs according to the implementation method of the UE, and may improve the accuracy of the channel estimated by the UE using statistical characteristics of the CSI-RS.

The eNB may configure a subframe set to divide the statistical characteristics of the CSI-RS belonging to one CSI process into two and measure the divided statistical characteristics. In this case, it is assumed that a CSI-RS belonging to a different subframe set has different channel characteristics, but it is assumed that the CSI-RS in the same subframe set always has the same channel characteristics. Also, as in the case where there is no subframe set, it is possible to measure various numbers of CSI-RSs according to the implementation method of the UE and may improve the accuracy of the channel estimated by the UE using the statistical characteristics. However, when the number of cell-specific beams supported by the cell-specific BF CSI-RS increases or the number of UE-specific beams supported by the UE-specific BF CSI-RS increases, the above-mentioned assumption for the CSI-RS may rather cause the overhead of BF CSI-RS to increase more than the CSI-RS overhead of NP CSI-RS. Accordingly, when eliminating the restriction that the CSI-RS before a predetermined time from the reporting time of the UE or the CSI-RS belonging to the same subframe set has the same statistical characteristics, the channel estimation performance of the UE may be degraded, but the CSI-RS overhead may be reduced.

Figure 21:
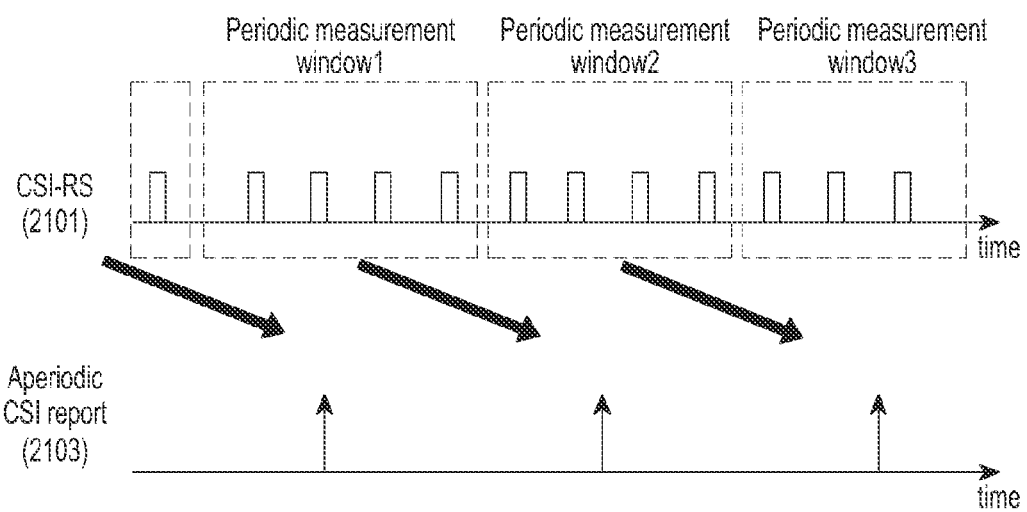
FIG. 21 is a diagram illustrating an example of an operation when measurement restriction is introduced to channel measurement and status information report generation of a UE.

FIG. 21 is a diagram illustrating an example of an operation when measurement restriction is introduced to channel measurement and status information report generation of a UE.

Reference numeral 2101 denotes CSI-RSs, and reference numeral 2103 denotes a situation in which a CSI is reported non-periodically using the CSI-RS. It is assumed that a UE recognizes four CSI-RSs as one measurement window and that the CSI-RSs within the corresponding measurement window have the same statistical characteristics. It can be seen in FIG. 21 that the periodic measurement windows 1, 2 and 3 are shown. The UE may measure the corresponding channel based on this assumption, and may improve the channel estimation performance using the statistical characteristics of CSI-RS and a method of obtaining an average value.

Meanwhile, an aperiodic CSI-RS scheme that non-periodically allocates the CSI-RS seen by the UE in order to minimize the increase in the overhead can be applied to the BF CSI-RS. The existing CSI-RS is allocated to a UE from a semi-static point of view, and the CSI-RS with the same offset and transmission period has assumed that the CSI-RS is always transmitted except for certain situations (for example, when a collision occurs with a signal for a synchronization operation of the UE or a paging signal). However, when the CSI-RS can be dynamically allocated, the CSI-RS overhead may be reduced without introducing the measurement restriction because the CSI-RS can be allocated only to the UEs requiring channel measurement.

In the second disclosure, the beam index (BI) proposed in the second disclosure is an effective method to enable the cell-specific BF CSI-RS to operate with only a small number of channel status reports, rather than a plurality of channel status reports. In the current LTE-A standard, a method in which an eNB selects a beam in consideration of the channel status of a plurality of beams and transmits data to the UE is a method in which the CSI-RS related to a plurality of beams is transmitted to a plurality of CSI-RSs using a CSI process, a channel status report based on the transmitted CSI-RS is received from the UE and is transmitted using a beam determined to be better. However, this method may cause an increase in the overhead of PUCCH or PUSCH since the channel status reporting operation must be performed for all CSI processes. Accordingly, when the UE selects at least one of the plurality of CSI-RSs to feed back the channel status report, it is possible to select a suitable beam and transmit data while reducing the above-described PUCCH or PUSCH overhead.

Therefore, in the second disclosure, when the measurement restriction, the aperiodic CSI-RS, the BI, etc., which restrict time resources of FD-MIMO CSI-RS based on the LTE-A system are applied to CSI-RS transmission and measurement and channel status report generation, it is possible to effectively operate the measurement restriction, the aperiodic CSI-RS, and the BI using a configuration method in which the measurement restriction, the aperiodic CSI-RS, and the BI can be effectively operated in conjunction with periodic channel status reporting and aperiodic channel status reporting.

In general, when the number of transmission antennas is large, such as FD-MIMO, a CSI-RS proportional thereto should be transmitted. For example, when 8 transmission antennas are used in the LTE/LTE-A, the eNB transmits the CSI-RS corresponding to 8-ports to the UE to measure the downlink channel status. In this case, when the eNB transmits the CSI-RS corresponding to the 8-ports, radio resources composed of 8 REs should be used in one RB as shown in A and B in FIG. 2. When the CSI-RS transmission of the LTE/LTE-A scheme is applied to the FD-MIMO, radio resources proportional to the number of transmission antennas should be allocated to the CSI-RS. That is, when the number of transmission antennas of the eNB is 128, the eNB should transmit the CSI-RS using a total of 128 REs in one RB. Such a CSI-RS transmission scheme may improve the accuracy of channel measurement between antennas, but it requires an excessive amount of radio resources, which has the adverse effect of reducing radio resources required for wireless data transmission and reception. Accordingly, based on this point, the following two methods can be considered when the eNB having a large number of transmission antennas such as in FD-MIMO transmits the CSI-RS.

Figure 34:
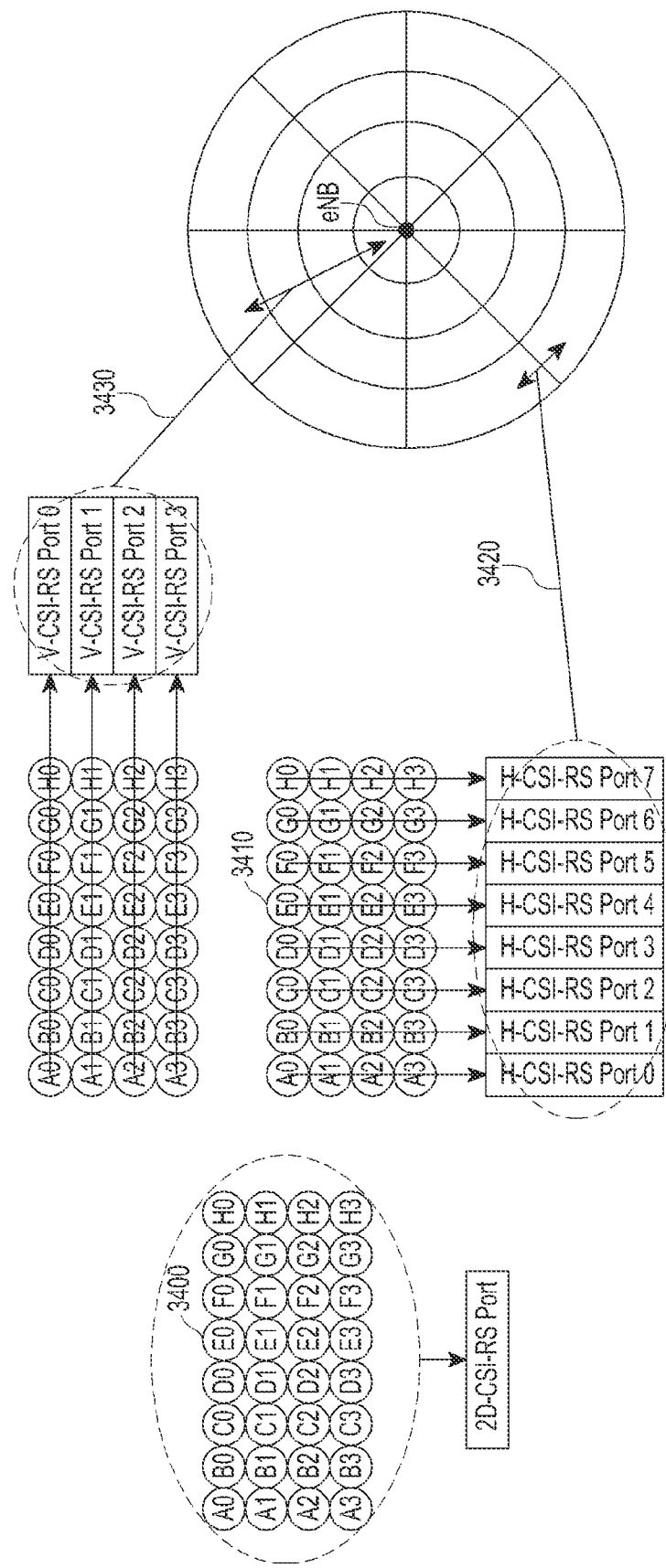
FIG. 34 is a diagram illustrating CSI-RS transmission methods 1 and 2.

CSI-RS transmission method 1: method of allocating and transmitting the same number of radio resources as the number of antennas to CSI-RS CSI-RS transmission method 2: method of dividing CSI-RS into a plurality of dimensions and transmitting the divided CSI-RS A detailed description of the above two method will be made in FIG. 34, which will be described in the third disclosure. FIG. 34 is not limited to the description of the third disclosure, and is applied equally to the second disclosure.

On the other hand, although the second disclosure has been described on the assumption of the CSI-RS transmission method 1, the second disclosure can be equally extended and applied even when the CSI-RS transmission method 2 is used.

On the other hand, the RI and CQI of the terms described in the second disclosure are as described in the first disclosure. $W_1$ and $W_2$ are additionally used in the second disclosure, and $W_1$ and $W_2$ are as follows.

$W_1$: A first PMI which is made known to an eNB by a UE by obtaining an optimized precoding based on a channel obtained by applying a 2D precoding to 2D-CSI-RS. The first PMI may indicate a beam group selected in the horizontal and vertical directions. In addition, the $W_1$ may be divided into components in which the horizontal and vertical directions and separated.

$W_2$: A second PMI which is made known to an eNB by a UE by obtaining an optimized precoding based on a channel obtained by applying a 2D precoding to 2D-CSI-RS. The second PMI may indicate co-phasing required to correct a phase difference between antennas having a different polarity from that of a beam selected from a selected beam group in the horizontal and vertical directions. Similarly to $W_1$, $W_2$ may also be divided into components in which the horizontal and vertical directions and separated.

For reference, the structure of the 2D codebook can be expressed as Equation 7.

$$W = (W_{11} \otimes W_{11}) W_2 = W_1 W_2 \qquad [\text{Equation 7}]$$

In Equation 7, $W_{11}$ and $W_{12}$ represent components in the horizontal and vertical directions of $W_1$. In this manner, $W_{11}$ and $W_{12}$ may be represented directly in the codebook or implicitly represented. In addition, although $W_2$ is represented by one parameter in Equation 7, $W_2$ can be divided into two separated parameters such as in $W_1$. Table 5 below is an example of a 2D codebook that is a rank-1 using 16 antenna ports by utilizing the 2D codebook structure.

TABLE 5

| $i_1$ | $i_2$ | | | | | | | |
|---|---|---|---|---|---|---|---|---|
|  | 0 | 1 | 2 | 3 | 4 | 5 | 6 | 7 |
| 0-255 | $W^{(1)}_{2i_{1a},i_{1b},0}$ | $W^{(1)}_{2i_{1a},i_{1b},8}$ | $W^{(1)}_{2i_{1a},i_{1b},16}$ | $W^{(1)}_{2i_{1a},i_{1b},24}$ | $W^{(1)}_{2i_{1a},i_{1b},0}$ | $W^{(1)}_{2i_{1a},i_{1b},8}$ | $W^{(1)}_{2i_{1a},i_{1b},16}$ | $W^{(1)}_{2i_{1a},i_{1b},24}$ |
| $i_1$ | $i_2$ | | | | | | | |
|  | 8 | 9 | 10 | 11 | 12 | 13 | 14 | 15 |
| 0-255 | $W^{(1)}_{2i_{1a}+1,i_{1b},0}$ | $W^{(1)}_{2i_{1a}+1,i_{1b},8}$ | $W^{(1)}_{2i_{1a}+1,i_{1b},16}$ | $W^{(1)}_{2i_{1a}+1,i_{1b},24}$ | $W^{(1)}_{2i_{1a}+1,i_{1b},0}$ | $W^{(1)}_{2i_{1a}+1,i_{1b},8}$ | $W^{(1)}_{2i_{1a}+1,i_{1b},16}$ | $W^{(1)}_{2i_{1a}+1,i_{1b},24}$ |
| $i_1$ | $i_2$ | | | | | | | |
|  | ... | 25 | 26 | 27 | 28 | 29 | 30 | 31 |
| 0-255 | ... | $W^{(1)}_{2i_{1a}+3,i_{1b},0}$ | $W^{(1)}_{2i_{1a}+3,i_{1b},0}$ | $W^{(1)}_{2i_{1a}+3,i_{1b},0}$ | $W^{(1)}_{2i_{1a}+3,i_{1b},0}$ | $W^{(1)}_{2i_{1a}+3,i_{1b},8}$ | $W^{(1)}_{2i_{1a}+3,i_{1b},16}$ | $W^{(1)}_{2i_{1a}+3,i_{1b},24}$ |
| $i_1$ | $i_2$ | | | | | | | |
|  | 32 | 33 | 34 | 35 | 36 | 37 | 38 | 39 |
| 0-255 | $W^{(1)}_{2i_{1a},i_{1b}+8,0}$ | $W^{(1)}_{2i_{1a},i_{1b}+8,8}$ | $W^{(1)}_{2i_{1a},i_{1b}+8,16}$ | $W^{(1)}_{2i_{1a},i_{1b}+8,24}$ | $W^{(1)}_{2i_{1a},i_{1b}+8,2}$ | $W^{(1)}_{2i_{1a},i_{1b}+8,10}$ | $W^{(1)}_{2i_{1a},i_{1b}+8,18}$ | $W^{(1)}_{2i_{1a},i_{1b}+8,26}$ |
| $i_1$ | $i_2$ | | | | | | | |
|  | ... | 65 | 66 | 67 | 68 | 69 | 70 | 71 |
| 0-255 | ... | $W^{(1)}_{2i_{1a},i_{1b}+16,8}$ | $W^{(1)}_{2i_{1a},i_{1b}+16,16}$ | $W^{(1)}_{2i_{1a},i_{1b}+16,24}$ | $W^{(1)}_{2i_{1a},i_{1b}+16,4}$ | $W^{(1)}_{2i_{1a},i_{1b}+16,12}$ | $W^{(1)}_{2i_{1a},i_{1b}+16,20}$ | $W^{(1)}_{2i_{1a},i_{1b}+16,28}$ |

TABLE 5-continued

| $i_1$ | ... | 121 | 122 | 123 | 124 | 125 | 126 | 127 |
|---|---|---|---|---|---|---|---|---|
| 0-255 | ... | $W^{(1)}_{2i_{1a}+3,i_{1b}+24,8}$ | $W^{(1)}_{2i_{1a}+3,i_{1b}+24,16}$ | $W^{(1)}_{2i_{1a}+3,i_{1b}+24,24}$ | $W^{(1)}_{2i_{1a}+3,i_{1b}+24,6}$ | $W^{(1)}_{2i_{1a}+3,i_{1b}+24,16}$ | $W^{(1)}_{2i_{1a}+3,i_{1b}+24,22}$ | $W^{(1)}_{2i_{1a}+3,i_{1b}+24,30}$ | where $W^{(1)}_{p,p',q} = \frac{1}{\sqrt{16}} \begin{bmatrix} v''_{p,p'} \\ \varphi_q v''_{p,p'} \end{bmatrix}$, $i_{1a} = i_1 \bmod 16$, $i_{1b} = \lfloor i_1/16 \rfloor$, and $\varphi_q = e^{j2\pi q/32}$ The codebook of Table 5 is a codebook table created assuming that $W_1$ (i1) is 8 bits and $W_2$ (i2) is 7 bits. $W_1$ is composed of $W_{11}$ ($i_{11}$) of 4 bits and $W_{12}$ ($i_{11}$) of 4 bits. In order to express this as $W_1$ of 8 bits, it can be expressed using Equation 8 below.

$$W_1 = 16W_{11} + W_{12} \quad \text{[Equation 8]}$$

When the codebook table of Equation 8 and Table 5 is used, beam group selection in one-dimension and two-dimension may be performed as described above. Unlike $W_1$ in the code book table of Table 5, $W_2$ is composed of $W_{21}$ of 2 bits, $W_{22}$ of 2 bits, and W23 of 3 bits, and $W_2$ is expressed by Equation 9.

$$W_1 = 32W_{11} + 8W_{12} + W_{13} \quad \text{[Equation 9]}$$

Accordingly, $W_{11}$ ($PMI_{1H}$), $W_{12}$ ($PMI_{1V}$), $W_{21}$ ($PMI_{2H}$), $W_{22}$ ($PMI_{2V}$), and $W_{23}$ ($PMI_{2C}$) may be extracted from $W_1$ and $W_2$ through the above bit configuration even if they are not exactly indicated in the codebook.

It should be noted that the horizontal and vertical dimensions may be expressed as a first dimension and a second dimension in actual notation. In the second disclosure, "1" represents the horizontal dimension and "2" represents the vertical dimension, but these are only for convenience and may be expressed differently. Accordingly, "2" may represent the horizontal dimension and "1" may represent the vertical dimension, which may vary depending on the implementation of an eNB and a UE. That is, an arbitrary eNB may use the first dimension as the horizontal dimension and the second dimension as the vertical dimension, and another eNB may use the first dimension as the vertical dimension and the second dimension as the horizontal dimension.

Further, although description has been made on the basis of the codebook composed of $W_1$ and $W_2$ in the second disclosure, this means that the components in the horizontal and vertical directions in $W_1$ can be simultaneously reported, and even when the components in the horizontal and vertical directions in $W_1$ are reported separately, the same operation is possible using the second disclosure.

Figure 22:
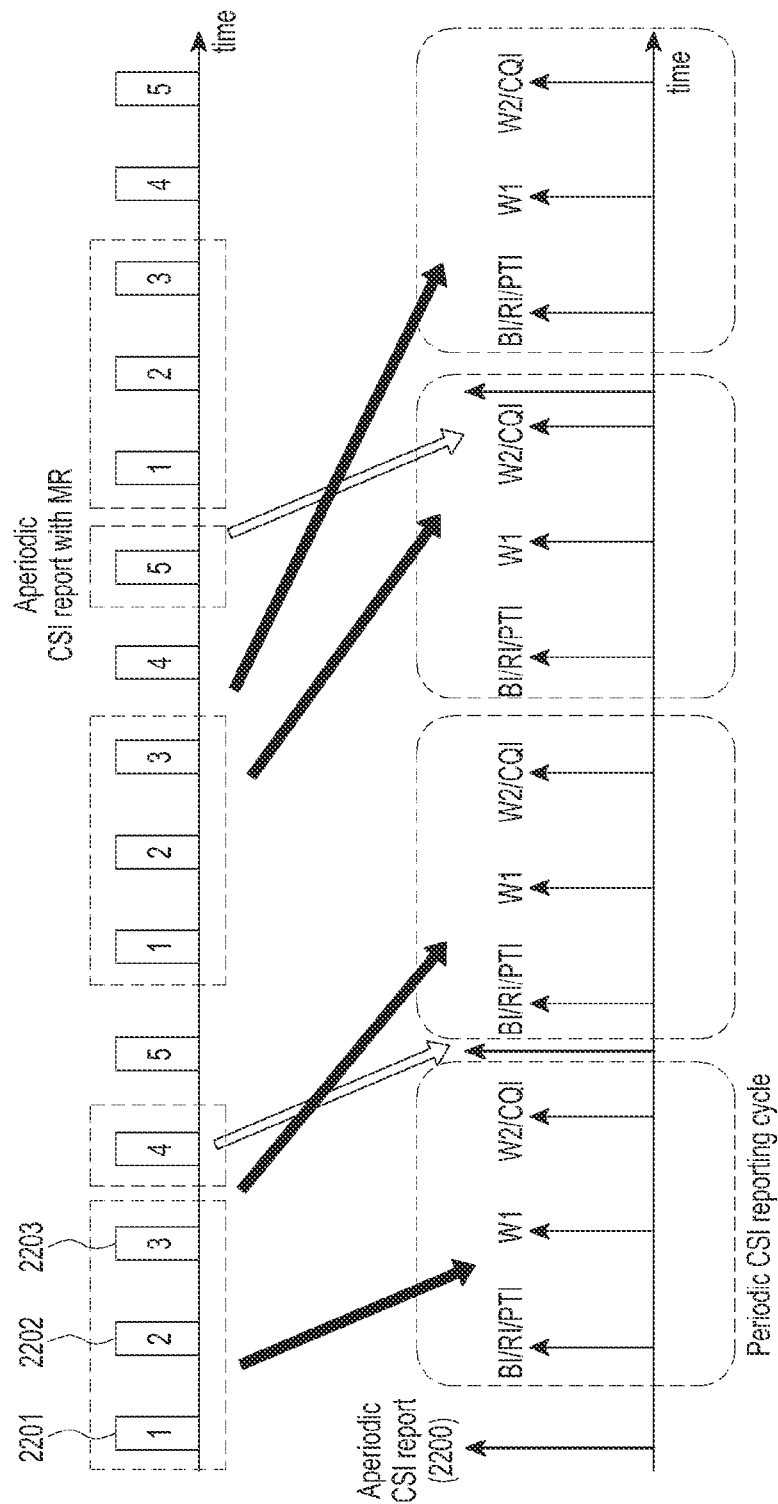
FIG. 22 is a diagram illustrating an example of CSI-RS transmission and channel status reporting of a UE and an eNB which use a BI for periodic channel status reporting and use measurement restriction and an aperiodic CSI-RS for aperiodic channel status reporting according to the second disclosure.

FIG. 22 is a diagram illustrating an example of CSI-RS transmission and channel status reporting of a UE and an eNB which use a BI for periodic channel status reporting and use measurement restriction and an aperiodic CSI-RS for aperiodic channel status reporting according to the second disclosure.

In FIG. 22, CSI-RSs 1, 2, and 3 (2201, 2202 and 2203) are configured in a semi-static manner in a UE for the purpose of periodic channel status reporting. The UE may determine that the CSI-RSs 1, 2, and 3 (2201, 2202, and 2203) all have the same statistical characteristics and may improve the channel estimation performance using a method of calculating an average value or the like. The UE generates channel status information through the CSI-RSs 1, 2, and 3 (2201, 2202, and 2203). The channel status information may include BI information, which is index information of at least one CSI-RS resource selected by the UE.

The eNB receives the channel status information including the BI information from the UE. As a result, when it is determined that the resource indicated by the BI is changed or the channel status information reported by the UE is not correct, the eNB triggers the aperiodic channel status report to report new channel status information to the UE.

At this time, the aperiodic channel status information may utilize aperiodic CSI-RS and measurement restriction. In order to obtain more accurate channel status information, the aperiodic channel status information may use a UE-specific beam based on BI and SRS, and thus the aperiodic CSI-RS may have different statistical characteristics depending on the UE. The UE does not normally measure a corresponding CSI-RS 5, but measures a corresponding resource when receiving an aperiodic channel status report trigger. Accordingly, when it is determined that the channel status report reported by the UE is inaccurate, or when it is determined that the beam required by the UE is changed and the accurate channel status report is required, the CSI-RS 5 is allocated only to the corresponding UE so that the CSI-RS 5 is used as an aperiodic CSI-RS to allow the UE to report the aperiodic channel status information. This saves the CSI-RS resource required for the UE-specific beam and reduces the overhead.

It should be noted that measurement restriction may also be applied for periodic channel status report that reports BI. However, this is for the purpose of reducing an increase in the overhead due to an increase in the number of cell-specific beams required for the cell-specific CSI-RS. Here, the measurement restriction and effects for supporting the UE-specific beam are the same, but the purpose may be different.

In addition, in FIG. 22, the aperiodic CSI-RS and measurement restriction may be used for the periodic channel status reporting and the measurement restriction and the BI may be used for the aperiodic CSI-RS, as opposed to the fact that the BI is for the periodic channel status reporting and the aperiodic CSI-RS and the measurement restriction are used for the aperiodic channel status reporting.

Figure 23:
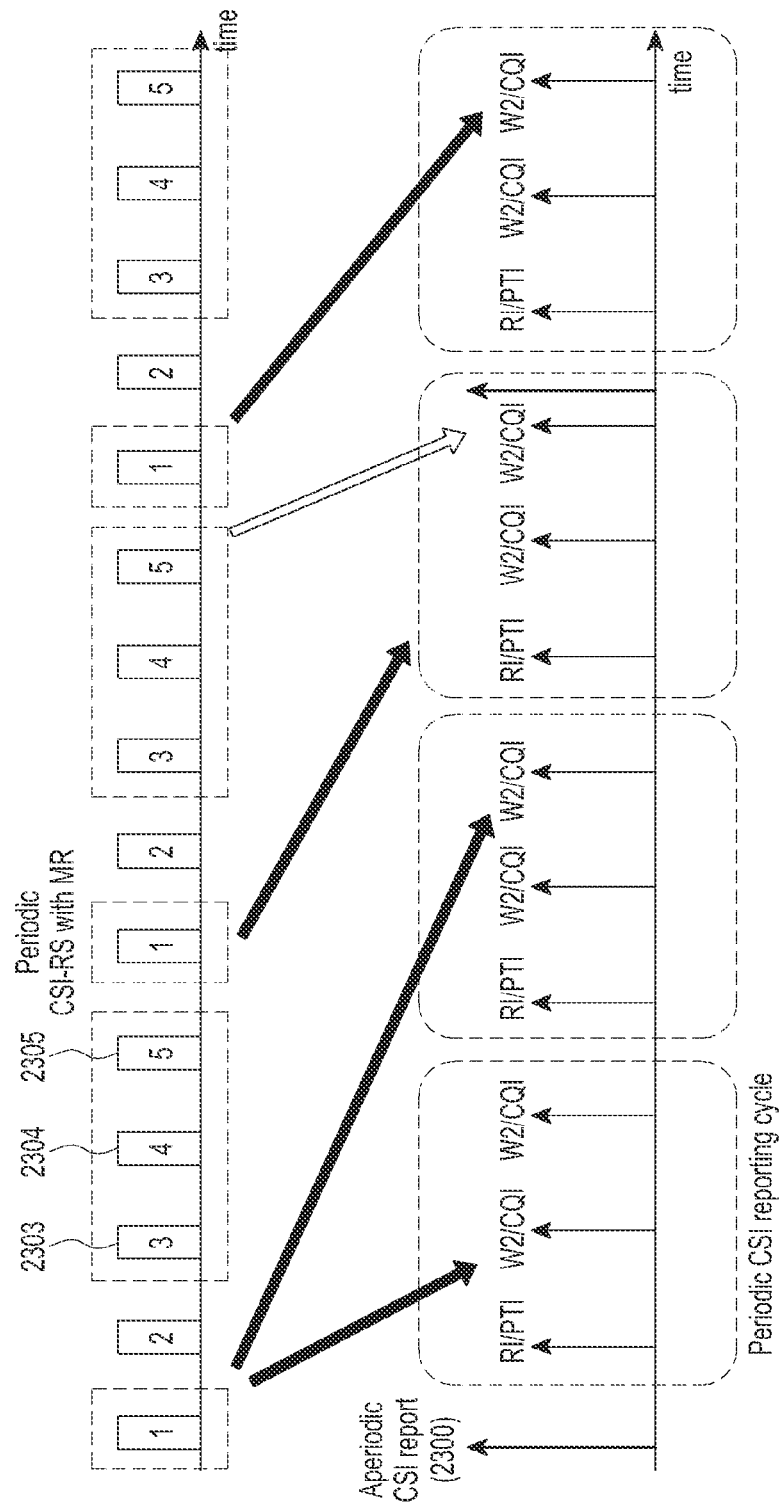
FIG. 23 is a diagram illustrating an example of CSI-RS transmission and channel status reporting operations of a UE and an eNB which use an aperiodic CSI-RS and measurement restriction for periodic channel status reporting and use measurement restriction and a BI for aperiodic channel status reporting.

FIG. 23 is a diagram illustrating an example of CSI-RS transmission and channel status reporting operations of a UE and an eNB which use an aperiodic CSI-RS and measurement restriction for periodic channel status reporting and use measurement restriction and a BI for aperiodic channel status reporting.

In FIG. 23, CSI-RSs 3, 4 and 5 (2303, 2304, and 2305) are configured in a semi-static manner to the UE for aperiodic channel status reporting. The UE may determine that the CSI-RSs 3, 4, and 5 (2303, 2304, and 2305) all have the same statistical characteristics, and may improve the channel estimation performance using a method of obtaining an average value. The UE generates channel status information using the CSI-RSs 3, 4, and 5 (2303, 2304, and 2305), and the channel status information may include the BI.

The eNB receives the channel status information including the BI, and transmits a CSI-RS using a new beam for the periodic channel status reporting of the UE when it is determined that the resource indicated by the BI is changed or the channel status information reported by the UE is inaccurate. Since the UE generates a periodic channel status report using the CSI-RS using the new beam, the UE may determine the performance of the new beam. In this manner, the periodic channel status information may be generated using aperiodic CSI-RS and measurement restriction.

Consequently, the periodic channel status information may be generated using a UE-specific beam based on BI and SRS, or may be generated using a cell-specific beam that the eNB does not use to generate the aperiodic channel status information. Accordingly, the aperiodic CSI-RS may have different statistical characteristics depending on the UE.

A difference from FIG. 22 is that the UE always measures the CSI-RS 1 and reports the measured CSI-RS 1 to the eNB in FIG. 23. Accordingly, the eNB may continuously receive information on other beams required for the UE, and when the resource is considered good enough, the eNB may apply the resource to the CSI-RS for the aperiodic channel status reporting so that the UE measures and reports accurate information. Therefore, in FIG. 23, the measurement restriction should also be applied to the CSI-RS of the aperiodic channel status reporting that reports the BI. However, this is for the purpose of preventing an increase in the overhead due to an increase in the number of cell-specific beams required for the cell-specific CSI-RS. Here, the measurement restriction and effects for supporting the UE-specific beam are the same, but the purpose may be different.

Meanwhile, in order for the UE to report feedback information, the UE receives feedback information on 2D-CSI-RS. In this case, the corresponding 2D-CSI-RS may be one piece of information designating a plurality of CSI-RS ports, or information in which the CSI-RSs of a plurality (for example, 2, 4, or 8 or more) of ports are combined (resource configuration or subframe configuration) to designate a plurality of CSI-RS ports. One piece of feedback information is allocated to the UE through upper layer signaling (i.e., RRC information). An example of the RRC information on the feedback allocation may include at least a part of Table 6 below.

TABLE 6

| Feedback information (Feedback) |
| --- |
| CSI-RS information: CSI-RS<br>Reporting mode<br>Feedback timing<br>PMI codebook information<br>Etc . . . |

The PMI codebook information is information on a set of available precoding matrices for the corresponding feedback. When the PMI codebook information is not included in the RRC information on feedback, each feedback may be configured such that all precoding matrices previously defined in the LTE-A standard are available for feedback. The PMI codebook information includes at least one of the number of total antenna ports required for codebook configuration, the number of antenna ports of the first dimension and the second dimension, an oversampling factor, a beam group spacing, the number of beams in each beam group, and a beam spacing. When there is a plurality of codebooks, each of the plurality of codebooks may be designated as codebook indexes such as codebook #0 and codebook #1.

Figure 24:
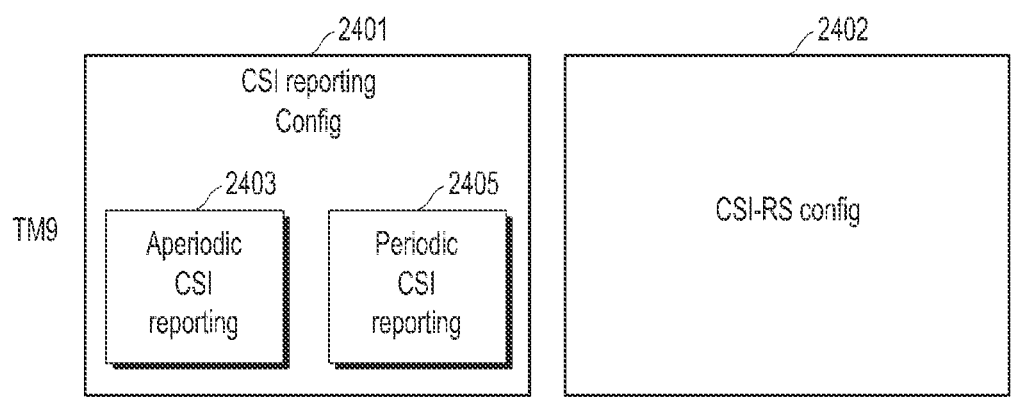
FIG. 24 is a diagram illustrating a CSI-RS 2402 and a CSI reporting configuration 2401 in a transmission mode (TM) 9.

FIG. 24 is a diagram illustrating a CSI-RS 2402 and a CSI reporting configuration 2401 in a transmission mode (TM) 9.

As shown in FIG. 24, the CSI reporting configuration 2401 and the CSI-RS configuration 2402 exist as separate fields in the TM 9, the CSI reporting configuration 2401 includes a field 2403 for aperiodic channel status reporting and a field 2405 for periodic channel status reporting. According to the above configuration, the UE may report the periodic and aperiodic channel status information to the eNB using the CSI-RS resource indicated by the CSI-RS configuration 2402.

Figure 25:
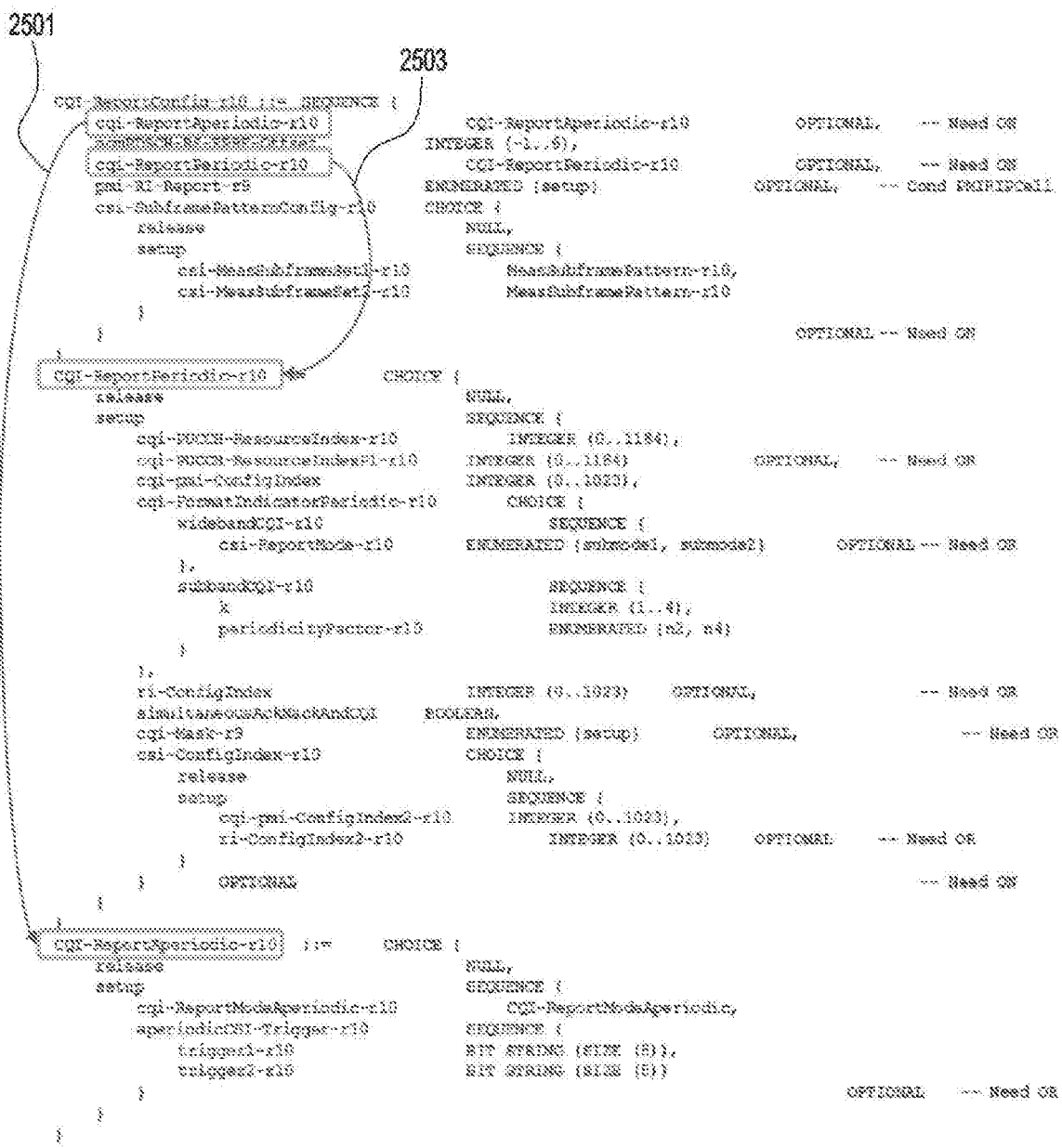
FIG. 25 is a diagram illustrating an example of a CSI reporting configuration 2401 in the TM 9 explained in FIG. 24.

FIG. 25 is a diagram illustrating an example of a CSI reporting configuration 2401 in the TM 9 explained in FIG. 24.

Referring to FIG. 25, it can be seen that "CQI-Report-Config-r10" corresponding to the CSI reporting configuration 2401 includes "CQI-ReportPeriodic-r10" corresponding to the field 2405 for periodic channel status reporting and "CQI-ReportPeriodic-r10" corresponding to the field 2403 for aperiodic channel status reporting.

Figure 26:
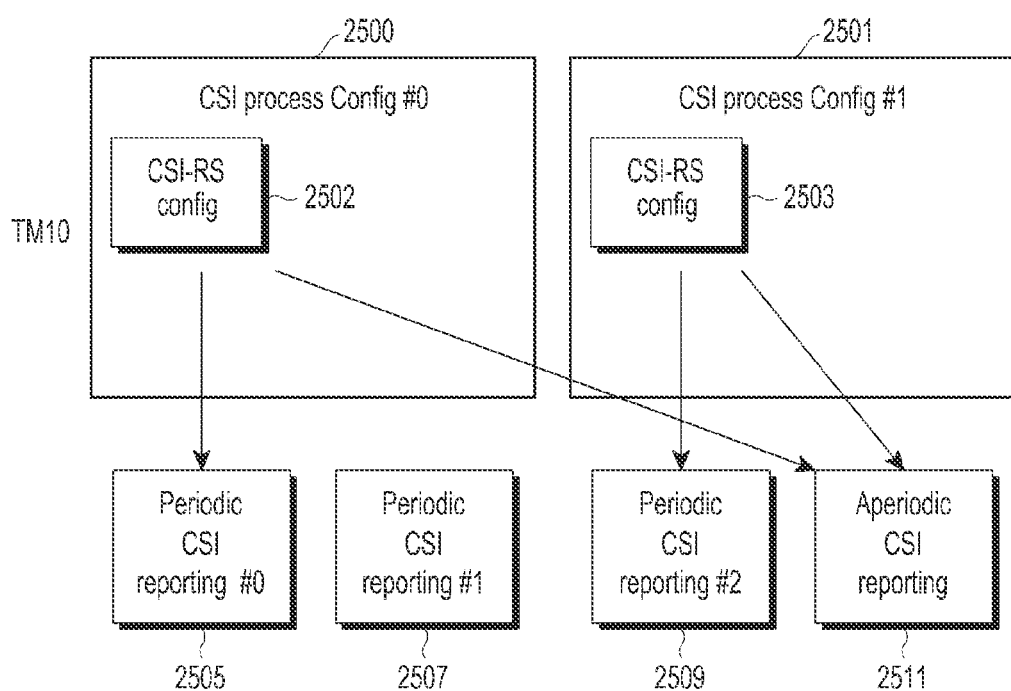
FIG. 26 is a diagram illustrating an example of CSI process configuration and CSI reporting configuration in a TM 10.

FIG. 26 is a diagram illustrating an example of CSI process configuration and CSI reporting configuration in a TM 10.

In the TM 10, CSI-RS configurations 2502 and 2503 exist as separate fields in respective CSI processes 2500 and 2501, and CSI reporting configurations 2505, 2507, 2509 and 2511 exist separately from the CSI processes 2500 and 2501. The CSI processes 2500 and 2501 may configure one periodic CSI reporting of a plurality of CSI reporting configurations 2505, 2507, and 2509. For example, in the CSI process #0 (2500), the periodic CSI reporting #0 (2505) has been configured.

On the other hand, the CSI processes 2500 and 2501 are capable of configuring one aperiodic channel status report, and in all the CSI processes reporting the aperiodic channel status, the same one aperiodic channel status report is configured, so that each CSI process uses one aperiodic channel status reporting mode. In FIG. 25, the same one aperiodic CSI reporting 2511 is configured in the CSI processes 2500 and 2501.

FIGS. 27A and 27B illustrate an example of CSI process configuration and CSI reporting configuration in the TM 10 explained in FIG. 25.

Referring to FIGS. 27A and 27B, in "CQI-Process-r11", "CQI-ReportPeriodicProcId-r11" indicates which periodic CSI reporting configuration should be used, and "CQI-ReportAperiodicProc-r11" includes information of the configuration for the aperiodic channel status report. However, since the existing configuration method in TM 9 and TM 10 described in FIGS. 24 to 27B has a structure in which the aperiodic CSI-RS, the BI reporting, and the measurement restriction which have been proposed in the second disclosure cannot be effectively configured, a new configuration structure for the CSI process is proposed in the second disclosure.

Figure 28:
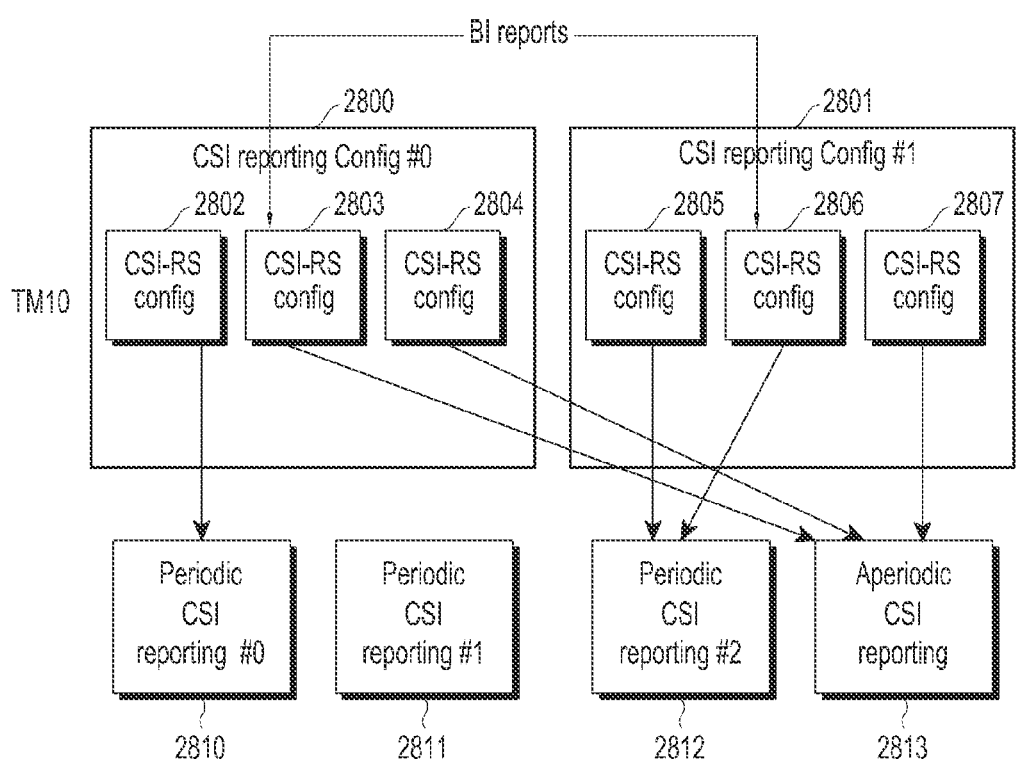
FIG. 28 is a diagram illustrating the structure of a CSI process proposed in the second disclosure.

FIG. 28 is a diagram illustrating the structure of a CSI process proposed in the second disclosure.

Referring to FIG. 28, each of a plurality of CSI-RS configurations (CSI-RS config) 2802, 2803, 2804/2805, 2806, and 2807 existing in the CSI processes 2800 and 2801 is associated with periodic CSI report configurations 2810, 2811, and 2812 or an aperiodic CSI reporting configuration 2813.

In the second disclosure, when the plurality of CSI-RS configurations 2802, 2803, 2804/2805, 2806, and 2807 are associated with one CSI reporting configuration, it may be configured to indicate a channel status report for reporting BI.

In addition, when one CSI-RS configuration is associated with the periodic or aperiodic CSI reporting configuration, it may be configured to indicate a channel status report that does not include BI. The channel status report at this time may be the same (Class A) RI/PMI/CQI as NP CSI-RS or RI/PMI/CQI that is configured for BF CSI-RS (Class B).

This configuration may be configured by a field indicating whether to configure a codebook specially configured through higher layer signaling (i.e., RRC configuration). In addition, in a case in which only one CSI-RS resource is configured when the channel status report is the Class B, the UE may report, to the eNB, the RI/PMI/CQI that is configured for BF CSI-RS. At this time, the PMI may be a form of reporting an index of a codebook using $W_2$ used in an existing codebook or a 2D codebook.

The BI configuration method according to the periodic or aperiodic channel status reporting configuration proposed in the second disclosure is as follows.

BI configuration method 1: Whether an arbitrary CSI-RS resource is included for periodic/aperiodic channel status report in the CSI process is configured as a bitmap.

BI configuration method 2: What CSI-RS resource is included for periodic/aperiodic channel status report in the CSI process is configured as CSI-RS resource index.

BI configuration method 3: Resources (configurations) in the CSI process are associated with periodic CSI reporting configuration and aperiodic CSI reporting configuration, respectively, and the CSI-RS is configured based on the association.

BI configuration method 4: BI field is configured for each CSI-RS resource and CSI-RS is configured using a method of ascertaining whether BI is included in periodic or aperiodic CSI reporting configuration.

Using the BI configuration method 1, the UE may configure, in a bitmap format, what CSI-RS resource is included in the configuration for periodic/aperiodic channel status report. Table 7 below shows bitmap configurations when there are four CSI-RS resources according to the BI configuration method 1.

TABLE 7

| cqi-ReportResourcePatternConfig-r13 | CHOICE { |
| --- | --- |
| release | NULL, |
| setup | SEQUENCE { |
|     cqi-PeriodicResource-r13 | BIT STRING (SIZE (4)) |
|     cqi-AperiodicResource-r13 | BIT STRING (SIZE (4)) |
|   } | |
| } | |

In Table 7, what resource is configured for each periodic/aperiodic channel status report is indicated by a bit map. When a plurality of resources is configured for the corresponding channel status report, the periodic or aperiodic channel status report includes the BI. When one resource is configured for the corresponding channel status report, the corresponding channel report does not include the BI. Accordingly, the BI may be configured separately for periodic/aperiodic CSI report, and CSI-RS resources required for periodic/aperiodic CSI report is separately configured using the configured BI to operate the corresponding system.

Using the BI configuration method 2, the UE may configure, in the form of resource indexes, what CSI-RS resource is included for the configuration for periodic/aperiodic channel status report. Table 8 below shows an example of configuration in the form of resource indexes when the number of CSI-RS resources is 4 according to the BI configuration method 1.

TABLE 8

| cqi-ReportResourcePatternConfig-r13 | CHOICE { |
| --- | --- |
| release | NULL, |
| setup | SEQUENCE { |
|     cqi-PeriodicResource-r13 | ENUMERATED { 0,1,2,3 } |
|     cqi-AperiodicResource-r13 | ENUMERATED { 0,1,2,3 } |
|   } | |
| } | |

Table 8 is the same as the description of Table 7 except that what resource is configured for each periodic/aperiodic channel status report is indicated by the resource index.

Using the BI configuration method 3, the UE may perform configuration of the periodic/aperiodic channel status report based on an association relationship between the resources in the CSI process with periodic CSI reporting configuration and aperiodic CSI reporting configuration. Table 9 below shows an example of configuration when the number of CSI-RS resources is 4 according to the BI configuration method 3.

TABLE 9

| CSI-RS-ConfigNZP-r11 ::= | SEQUENCE { |
| --- | --- |
|   csi-RS-ConfigNZPId-r11 | CSI-RS-ConfigNZPId-r11, |
|   antennaPortsCount-r11 | ENUMERATED {an1, an2, an4, an8}, |
|   resourceConfig-r11 | INTEGER (0..31), |
|   subframeConfig-r11 | INTEGER (0..154), |
|   scramblingIdentity-r11 | INTEGER (0..503), |
|   cqi-ReportPeriodicProcId-r13 | INTEGER (0..maxCQI-ProcExt-r13) OPTIONAL, -- Need OR |
|   cqi-ReportAperiodicProc-r13 | CQI-ReportAperiodicProc-r13 OPTIONAL, -- Need OR |
|   qcl-CRS-Info-r11 | SEQUENCE { |
|     qcl-ScramblingIdentity-r11 | INTEGER (0..503), |
|     crs-PortsCount-r11 | ENUMERATED {n1, n2, n4, spare1}, |
|     mbsfn-SubframeConfigList-r11 | CHOICE { |
|       release | NULL, |
|       setup | SEQUENCE { |
|         subframeConfigList | MBSFN-SubframeConfigList |
|     } | |

TABLE 9-continued

```
  }                                   OPTIONAL -- Need ON
 }                                    OPTIONAL,  -- Need OR
 ...
}
```

In Table 9, a field indicating what periodic channel status report is configured for each CSI-RS resource or whether the aperiodic channel status report is configured may exist. Accordingly, the UE may confirm in which periodic reporting configuration or aperiodic reporting configuration the resources are included through each CSI-RS resource configuration. When a plurality of resources is configured in the corresponding channel status report, the periodic or aperiodic channel status report includes the BI. When one resource is configured in the corresponding channel report, the corresponding channel report does not include the BI. Accordingly, the BI may be configured separately for the periodic/aperiodic CSI report, and the CSI-RS resource required for periodic/aperiodic CSI report is separately configured using the configured BI to operate the corresponding system.

In addition, in the BI configuration method 3, whether the BI is included in the CSI reporting configuration may be confirmed. Table 10 below shows a case in which the BI configuration is included in the CSI reporting configuration.

TABLE 10

```
CQI-ReportPeriodicProcExt-r11 ::=        SEQUENCE {
    cqi-ReportPeriodicProcExtId-r11      CQI-ReportPeriodicProcExtId-r11,
    cqi-bi-ReportPeriodic                ENUMERATED {ON}
    cqi-pmi-ConfigIndex-r11              INTEGER (0..1023),
    cqi-FormatIndicatorPeriodic-r11      CHOICE {
        widebandCQI-r11                      SEQUENCE {
            csi-ReportMode-r11                   ENUMERATED {submode1, submode2}
        OPTIONAL-- Need OR
        },
        subbandCQI-r11                       SEQUENCE {
            k                                    INTEGER (1..4),
            periodicityFactor-r11                ENUMERATED {n2, n4}
        }
    },
    ri-ConfigIndex-r11                   INTEGER (0..1023)
    OPTIONAL,      -- Need OR
    csi-ConfigIndex-r11                  CHOICE {
        release                              NULL,
        setup                                SEQUENCE {
            cqi-pmi-ConfigIndex2-r11             INTEGER (0..1023),
            ri-ConfigIndex2-r11                  INTEGER
    (0..1023)    OPTIONAL    -- Need OR
        }
    }                                                                    OPTIONAL,
    -- Need ON
    ...
}
CQI-ReportAperiodicProc-r11 ::=          SEQUENCE {
    cqi-bi-ReportAperiodic               ENUMERATED {ON}
    cqi-ReportModeAperiodic-r11          CQI-ReportModeAperiodic,
    trigger01-r11                        BOOLEAN,
    trigger10-r11                        BOOLEAN,
    trigger11-r11                        BOOLEAN
}
```

Using the BI configuration method 4, the UE may configure a BI field for each CSI-RS resource, and may configure the CSI-RS through a method of ascertaining whether the BI is present in the periodic or aperiodic CSI reporting configuration. Table 11 below shows CSI-RS configuration when the number of CSI-RS resources is 4 according to the BI configuration method 4.

In the BI configuration method 4, the BI is configured for each CSI-RS resource, whether the BI is present for the periodic or aperiodic CSI reporting configuration is ascertained, and the BI is configured based on the ascertained result. Table 11 below shows such a CRS-RS configuration.

TABLE 11

```
CSI-RS-ConfigNZP-r11 ::=     SEQUENCE {
    csi-RS-ConfigNZPId-r11       CSI-RS-ConfigNZPId-r11,
    antennaPortsCount-r11        ENUMERATED {an1, an2, an4, an8},
```

TABLE 11-continued

```
resourceConfig-r11            INTEGER (0..31),
subframeConfig-r11            INTEGER (0..154),
scramblingIdentity-r11        INTEGER (0..503),
cqi-BIReport-r13              ENUMERATED {ON}      OPTIONAL,
qcl-CRS-Info-r11              SEQUENCE {
    qcl-ScramblingIdentity-r11    INTEGER (0..503),
    crs-PortsCount-r11            ENUMERATED {n1, n2, n4, spare1},
    mbsfn-SubframeConfigList-r11  CHOICE {
        release                   NULL,
        setup                     SEQUENCE {
            subframeConfigList        MBSFN-SubframeConfigList
        }
    }                                                OPTIONAL -- Need ON
}                                                    OPTIONAL,   -- Need OR
...
}
```

According to the CSI-RS configuration of Table 11, each resource includes a field enabling BI configuration. According to such a configuration, the UE may ascertain whether the periodic or aperiodic channel status reporting configuration includes the BI report, may perform channel status reporting using the channel status reporting configuration including the BI reporting when the corresponding resource includes the BI reporting, and may perform channel status reporting using the channel status reporting configuration that does not include the BI reporting when the corresponding resource does not include the BI reporting. For reference, since the BI configuration method 4 should determine whether the corresponding resource is the periodic CSI-RS resource or the aperiodic CSI-RS resource through the BI, all the periodic and aperiodic channel status reports cannot report the BI.

In the description of the BI configuration methods 1 to 4, the name of the corresponding field and the name of a beam selection report are indicated by BI, but they are only examples. Other names such as a CSI-RS resource index, a CSI-RS index, a resource index, an RS index, a TP index, Config index, and the like are also possible.

Meanwhile, similarly to the above BI configuration, for CSI-RS transmission and CSI generation operations of the eNB and the US described in FIGS. 22 and 23, the configuration of the measurement restriction should be separated according to the periodic and aperiodic channel status reports. Hereinafter, a method of configuring the measurement restriction will be described. Two measurement restriction configuration methods proposed in the second disclosure is as follows.

Measurement restriction configuration method 1: Configure the measurement restriction in the periodic and aperiodic channel status report configurations.

Measurement restriction configuration method 2: Configure the measurement restriction in the CSI-RS resource configuration.

Using the measurement restriction configuration method 1, the UE may configure whether the measurement restriction is configured for the configuration for the periodic/aperiodic channel status reports, respectively. Table 12 below shows an example of the measurement restriction configuration method 1.

TABLE 12

```
CQI-ReportPeriodicProcExt-r11 ::=     SEQUENCE {
    cqi-ReportPeriodicProcExtId-r11   CQI-ReportPeriodicProcExtId-r11,
    cqi-MeasurementRestrictionPeriodic    ENUMERATED {ON}
    cqi-pmi-ConfigIndex-r11           INTEGER (0..1023),
    cqi-FormatIndicatorPeriodic-r11   CHOICE {
        widebandCQI-r11                   SEQUENCE {
            csi-ReportMode-r11                ENUMERATED {submode1, submode2}
    OPTIONAL-- Need OR
        },
        subbandCQI-r11                    SEQUENCE {
            k                                 INTEGER (1..4),
            periodicityFactor-r11             ENUMERATED {n2, n4}
        }
    },
    ri-ConfigIndex-r11                INTEGER (0..1023)
    OPTIONAL,   -- Need OR
    csi-ConfigIndex-r11               CHOICE {
        release                           NULL,
        setup                             SEQUENCE {
            cqi-pmi-ConfigIndex2-r11          INTEGER (0..1023),
            ri-ConfigIndex2-r11               INTEGER
(0..1023)       OPTIONAL    -- Need OR
        }
    }                                                                   OPTIONAL,
    -- Need ON
    ...
}
CQI-ReportAperiodicProc-r11 ::=       SEQUENCE {
    cqi-MeasurementRestrictionReportAperiodic         ENUMERATED {ON}
    cqi-ReportModeAperiodic-r11       CQI-ReportModeAperiodic,
```

TABLE 12-continued

|  |  |
|---|---|
| trigger01-r11 | BOOLEAN, |
| trigger10-r11 | BOOLEAN, |
| trigger11-r11 | BOOLEAN |
| } |  |

In Table 12, whether the measurement restriction is configured for each periodic/aperiodic channel status report is indicated, and the corresponding periodic or aperiodic channel status may be reported according to the indication by applying or not applying the measurement restriction. At this time, the configuration of the number of RSs for the measurement restriction is needed. Table 12 below shows an example of the configuration of the number of RSs for the measurement restriction.

TABLE 13

| CSI-RS-MeasurementRestiction-r13 ::= | SEQUENCE { |
|---|---|
| PeriodConfig-r13 | INTEGER (0..154), |
| csi-RS-Config-r13 | ENUMERATED {1, 2, 4, 8},} |

Referring to Table 13, "PeriodCongi-r13" indicates that the period of the measurement restriction is configured, and "csi-RS-Config-r13" is a filed indicating the number of CSI-RSs to be used for the measurement restriction. At least one of the above fields may be included when the measurement restriction is configured.

The period of the measurement restriction uses a method in which those related to the CSI-RS transmission period and the transmission frequency are indicated as a table in a similar manner to CSI-RS subframe configuration (subframe config), and "csi-RS-Config-r13" indicates the number of CSI-RSs to be used for the measurement restriction. The numbers 154 and 1, 2, 4, and 8 used in the above example are only for examples, and the actually used numbers may be different. Also, in the above example, a measurement restriction configuration field and a field for configuring a frequency and a period for the measurement restriction configuration are illustrated as being separately present, but they may be included in one field.

Table 14 below shows an example of the measurement restriction configuration method 2.

figuration, may determine whether the corresponding resources use the measurement restriction, and determine whether to use the measurement restriction when the channel status report is generated based on the corresponding resources.

Further, using the above-described measurement restriction method 1 and measurement restriction method 2 simultaneously, whether the corresponding resource uses the periodic channel status report or the aperiodic channel status report may be indicated through information indicating whether the measurement restriction is configured in the CSI-RS resource and information indicating whether the measurement restriction is configured in the periodic or aperiodic channel status reports. At this time, a method of using the BI when there is one associated resource and not using the BI when there is a plurality of associated resources is also possible.

Hereinafter, the operation of a UE and an eNB according to an embodiment of the second disclosure and device components will be described.

Figure 29:
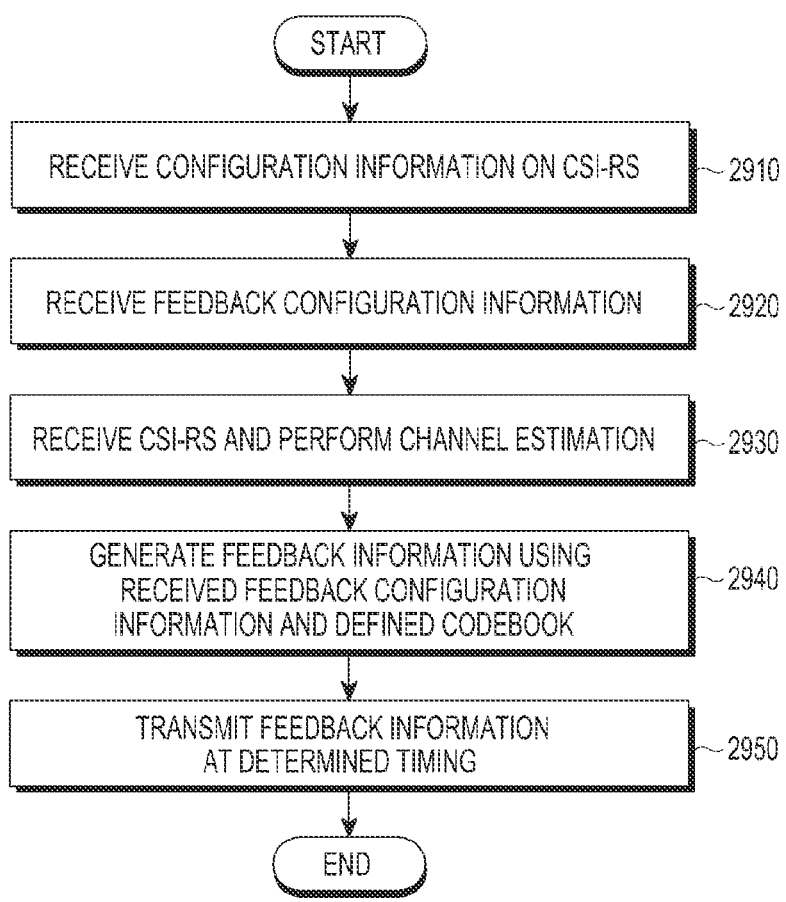
FIG. 29 is a diagram illustrating the operation of a UE according to an embodiment of the second disclosure.

FIG. 29 is a diagram illustrating the operation of a UE according to an embodiment of the second disclosure.

In operation 2910, a UE receives configuration information on CSI-RS configuration from an eNB. At this time, the above-described configurations such as the resource index necessary for the measurement restriction and the BI, the configuration necessary for the number of periodic CSI-RSs, and the like may be received. In addition, the UE may ascertain at least one of the number of ports for each CSI-RS, timing and resource location at which each CSI-RS is transmitted, whether RI-based CSI-process is configured, a corresponding CSI-process index, and transmission power information based on the received configuration information. Next, in operation 2920, the UE configures one piece of feedback configuration information based on at least one CSI-RS resource. At this time, configuration information

TABLE 14

| CSI-RS-ConfigNZP-r11 ::= | SEQUENCE { |  |
|---|---|---|
| csi-RS-ConfigNZPId-r11 | CSI-RS-ConfigNZPId-r11, |  |
| antennaPortsCount-r11 | ENUMERATED {an1, an2, an4, an8}, |  |
| resourceConfig-r11 | INTEGER (0..31), |  |
| subframeConfig-r11 | INTEGER (0..154), |  |
| scramblingIdentity-r11 | INTEGER (0..503), |  |
| MeasurementRestriction-r13 | ENUMERATED {ON} | OPTIONAL, |
| qcl-CRS-Info-r11 | SEQUENCE { |  |
|   qcl-ScramblingIdentity-r11 | INTEGER (0..503), |  |
|   crs-PortsCount-r11 | ENUMERATED {n1, n2, n4, spare1}, |  |
|   mbsfn-SubframeConfigList-r11 | CHOICE { |  |
|     release | NULL, |  |
|     setup | SEQUENCE { |  |
|       subframeConfigList | MBSFN-SubframeConfigList |  |
|     } |  |  |
|   } | OPTIONAL -- Need ON |  |
| } | OPTIONAL, -- Need OR |  |
| ... |  |  |
| } |  |  |

Referring to Table 14, CSI-RS resource configuration includes a field indicating which measurement restriction is configured. The UE may receive the CSI-RS resource con- such as the resource index necessary for the measurement restriction and the BI, configuration necessary for the number of periodic CSI-RSs, and the like may be received. In operation 2930, the UE receives a CSI-RS and estimates a channel between an eNB antenna and a reception antenna of the corresponding UE based on the received CSI-RS. In operation 2940, based on the estimated channel and a virtual channel added between the CSI-RSs, at least one piece of information of feedback information BI, a rank, a PMI, and a CQI is generated using the received feedback configuration and the defined codebook. Next, in operation 2950, the UE transmits the feedback information to the eNB at determined feedback timing according to the feedback configuration of the eNB, thereby completing the channel feedback generation and reporting process considering a two-dimensional arrangement.

Figure 30:
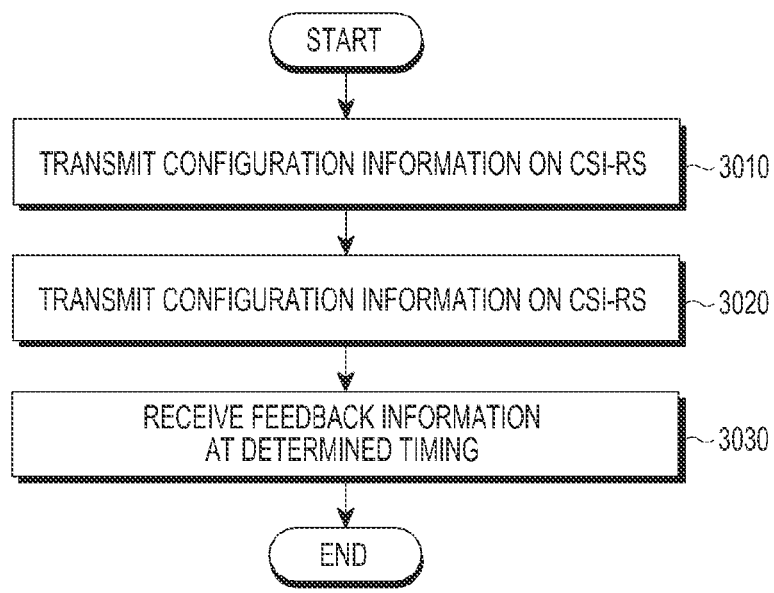
FIG. 30 is a diagram illustrating the operation of a UE according to an embodiment of the second disclosure.

FIG. 30 is a diagram illustrating the operation of a UE according to an embodiment of the second disclosure.

Figure 31:
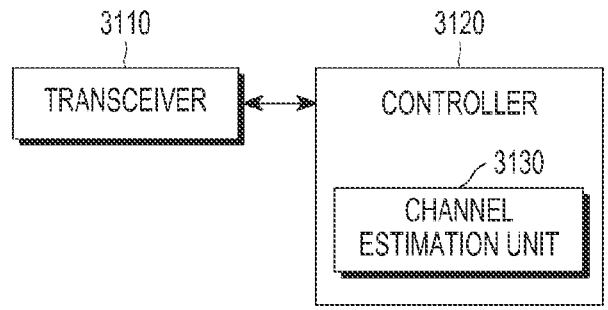
FIG. 31 is a diagram illustrating the configuration of a UE device according to an embodiment of the second disclosure.

Referring to FIG. 31, in operation 3010, an eNB transmits, to a UE, configuration information on CSI-RS for measuring a channel. At this time, the configuration proposed in the present disclosure, such as the resource index necessary for the measurement restriction and the BI, the configuration necessary for the number of periodic CSI-RSs, and the like may be transmitted. In addition, the configuration information may include at least one of the number of ports for each CSI-RS, timing and resource location at which each CSI-RS is transmitted, whether an RI-based CSI-process is configured, a corresponding CSI-process index, and transmission power information. Next, in operation 3020, the eNB transmits, to the UE, feedback configuration information based on at least one CSI-RS. At this time, the configuration described in the second disclosure, such as the resource index necessary for the measurement restriction and the BI, the configuration necessary for the number of periodic CSI-RSs, and the like may be transmitted. Next, the eNB transmits the configured CSI-RS to the UE. The UE estimates a channel for each antenna port based on the CSI-RS, and estimates an additional channel for a virtual resource based on the estimated channel. The UE determines feedback, generates PMI, RI, and CQI corresponding to the determined feedback, and transmits the generated PMI, RI, and CQI to the eNB. Next, in operation 3030, the eNB receives feedback information from the UE at a predetermined timing, and determines a channel status between the UE and the eNB using the feedback information.

FIG. 31 is a diagram illustrating the configuration of a UE device according to an embodiment of the second disclosure.

Referring to FIG. 31, a UE includes a transceiver 3110 and a controller 3120.

The transceiver 3110 performs a function of transmitting or receiving data to and from the outside (for example, eNB). Here, the transceiver 3110 may transmit feedback information to the eNB under the control of the controller 3120. The controller 3120 controls the status and operation of all the components constituting the UE. Specifically, the controller 3120 generates feedback information according to information allocated from the eNB. In addition, the controller 3120 controls the transceiver 3110 to feedback the generated channel information to the eNB according to timing information allocated from the eNB. For this, the controller 3120 may include a channel estimation unit 3130.

The channel estimation unit 3130 determines necessary feedback information through CSI-RS and feedback allocation information received from the eNB, and estimates a channel using the received CSI-RS based on the feedback information. In FIG. 31, an example in which the UE includes the transceiver 3110 and the controller 3120 is described, but the present disclosure is not limited to this.

For example, the UE may further include various components according to functions performed in the UE. For example, the UE may further include a display unit for displaying a current status of the UE, an input unit in which a signal related to a function execution is input from a user, a storage unit for storing data generated in the UE, and the like. Although the channel estimation unit 3130 is illustrated as being included in the controller 3120, the present disclosure is not limited thereto. The controller 3120 may control the transceiver 3110 to receive configuration information on each of at least one reference signal resource from the eNB. The controller 3120 may control the transceiver 3110 to measure the at least one reference signal and to receive feedback configuration information for generating feedback information according to the measurement result from the eNB.

In addition, the controller 3120 may measure the at least one reference signal received through the transceiver 3110 and may generate the feedback information according to the feedback configuration information. The controller 3120 may control the transceiver 3110 to transmit the generated feedback information to the eNB at a feedback timing according to the feedback configuration information. The controller 3120 may receive a Channel status Indication-Reference Signal (CSI-RS) from the eNB, may generate feedback information based on the received CSI-RS, and may transmit the generated feedback information to the eNB. At this time, the controller 3120 may select a precoding matrix for each antenna port group of the eNB, and may further select one additional precoding matrix based on the relationship between the antenna port groups of the eNB.

In addition, the controller 3120 may receive the CSI-RS from the eNB, may generate feedback information based on the received CSI-RS, and may transmit the generated feedback information to the eNB. At this time, the controller 3120 may select one precoding matrix for all antenna port groups of the eNB. The controller 3120 may receive feedback configuration information from the eNB, may receive the CSI-RS from the eNB, may generate feedback information based on the received feedback configuration information and the received CSI-RS, and may transmit the generated feedback information to the eNB. At this time, the controller 3120 may receive additional feedback configuration information based on the feedback configuration information corresponding to each antenna port group of the eNB and the relationship between the antenna port groups.

Figure 32:
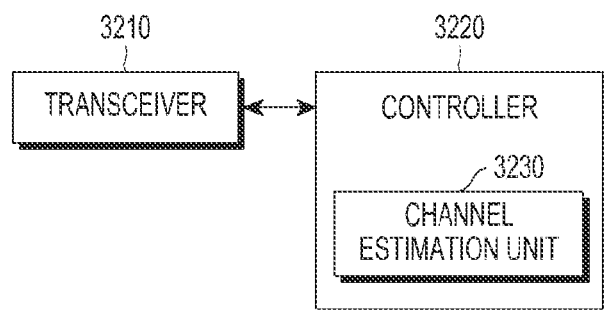
FIG. 32 is a diagram illustrating the configuration of an eNB device according to an embodiment of the second disclosure.

FIG. 32 is a diagram illustrating the configuration of an eNB device according to an embodiment of the second disclosure.

Referring to FIG. 32, an eNB includes a controller 3210 and a transceiver 3220. The controller 3210 controls the status and operation of all components of the eNB. Specifically, the controller 3210 allocates CSI-RS resources for channel estimation of a UE to the UE, and allocates feedback resources and feedback timing to the UE. For this, the controller 3210 may further include a resource allocation unit 3230. In addition, feedback configuration and feedback timing are assigned so that feedbacks from a plurality of UEs do not collide with each other, and feedback information configured at a corresponding timing is received and interpreted. The transceiver 3220 transmits and receives data, reference signals, and feedback information to and from the UE. Here, the transceiver 3220 transmits the CSI-RS to the UE through the resources allocated under the control of the controller 3210, and receives feedback on the channel information from the UE.

In the above description, the resource allocation unit 3230 is illustrated as being included in the controller 3210, but the present disclosure is not limited thereto. The controller 3210 may control the transceiver 3220 to transmit configuration information on each of the at least one reference signal to the UE or may generate the at least one reference signal. In addition, the controller 3210 may control the transceiver 3220 to transmit feedback configuration information for generating feedback information according to the measurement result to the UE. The controller 3210 may control the transceiver 3220 to transmit the at least one reference signal to the UE and to receive the feedback information transmitted from the UE at the feedback timing according to the feedback configuration information. In addition, the controller 3210 may transmit the feedback configuration information to the UE, may transmit the CSI-RS to the UE, and may receive the feedback configuration information and the feedback information generated based on the CSI-RS from the UE. At this time, the controller 3210 may transmit the feedback configuration information corresponding to each antenna port group of the eNB and additional feedback configuration information based on the relationship between the antenna port groups. Also, the controller 3210 may transmit a beamformed CSI-RS to the UE based on the feedback information, and may receive the feedback information generated based on the CSI-RS from the UE. According to the embodiment of the present disclosure described above, it is possible to prevent excessive allocation of feedback resources when an eNB having a transmission antenna having an array structure of a large number of two-dimensional antennas transmits the CSI-RS, and to prevent an increase in the channel estimation complexity of the UE. The UE may effectively measure all the channels for a large number of transmission antennas, may configure the measured channels as feedback information, and may notify the eNB of the configured feedback information.

<Third Disclosure>

Hereinafter, the third disclosure of the present specification will be described. The description of the third disclosure may include the contents described in the first disclosure or the second disclosure.

The third disclosure is to improve the reliability of RI/W1 in reporting a CSI transmitted using PUCCH, when a measurement restriction method that restricts time resources of an FD-MIMO CSI-RS based on an LTE-A system is applied to CSI-RS transmission and channel status report generation. In the third disclosure, a UE may report or may not report the CSI on a determined assumption of RI/W1 or on the assumption of RI/W1 transmitted in the aperiodic CSI report or transmission diversity, so that channel status reporting can be effectively performed even for the periodic channel status report to which another measurement restriction is applied.

Hereinafter, the third disclosure of the present specification will be described in detail.

Figure 33:
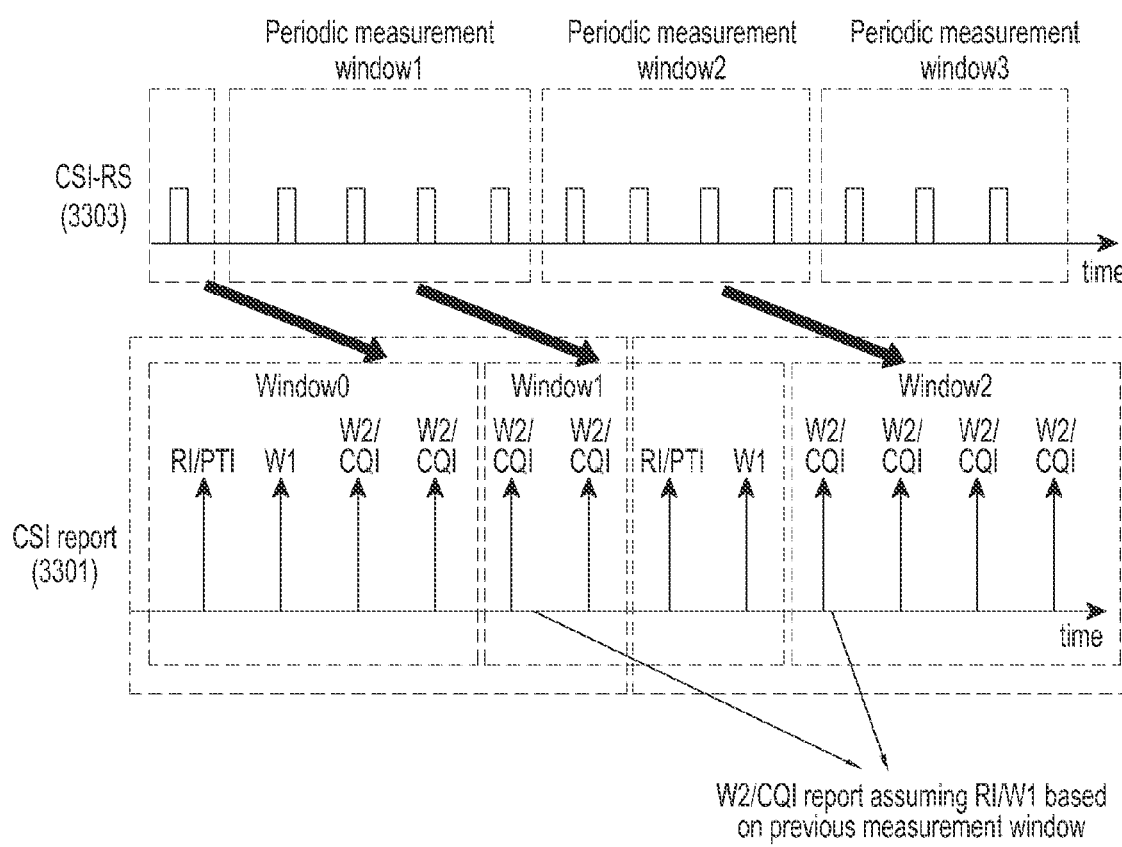
FIG. 33 is a diagram illustrating an example of an operation when measurement restriction of the second disclosure is introduced in channel measurement and status information report generation of a UE.

FIG. 33 is a diagram illustrating an example of an operation when measurement restriction of the second disclosure is introduced in channel measurement and status information report generation of a UE.

Reference numeral 3303 denotes CSI-RSs, and reference numeral 3301 denotes a situation in which a CSI is reported non-periodically using the CSI-RS.

As described in FIG. 21 of the second disclosure, the UE recognizes four CSI-RSs as one measurement window and determines that the CSI-RS has the same statistical characteristics only in the corresponding measurement window. The UE may estimate the channel based on the determined result, and may improve the channel estimation performance using the statistical characteristics of the CSI-RS or a method of obtaining an average value.

However, as shown in FIG. 33, when the UE periodically reports channel status information using the measurement restriction, ambiguity of RI and W1 assumptions may occur depending on the configuration. That is, the RI and W1 for selecting the rank and beam group of the UE are selected based on the previously transmitted measurement window, and then W2 and CQI to be transmitted are selected based on the subsequently transmitted measurement window. The application of the measurement window is to divide and measure the channel status information on the assumption that the beam direction and other characteristics between the CSI-RSs may vary. In this case, there is a problem that the CSI-RSs having different statistical characteristics other than the CSI-RS having the same statistical characteristics are used together to measure the channel status report.

Meanwhile, as described in the second disclosure, the following two methods can be considered when an eNB having a large number of transmission antennas such as FD-MIMO transmits the CSI-RS.

CSI-RS transmission method 1: Method of allocating and transmitting the same number of radio resources as the number of antennas to the CSI-RS CSI-RS transmission method 2: Method of dividing the CSI-RS into a plurality of dimensions and transmitting the divided CSI-RS FIG. 34 is a diagram illustrating CSI-RS transmission methods 1 and 2.

In FIG. 34, an eNB operating an FD-MIMO is composed of a total of 32 antennas.

Reference numeral 3400 denotes the CSI-RS transmission method 1. The CSI-RS transmission method 1 allocates and transmits the same number of radio resources as the number of antennas. In 3400, the 32 antennas are respectively expressed as A0, . . . , A3, B0, . . . , B3, C0, . . . , C3, D0, . . . , D3, E0, . . . , E3, F0, . . . , F3, G0, . . . , G3, H0, . . . , and H3. The 32 antennas of 3400 are transmitted in one two-dimensional CSI-RS, and a 2D-CSI-RS for measuring channel status of all horizontal and vertical antennas is composed of the 32 antenna ports. The CSI-RS transmission method 1 may increase the accuracy of the channel information since the radio resources for each antenna are allocated, but it is not efficient in terms of resource usage because the CSI-RS transmission method 1 uses a relatively large amount of radio resource for control information and data.

Reference numeral 3410 denotes the CSI-RS transmission method 2. The CSI-RS transmission method 2 (3410) may allow the UE to perform channel measurement on a plurality of transmission antennas while allocating a small number of radio resources even if the accuracy of the channel information is relatively low. The CSI-RS transmission method 2 is a method of dividing the entire CSI-RS into N dimensions and transmitting the result. For example, when the transmission antennas of the eNB are two-dimensionally arranged as shown in FIG. 14 described above, the CSI-RS is divided into two dimensions and transmitted.

At this time, one CSI-RS is operated as a horizontal CSI-RS for measuring channel information in the horizontal direction, and the other CSI-RS is operated as a vertical CSI-RS for measuring channel information in the vertical direction. Similarly to 3400, the 32 antennas of 3410 of FIG. 34 are expressed as A0, . . . , A3, B0, . . . , B3, C0, . . . , C3, D0, . . . , D3, E0, . . . , E3, . . . , F3, G0, . . . , G3, H0, . . . , and H3. The 32 antennas in FIG. 34 are transmitted to two CSI-RSs. In this case, an H-CSI-RS for measuring the channel status in the horizontal direction is composed of the following 8 antenna ports.

H-CSI-RS port 0: antenna A0, A1, A2, and A3 are combined and configured

H-CSI-RS port 1: antenna B0, B1, B2, and B3 are combined and configured

H-CSI-RS port 2: antenna C0, C1, C2, and C3 are combined and configured

H-CSI-RS port 3: antenna D0, D1, D2, and D3 are combined and configured

H-CSI-RS port 4: antennas E0, E1, E2, and E3 are combined and configured

H-CSI-RS port 5: antenna F0, F1, F2, and F3 are combined and configured

H-CSI-RS port 6: antenna G0, G1, G2, and G3 are combined and configured

H-CSI-RS port 7: antenna H0, H1, H2, and H3 are combined and configured

In the above description, generating one CSI-RS port by combining a plurality of antennas means antenna virtualization and is generally performed through linear combination of a plurality of antennas. A V-CSI-RS for measuring the channel status in the vertical direction is composed of the following four antenna ports.

V-CSI-RS port 0: antenna A0, B0, C0, D0, E0, F0, G0, and H0 are combined and configured V-CSI-RS port 1: antenna A1, B1, C1, D1, E1, F1, G1, and H1 are combined and configured V-CSI-RS port 2: antenna A2, B2, C2, D2, E2, F2, G2 and H2 are combined and configured V-CSI-RS port 3: antenna A3, B3, C3, D3, E3, F3, G3 and H3 are combined and configured When a plurality of antennas are arranged in a two-dimensional manner in M×N (vertical direction×horizontal direction) as described above, the channel of the FD-MIMO may be measured using N horizontal CSI-RS ports and M vertical CSI-RS ports. That is, when two CSI-RSs are used, channel status information may be grasped by utilizing M+N CSI-RS ports for M×N transmission antennas. The use of a smaller number of CSI-RS ports to determine information on a larger number of transmission antennas is an important advantage in reducing the CSI-RS overhead.

In the above description, (M×N=K)-numbered CSI-RSs are used to estimate the channel information on the transmission antenna of the FD-MIMO. This approach can also be equally applied to the case of using two CSI-RSs.

Although description has been made on the assumption of the CSI-RS transmission method 1 in the third disclosure of the present specification, the third disclosure may be equally expanded and applied even when the CSI-RS transmission method 2 is used.

Hereinafter, a first embodiment according to the third disclosure of the present specification will be described.

First Embodiment of Third Disclosure

The first embodiment assumes that an RI is 1 when RI/W1 and W1/W2/CQI according to the measurement restriction are generated by measuring the CSI-RS before or after another measurement window or CSI reset, and W1 is used in a cyclic manner within a defined range. For reference, "CSI reset" has the same meaning as the "measurement window" and they may be used together below.

A rank 1 is a method of transmitting one codeword and layer for data transmission using one beam direction. In multi-rank transmission, the power transmitted in one beam direction is divided and allocated in a plurality of directions. Accordingly, multi-rank transmission requires a certain degree or more of Signal to Interference and Noise Ratio (SINR). Therefore, in a case in which a rank that can be supported in the changed beam is low, when W2/CQI is selected by assuming a high rank, a CQI satisfying a relatively PER 10% may not be selected. In this case, an operation close to fall-back should be performed. Therefore, when the rank 1 is assumed, the CQI may be transmitted on the relatively safe assumption. In addition, since the channel status report assuming the rank 1 includes one beam direction and CQI, there are a relatively small number of errors in the channel status report assuming relatively multi-user (MU)-MIMO in comparison with the multi-rank channel status report, so that it can also be used for MU scheduling.

Similarly to RI, W1 also needs a new assumption. In the case of eight transmission (Tx) codebooks of the existing Rel-10 and four transmission (Tx) codebooks in the existing Rel-12, a beam group including four beams is selected through W1, and based on the selection, co-phasing between one or a plurality of beams and X-pol antennas is reported. Therefore, when W1 is generated by measuring the CSI-RS before another measurement window or CSI reset, the subsequent W2 has a disadvantage in that W1 should be selected in the beam group that does not reflect the current channel status. For such a situation, there are the following three methods in which a UE assumes and reports W1.

W1 assumption method 1: Assume that W1=0

W1 assumption method 2: Assume that W11 or W12 is 0, and the opposite is assumed in a cyclic manner.

W1 assumption method 3: Assume that both W11 and W12 are assumed in a cyclic manner.

Figure 35:
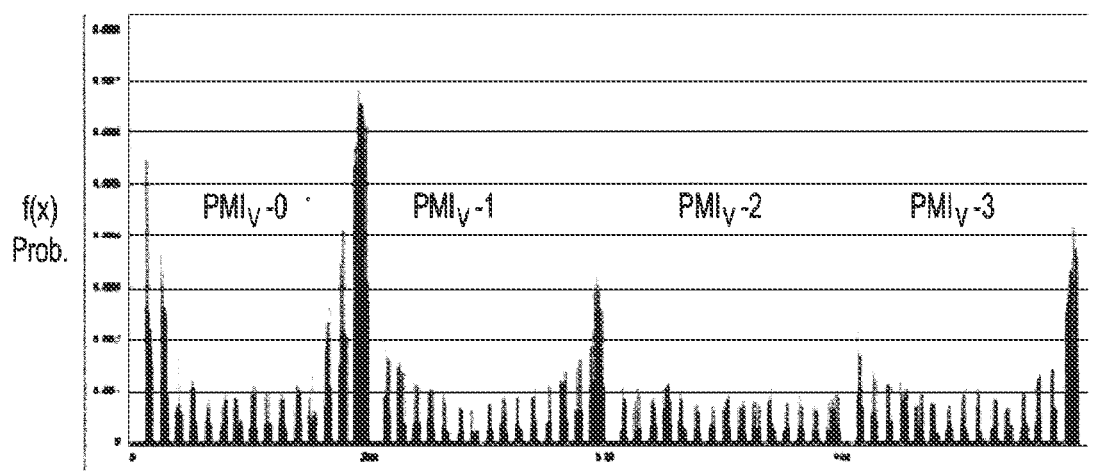
FIG. 35 is a diagram illustrating probability distributions (pdf) showing distribution of PMIs selected by a UE using a 3D-UMi channel of a three-dimensional channel model.

FIG. 35 is a diagram illustrating probability distributions (pdf) showing distribution of PMIs selected by a UE using a 3D-UMi channel of a three-dimensional channel model.

In FIG. 35, PMIv is a PMI in the vertical dimension, PMIH is a PMI in the horizontal dimension, and $PMI_{2D}$ is the same as W2. From the pdf distribution at this time, it can be seen that a 0-th index that transmits a beam to the center is selected most frequently in the horizontal dimension and the number of selections is reduced gradually in an edge direction of a corresponding cell thereafter. However, it can be seen that, in the vertical dimension, $PMI_V=1$ is most frequently selected, but the other 0, 2, and 3 are also selected to some extent. Therefore, the W1 assumption method 1 can be accepted to generate W2 and CQI by assuming only one representative vertical beam group and one representative horizontal beam group which are configured by the eNB.

In the W1 assumption method 2, a portion corresponding to the horizontal beam group is configured as 0, and the vertical beam is cycled in a predetermined cycle for diverse support. The cycling according to the cycle may be performed for each RB, for each of a plurality of RBs, or for each of subbands. As described above, the UE has a characteristic of relatively evenly selecting indexes in the vertical direction even though there is a difference in degree, and has a characteristic of selecting a large number of indexes close to the index 0 in the horizontal direction. Accordingly, when the W1 assumption method 2 is used, a periodic channel status report assuming a wideband may obtain a CQI when it is assumed that precoders are uniformly and alternatingly transmitted in a manner similar to transmission diversity (TxD). On the other hand, when the cycling of W1 is performed for each RB, the report that assumes subbands results in reporting a CQI similar to TxD for each subband. On the contrary, when cycling is performed for each of a plurality of RBs and subbands, the eNB reports CQI and W2 by assuming a beam group for each of the plurality of RBs and subbands, so that the eNB may roughly determine what is a vertical W1 which is most advantageous to the UE based on the location of the RB or the subband.

The W1 assumption method 3 is a method of performing cycling to variously support the horizontal and vertical beam groups.

The corresponding cycling may be performed for each RB, for each of a plurality of RBs, or for each of subbands. In the case of the W1 assumption method 3, similarly to the W1 assumption method 2, a periodic channel status report assuming a wideband may obtain a CQI when it is assumed that precoders are uniformly and alternatingly transmitted in a manner similar to transmission diversity (TxD). However, the main difference is that, in the W1 assumption method 2, the horizontal direction is fixed to the main direction and whereas, in the W1 assumption method 3, the horizontal direction is also cyclized to obtain a cycling effect on both sides. A channel status report assuming a subband may also result in reporting a CQI similar to TxD for each RB when cycling of W1 is performed for each RB in a similar manner to that of the W1 assumption method 2. On the contrary, when cycling is performed for each of a plurality of RBs and subbands, the eNB reports CQI and W2 by assuming a beam group for each of the plurality of RBs and subbands, so that the eNB may roughly determine what is a horizontal and vertical W1 which is most advantageous to the UE based on the location of the RB or the subband.

The method mentioned in the first embodiment of the third disclosure should be always applied when the measurement window of the RI/W1 report and the measurement window different from the measurement window of W1/W2/CQI report are applied and used. However, different measurement windows do not always mean different channel characteristics. The assumption of the CSI-RS transmission may be the same since the beam for the CSI-RS transmission is not changed in some cases or the CSI-RS transmission scenario according to other applications is not changed. However, even in this case, according to the method of the first embodiment of the third disclosure, RI/W1 should be assumed differently, and the performance may be degraded.

Second Embodiment of Third Disclosure

The second embodiment according to the third disclosure relates to a method in which RI/W1 of the periodic channel status report according to the measurement restriction is associated with RI and W1 when W1/W2/CQI is generated by measuring a CSI-RS before and after another measurement window or CSI reset.

Figure 36:
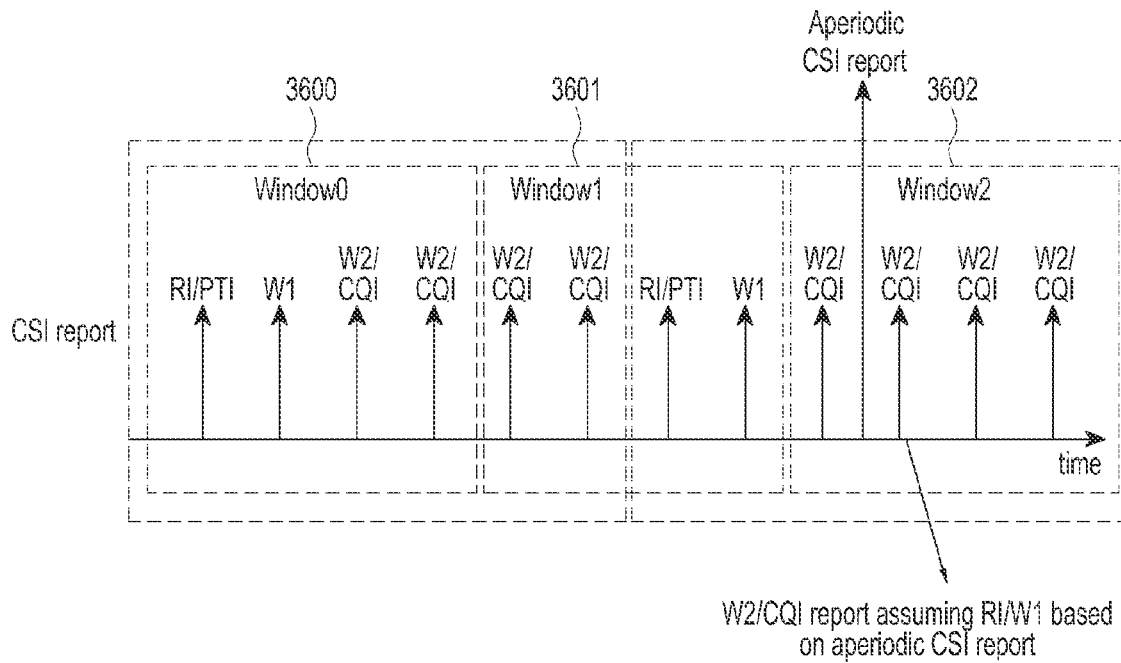
FIG. 36 is a diagram illustrating a channel status reporting operation according to a second embodiment according to a third disclosure.

FIG. 36 is a diagram illustrating a channel status reporting operation according to a second embodiment according to a third disclosure.

An eNB determines whether to change the assumption for the corresponding beam or CSI-RS transmission when the measurement window is changed. In this case, when the assumption for CSI-RS transmission is not changed according to a change in the measurement window, the channel status information may be reported using the periodic channel status report without additionally requesting another operation. However, when the assumption for CSI-RS transmissions is changed between the measurement windows, information according to the corresponding W2/CQI report may be inaccurate. Therefore, at this time, the eNB naturally requests, from the UE, to report an aperiodic channel status report for an accurate channel status report. Therefore, when RI/W1 in the periodic channel status report can be updated using RI/W1 in the aperiodic channel status report, it is possible to allow the UE that operates based on the measurement restriction to effectively perform the periodic channel status report.

In addition, in the present embodiment, a 1-bit configuration field is configured in the RRC field to configure whether or not to perform such an operation. When the value is 1, RI/W1 of the aperiodic channel status report is referred to and the value is 0, RI/W1 of the aperiodic channel status report may not be referred to.

Meanwhile, unlike this, when the measurement restriction is configured, it is possible to unconditionally perform the corresponding operation on the periodical channel status report. In addition, unlike the first embodiment of the third disclosure, the method of the present embodiment updates the RI/W1 by triggering the aperiodic channel status report assuming only when the assumption of the CSI-RS transmission is changed, and therefore unnecessary deterioration of performance can be prevented. However, there are also disadvantages that there is a time delay until the aperiodic channel status information is reported, and the aperiodic channel status report should be trigged and a PUSCH should be transmitted in order to update RI/W1 of the periodic channel status report.

Third Embodiment of Third Disclosure

The third embodiment of the third disclosure relates to a method for transmitting a CQI assuming transmission diversity rather than sending incorrect information since RI/W1 and W1/W2/CQI of the periodic channel status report according to the measurement restriction are different from the assumptions of RI and W1 when they are generated by measuring the CSI-RS before and after the reset window or CSI reset.

Figure 37:
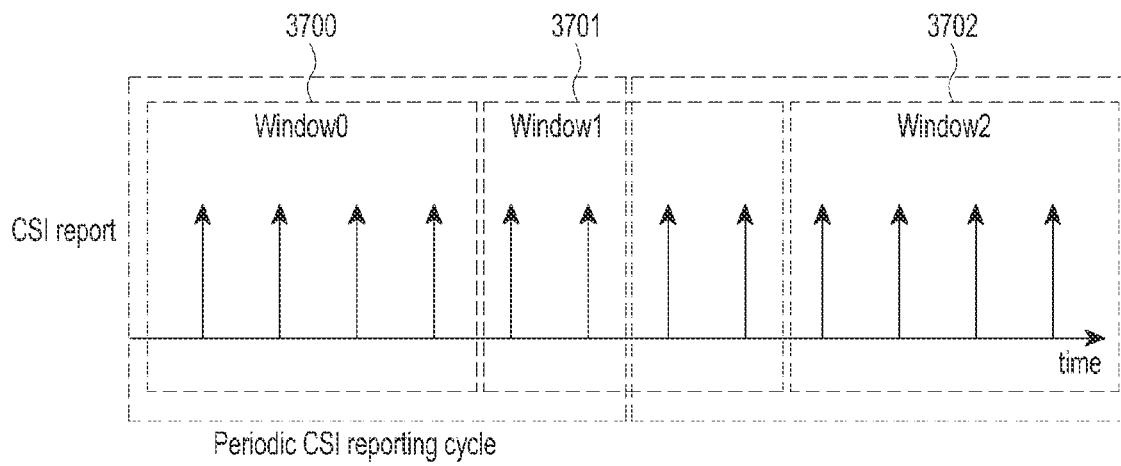
FIG. 37 is a diagram for explaining a channel status reporting operation according to a third embodiment of the third disclosure.

FIG. 37 is a diagram for explaining a channel status reporting operation according to a third embodiment of the third disclosure.

In LTE, Space Frequency Block Coding (SFBC) and Space Frequency Transmit Diversity (SFTD), which are open loop technologies, are used. They are a kind of transmission diversity (TxD).

In this method, a plurality of associated antenna ports are combined in pairs and the combined antenna ports are transmitted to two frequency symbols by turning a beam direction. Since this method is not sensitive to channel changes, the corresponding method may be used easily by the eNB and may be used as one of the technologies for fall-back in the LTE system because of its stable performance. This method is also used to calculate the CQI to reflect interference in an LTE TDD system or the like that does not require PMI reporting.

In this case, as in the case of the first embodiment of the third disclosure, the eNB receives information through a CQI generated by assuming a predefined robust precoder rather than based on erroneous RI/W1, thereby obtaining more accurate information. However, since the current LTE does not support a transmission diversity method assuming 8 or more CSI-RS ports, the transmission diversity method for 8 or more CSI-RS ports or pre-rules for virtualizing the 8 or more CSI-RS ports as 4 or fewer CSI-RS ports should be defined in advance in order to use the present embodiment.

Fourth Embodiment of Third Disclosure

The fourth embodiment of the third disclosure relates to a method in which a UE does not transmit corresponding information, rather than transmitting erroneous information based on another measurement window.

Figure 38:
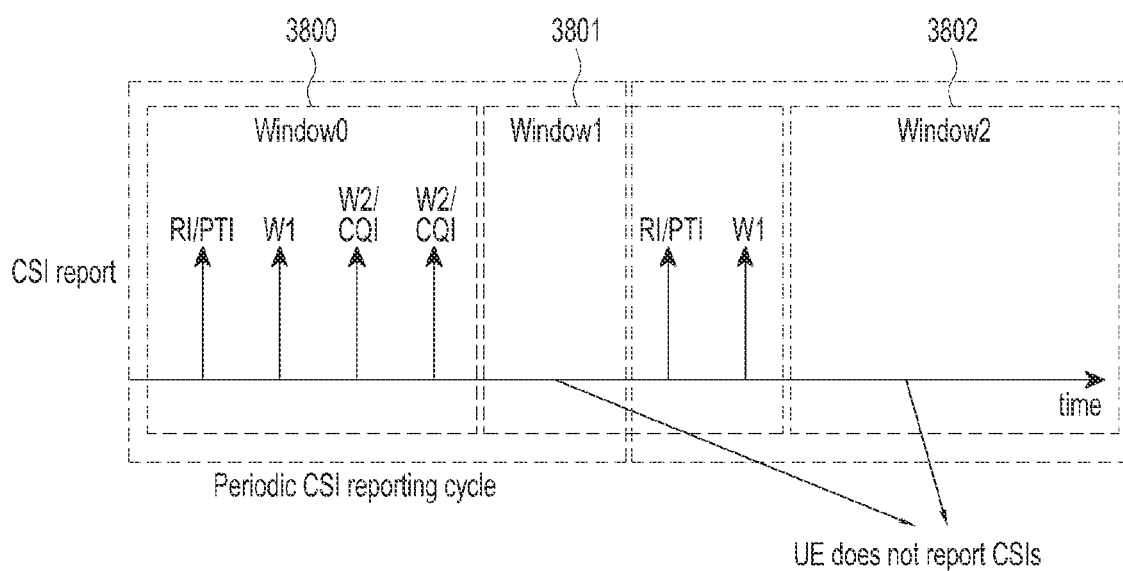
FIG. 38 is a diagram illustrating a channel status reporting operation according to a third embodiment of the third disclosure.

FIG. 38 is a diagram illustrating a channel status reporting operation according to a fourth embodiment of the third disclosure.

The method of the present embodiment relates to a method in which a measurement window resource is emptied so that the corresponding resource can be allocated to another US, rather than wasting PUCCH resources due to wrong information transmitted to an eNB by a UE.

When the UE performs a channel status report on the assumption of incorrect RI/W1, the eNB may discern this information in advance and thus discard the incorrect channel status report. However, the PUCCH resource is wasted because it is used for periodic channel status reporting. Therefore, in this case, the UE does not perform the periodic channel status report so that the eNB may allocate the corresponding resource to another UE to allow the other UE to transmit necessary information.

Although the drawings of the embodiments of the third disclosure described above are shown assuming that RI and W1 are both measured in different measurement windows, the corresponding operation is equally applicable even when only RI is measured in a different measurement window. At this time, in the first and second embodiments, channel status information may be generated and reported on the assumption that only RI is 1 or is RI used in the aperiodic channel status report. Also, although the description has been made in the embodiments and drawings mainly using the expression of measurement window, the measurement window may be referred to as CSI reset, and it should be noted that the operation of the actual eNB and the UE is the same even when the names are different.

Hereinafter, the operation of a UE and an eNB and device components according to embodiments of the third disclosure will be described. However, the operation of the UE and the eNB and device components in the third disclosure are not additionally shown for the sake of explanation of the third disclosure, since the drawings described in the second disclosure may be used as they are. Therefore, each description will be made using the drawings described in the second disclosure.

Referring again to FIG. 29, in operation 2910, the UE receives configuration information on CSI-RS configuration. The configuration information may include information on a period and offset at which the measurement restriction performed on the corresponding CSI-RS is determined. In addition, the UE may determine at least one of the number of ports for each CSI-RS, timing and resource location at which each CSI-RS is transmitted, whether RI-based CSI-process is configured, a corresponding CSI-process index, and transmission power information based on the received configuration information.

Next, in operation 2920, the UE configures one piece of feedback configuration information based on at least one CSI-RS. When the CSI-RS measurement restriction related information is not included in operation 2910, the information on the period and offset at which the measurement restriction performed on the corresponding CSI-RS is determined may be included in the feedback configuration information of operation 2920. In operation 2930, when receiving the CSI-RS, the UE estimates a channel between an eNB antenna and a reception antenna of the UE based on the received CSI-RS.

Next, in operation 2940, the UE generates a feedback information rank, a PMI, and a CQI using the received feedback configuration and the defined codebook based on the virtual channel added between the estimated channel and the CSI-RS. At this time, the UE determines whether the corresponding CSI-RS is based on the measurement window (before or after CSI reset) such as RI/W1 and W1/W2/CQI by the measurement window configured by the eNB or whether the aperiodic status report exists and is configured based on RI/W1 of the aperiodic status report, and thus determines whether the RI/W1 assumption for W1/W2/CQI report uses the methods described in the third disclosure. Next, in operation 2950, the UE transmits the feedback information to the eNB at a predetermined timing according to the feedback configuration of the eNB, thereby completing the channel feedback generation and report process considering two-dimensional array.

Referring again to FIG. 30, in operation 3010, the eNB transmits configuration information on CSI-RS for measuring a channel to the UE. The configuration information may include the information on the period and offset at which the measurement restriction performed on the corresponding CSI-RS is determined. In addition, the configuration information includes at least one of the number of ports for each CSI-RS, timing and resource location at which each CSI-RS is transmitted, whether an RI-based CSI-process is configured, a corresponding CSI-process index, and transmission power information. Next, in operation 3020, the eNB transmits feedback configuration information based on the at least one CSI-RS to the UE. In operation 3010, as in the operation of the UE, when the configuration information does not include information on a period and offset at which the measurement restriction performed on the corresponding CSI-RS is determined, the corresponding information may be included in operation 3020. Next, the eNB transmits the configured CSI-RS to the UE. The UE estimates a channel for each antenna port and estimates an additional channel for a virtual resource based on the estimated channel. The UE determines the feedback according to the configuration of the measurement window configuration and the aperiodic channel report and the reporting time, and generates corresponding PMI, RI, and CQI to transmit to the eNB. Accordingly, the eNB receives the feedback information from the UE at a predetermined timing in operation 3030, and uses the feedback information to determine the channel status between the UE and the eNB.

Referring to FIG. 31, the UE includes a transceiver 3110 and a controller 3120. The transceiver 3110 performs a function of transmitting or receiving data from the outside (for example, eNB). Here, the transceiver 3110 may transmit feedback information to the eNB under the control of the controller 3120. The controller 3120 controls the status and operation of all the components constituting the UE.

Specifically, the controller 3120 generates feedback information according to the information allocated from the eNB. In addition, the controller 3120 controls the transceiver 3110 to feedback the generated channel information to the eNB according to the timing information allocated from the eNB. For this, the controller 3120 may include a channel estimator 3130. The channel estimation unit 3130 determines necessary feedback information through CSI-RS and feedback allocation information received from the eNB, and estimates a channel using the received CSI-RS based on the feedback information.

In FIG. 31, the UE is configured to include the transceiver 3110 and the controller 3120. However, the present disclosure is not limited to this, and various configurations may be further provided depending on functions performed in the UE. For example, the UE may further include a display unit for displaying a current status of the UE, an input unit for inputting a signal such as a function performed by the user, a storage unit for storing data generated in the UE, and the like. Although the channel estimation unit 3130 is illustrated as being included in the controller 3120, the present disclosure is not limited thereto. The controller 3120 may control the transceiver 3110 to receive configuration information on each of the at least one reference signal resource from the eNB. The controller 3120 may control the transceiver 3110 to measure the at least one reference signal and to receive feedback configuration information for generating feedback information according to the measurement result from the eNB.

The controller 3120 may measure at least one reference signal received through the transceiver 3110 and generate feedback information according to the feedback configuration information. The controller 3120 may control the transceiver 3110 to transmit the generated feedback information to the eNB at feedback timing according to the feedback configuration information. Also, the controller 3120 receives the CSI-RS from the eNB and determines whether the received CSI-RSC and the corresponding CSI-RS satisfy the requirements for the measurement window and the CSI reset generates feedback information, and transmits the generated feedback information to the eNB. At this time, the controller 3120 selects a precoding matrix for each antenna port group of the eNB, and selects one additional precoding matrix based on the relation between the antenna port groups of the eNB.

Also, the controller 3120 receives the CSI-RS from the base station, generates feedback information based on the received CSI-RS, and transmits the generated feedback information to the eNB. At this time, the controller 3120 may select one precoding matrix for all antenna port groups of the eNB. The controller 3120 also receives feedback configuration information from the eNB, receives the CSI-RS from the eNB, and generates feedback information based on the received feedback configuration information and the received CSI-RS, and feedback information to the eNB. At this time, the controller 3120 may receive additional feedback configuration information based on the feedback configuration information corresponding to each antenna port group of the eNB and the relationship between the antenna port groups.

Referring to FIG. 32, the eNB includes a controller 3210 and a transceiver 3220. The controller 3210 controls the status and operation of all the components of the eNB. Specifically, the controller 3210 allocates CSI-RS resources for channel estimation of the UE to the UE and allocates feedback resources and feedback timing to the UE. For this, the controller 3210 may further include a resource allocation unit 3230. In addition, feedback configuration and feedback timing are assigned so that feedback from a plurality of UEs does not collide, and feedback information configured at the corresponding timing is received and analyzed. The transceiver 3220 transmits and receives data, reference signals, and feedback information to the UE. Here, the transceiver 3220 transmits the CSI-RS to the UE through the resources allocated under the control of the controller 3210, and receives the feedback on the channel information from the UE.

In the above description, the resource allocator 3230 is included in the controller 3210, but the present disclosure is not limited thereto. The controller 3210 may control the transceiver 3220 to transmit the configuration information on each of the at least one reference signal to the UE or may generate the at least one reference signal. In addition, the controller 3210 can control the transceiver 3220 to transmit feedback configuration information for generating feedback information according to the measurement result to the UE. The controller 3210 may control the transceiver 3220 to transmit the at least one reference signal to the UE and to receive the feedback information transmitted from the UE at the feedback timing according to the feedback configuration information. In addition, the controller 3210 may transmit feedback configuration information to the UE, may transmit the CSI-RS to the UE, and may receive the feedback configuration information and the feedback information generated based on the CSI-RS from the UE. At this time, the controller 3210 may transmit additional feedback configuration information based on the relationship between the feedback configuration information and the antenna port group corresponding to each antenna port group of the eNB. In addition, the controller 3210 may transmit the beam-formed CSI-RS to the UE based on the feedback information, and may receive feedback information generated based on the CSI-RS from the UE. In addition, it is possible to determine and use the channel status information transmitted by the UE through the determination of whether the CSI-RS meets the requirements for the measurement window and the CSI reset. According to the embodiment of the present disclosure described above, it is possible to prevent excessive allocation of feedback resources to transmit CSI-RS in the eNB having a large number of two-dimensional antenna array structures and increase in channel estimation complexity, so that UE may effectively measure all the channels for a large number of transmission antennas, may configure the measurement result as feedback information, and may notify the eNB of the configured information.

The particular aspects of the embodiments described above may be implemented as a computer-readable code in a computer-readable recording medium. The computer-readable recording medium is a predetermined data storage device which can store data which can be read by a computer system. The computer-readable recording medium may include a Read-Only Memory (ROM), a Random-Access Memory (RAM), CD-ROMs, magnetic tapes, floppy disks, optimal data storage devices, and carrier waves (such as data transmission through the Internet). The computer-readable recording medium may be distributed through computer systems connected to the network, and accordingly the computer-readable code is stored and executed in a distributed manner. Further, functional programs, codes, and code segments to achieve the present disclosure may be easily interpreted by programmers skilled in the art.

It will be understood that a method and apparatus according to an embodiment of the present disclosure may be implemented in the form of hardware, software, or a combination of hardware and software. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be also appreciated that the software may be stored in a machine (for example, a computer)-readable storage medium. It will also be understood that a method and apparatus according to an embodiment of the present disclosure may be implemented by a computer or portable terminal including a controller and a memory, and the memory is an example of a machine readable device adapted to store a program or programs including instructions for implementing embodiments of the present disclosure.

Accordingly, the present disclosure includes a program including a code for implementing the apparatus or method described in any of the appended claims of the specification and a machine (computer or the like) readable storage medium for storing the program. Further, the program may be electronically carried by any medium such as a communication signal transferred through a wired or wireless connection, and the present disclosure appropriately includes equivalents thereof.

Further, an apparatus according to an embodiment of the present disclosure may receive the program from a program providing device that is wiredly or wirelessly connected thereto, and may store the program. The program providing device may include a program including instructions through which a program processing device performs a preset content protecting method, a memory for storing information and the like required for the content protecting method, a transceiver for performing wired or wireless communication with the program processing device, and a controller for transmitting the corresponding program to a transceiver at the request of the program processing device or automatically.

The invention claimed is:

1. A method performed by a base station in a radio communication system, the method comprising:
    transmitting, to a user equipment (UE), a higher layer signaling including information indicating a code division multiplexing (CDM) type;
    configuring a plurality of resources for a channel state information reference signal (CSI-RS) based on the CDM type; and
    transmitting, to the UE, the CSI-RS through the plurality of resources using a plurality of antenna ports,
    wherein the CDM type defines CDM values and CDM pattern.

2. The method of claim 1,
    wherein the higher layer signaling includes information on a number of the plurality of antenna ports,
    wherein the CDM type includes a CDM-2 or a CDM-4, and
    wherein the CDM-2 is related to orthogonal codes of 2 bits and the CDM-4 is related to orthogonal codes of 4 bits.

3. The method of claim 1, wherein the CDM type includes a CDM-2 or a CDM-4, and
    wherein four resource elements in one resource block are used for one antenna port, in case that the CDM type is the CDM-4.

4. The method of claim 1, wherein the CDM type includes a CDM-2 or a CDM-4, and
    wherein the plurality of the resources are configured by aggregating resources for the CDM-2 or the CDM-4.

5. The method of claim 1,
    wherein indexes of the plurality of the antenna ports are determined based on a number of antenna ports for a CSI-RS configuration, and
    wherein the plurality of resources are mapped to the plurality of the antenna ports based on the CDM type.

6. A method performed by a user equipment (UE) in a radio communication system, the method comprising:
    receiving, from a base station, a higher layer signaling including information indicating a code division multiplexing (CDM) type;
    identifying a plurality of resources for a channel state information reference signal (CSI-RS) based on the CDM type; and
    receiving, from the base station, the CSI-RS through the plurality of resources using a plurality of antenna ports,
    wherein the CDM type defines CDM values and CDM pattern.

7. The method of claim 6,
    wherein the higher layer signaling includes information on a number of the plurality of antenna ports,
    wherein the CDM type includes a CDM-2 or a CDM-4, and
    wherein the CDM-2 is related to orthogonal codes of 2 bits and the CDM-4 is related to orthogonal codes of 4 bits.

8. The method of claim 6, wherein the CDM type includes a CDM-2 or a CDM-4, and
    wherein four resource elements in one resource block are used for one antenna port, in case that the CDM type is the CDM-4.

9. The method of claim 6, wherein the CDM type includes a CDM-2 or a CDM-4, and wherein the plurality of the resources are configured by aggregating resources for the CDM-2 or the CDM-4.

10. The method of claim 6,
    wherein indexes of the plurality of the antenna ports are determined based on a number of antenna ports for a CSI-RS configuration, and
    wherein the plurality of resources are mapped to the plurality of the antenna ports based on the CDM type.

11. A base station in a radio communication system, the base station comprising:
    a transceiver; and
    at least one processor configured to:
    transmit, to a user equipment via the transceiver, a higher layer signaling including information indicating a code division multiplexing (CDM) type;
    configure a plurality of resources for a channel state information reference signal (CSI-RS) based on the CDM type; and
    transmit, to the UE, the CSI-RS through the plurality of resources using a plurality of antenna ports,
    wherein the CDM type defines CDM values and CDM pattern.

12. The base station of claim 11, wherein the higher layer signaling includes information on a number of the plurality of antenna ports,
    wherein the CDM type includes a CDM-2 or a CDM-4, and
    wherein the CDM-2 is related to orthogonal codes of 2 bits and the CDM-4 is related to orthogonal codes of 4 bits.

13. The base station of claim 11, wherein the CDM type includes a CDM-2 or a CDM-4, and
    wherein four resource elements in one resource block are used for one antenna port, in case that the CDM type is the CDM-4.

14. The base station of claim 11, wherein the CDM type includes a CDM-2 or a CDM-4, and
    wherein the plurality of the resources are configured by aggregating resources for the CDM-2 or the CDM-4.

15. The base station of claim 11, wherein indexes of the plurality of the antenna ports are determined based on a number of antenna ports for a CSI-RS configuration, and
    wherein indexes of the plurality of the antenna are determined based on a number of antenna ports for a CSI-RS configuration, and
    wherein the plurality of resources are mapped to the plurality of the antenna ports based on the CDM type.

16. A user equipment (UE) in a radio communication system, the UE comprising:
a transceiver; and
at least one processor configured to:
receive, from a base station via the transceiver, a higher layer signaling including information indicating a code division multiplexing (CDM) type;
identify a plurality of resources for a channel state information reference signal (CSI-RS) based on the CDM type; and
receive, from the base station via the transceiver, the CSI-RS through the plurality of resources using a plurality of antenna ports,
wherein the CDM type defines CDM values and CDM pattern.

17. The UE of claim 16, wherein the higher layer signaling includes information on a number of the plurality of antenna ports,
wherein the CDM type includes a CDM-2 or a CDM-4, and
wherein the CDM-2 is related to orthogonal codes of 2 bits and the CDM-4 is related to orthogonal codes of 4 bits.

18. The UE of claim 16, wherein the CDM type includes a CDM-2 or a CDM-4, and
wherein four resource elements in one resource block are used for one antenna port, in case that the CDM type is the CDM-4.

19. The UE of claim 16, wherein the CDM type includes a CDM-2 or a CDM-4, and
wherein the plurality of the resources are configured by aggregating resources for the CDM-2 or the CDM-4.

20. The UE of claim 16,
wherein indexes of the plurality of the antenna ports are determined based on a number of antenna ports for a CSI-RS configuration, and
wherein the plurality of resources are mapped to the plurality of the antenna ports based on the CDM type.

* * * * *